United States Patent
Beale et al.

(10) Patent No.: US 11,492,194 B2
(45) Date of Patent: Nov. 8, 2022

(54) INDUSTRIAL CONTAINMENT BAGS FOR BULK MATERIALS, WASTE MATERIALS AND/OR HAZARDOUS MATERIALS WITH VARYING LEVELS OF RADIOACTIVITY

(71) Applicant: I.C.E. Packaging Company, LLC, Moon Township, PA (US)

(72) Inventors: Aldon E. Beale, Fort Myers, FL (US); Konstadino S. Chirgott, Aliquippa, PA (US)

(73) Assignee: I.C.E. Packaging Company, LLC, Moon Township, PA (US)

( * ) Notice: Subject to any disclaimer, the term of this patent is extended or adjusted under 35 U.S.C. 154(b) by 0 days.

(21) Appl. No.: 16/840,369

(22) Filed: Apr. 4, 2020

(65) Prior Publication Data

US 2020/0317441 A1 Oct. 8, 2020

Related U.S. Application Data

(60) Provisional application No. 62/829,761, filed on Apr. 5, 2019.

(51) Int. Cl.
*B65D 88/16* (2006.01)
*B65D 85/00* (2006.01)
(Continued)

(52) U.S. Cl.
CPC .......... *B65D 88/16* (2013.01); *B65D 85/70* (2013.01); *B65D 88/12* (2013.01); *B65D 90/021* (2013.01);
(Continued)

(58) Field of Classification Search
CPC ...... B65D 88/16; B65D 88/12; B65D 90/021; B65D 90/54; B65D 85/70; B65D 88/1681;
(Continued)

(56) References Cited

U.S. PATENT DOCUMENTS

| 1,335,607 A | 3/1920 | Salisbury |
| 2,696,235 A | 12/1954 | Toffolon |
| (Continued) | | |

FOREIGN PATENT DOCUMENTS

| WO | 9919224 | 4/1999 |
| WO | 2007081361 | 7/2007 |

OTHER PUBLICATIONS

Soft-sided Waste Containers / Deactivation and Decommissioning Focus Area; Prepared for U.S. Department of Energy / Office of Environmental Management / Office of Science and Technology; Jul. 1999.

*Primary Examiner* — Jes F Pascua
*Assistant Examiner* — Matthew T Theis
(74) *Attorney, Agent, or Firm* — Lorraine Hernandez; Kegler Brown Hill + Ritter Co., LPA

(57) ABSTRACT

The present invention is directed to new and improved industrial containment bags wherein the improvement comprises providing methods and technologies for improving the integrity of such bags during processes designed for lifting, transporting storing and/or disposing of the same. In certain embodiments, the improvement includes providing methods and technologies for improving the sealing capabilities of the bag's closure systems. In other embodiments, the improvement includes providing methods and technologies for assessing the load balance of materials being contained in such industrial containment bags; and thereafter, compensating for any significant load imbalances. The present invention is also directed to methods of manufacturing, using, filling, lifting, transporting, storing, and/or disposing of such new and improved industrial containment bags.

20 Claims, 39 Drawing Sheets

(51) Int. Cl.
  *B65D 88/12*   (2006.01)
  *B65D 90/02*   (2019.01)
  *B65D 90/54*   (2006.01)
  *G21F 5/12*    (2006.01)
  *G21F 5/14*    (2006.01)
  *B32B 1/00*    (2006.01)
  *B32B 5/26*    (2006.01)
  *B32B 5/02*    (2006.01)

(52) U.S. Cl.
  CPC ............... *B65D 90/54* (2013.01); *G21F 5/12* (2013.01); *G21F 5/14* (2013.01); *B32B 1/00* (2013.01); *B32B 5/022* (2013.01); *B32B 5/024* (2013.01); *B32B 5/26* (2013.01); *B32B 2262/0253* (2013.01); *B32B 2307/7265* (2013.01); *B32B 2439/46* (2013.01)

(58) Field of Classification Search
  CPC .................. B65D 90/046; B65D 88/46; B65D 2590/046; B65D 88/123; B65D 88/1631; G21F 5/12; G21F 5/14; B32B 1/00; B32B 5/022; B32B 5/024; B32B 5/26; B32B 2262/0253; B32B 2307/7265; B32B 2439/46
  USPC ........................... 383/6, 210.1, 61.1–61.5, 61
  See application file for complete search history.

(56) References Cited

U.S. PATENT DOCUMENTS

| | | |
|---|---|---|
| 2,810,944 A | 10/1957 | Sander |
| 3,422,867 A | 1/1969 | Wu |
| 3,481,461 A | 12/1969 | Paxton |
| 3,578,213 A | 5/1971 | Clarke et al. |
| 3,617,418 A | 11/1971 | Miller |
| 3,756,469 A | 9/1973 | Clark et al. |
| 3,888,163 A | 7/1975 | Watanabe |
| 3,893,595 A | 7/1975 | Khanna et al. |
| 4,113,146 A | 9/1978 | Williamson |
| 4,194,652 A | 3/1980 | Williamson et al. |
| 4,207,937 A | 6/1980 | Sandeman et al. |
| 4,224,970 A | 9/1980 | Williamson et al. |
| 4,385,953 A | 5/1983 | Beck |
| 4,395,067 A | 7/1983 | Robin |
| 4,418,806 A | 12/1983 | Johnson |
| 4,461,402 A | 7/1984 | Fell et al. |
| 4,493,109 A | 1/1985 | Nattrass |
| 4,557,400 A | 12/1985 | Clarke |
| 4,564,161 A | 1/1986 | Frye |
| 4,640,328 A | 2/1987 | Arney |
| 4,671,733 A | 6/1987 | Krein |
| 4,730,942 A | 3/1988 | Fulcher |
| 4,790,051 A | 12/1988 | Knight |
| 4,792,171 A | 12/1988 | Lamy |
| 4,969,750 A | 11/1990 | Russo et al. |
| 5,098,364 A | 3/1992 | Schilling |
| 5,108,196 A | 4/1992 | Hughes |
| 5,110,005 A | 5/1992 | Schilling |
| 5,138,750 A | 8/1992 | Gundlach et al. |
| 5,209,364 A | 5/1993 | LaPoint, Jr. |
| 5,213,141 A | 5/1993 | Dorman |
| 5,269,579 A | 12/1993 | DeCrane |
| 5,316,387 A * | 5/1994 | Polett .................. B65D 88/1631 383/119 |
| 5,776,567 A | 7/1998 | Schilling et al. |
| 5,810,478 A | 9/1998 | LaFleur |
| 5,860,525 A | 1/1999 | Bellehchili |
| 5,934,807 A | 8/1999 | Futerman |
| 5,938,338 A | 8/1999 | McDonough |
| 5,967,579 A | 10/1999 | Herbert |
| 6,000,604 A | 12/1999 | LaPoint, III |
| 6,079,934 A | 6/2000 | Beale |
| 6,142,727 A | 11/2000 | Beale |
| 6,155,772 A | 12/2000 | Beale |
| 6,186,713 B1 | 2/2001 | Bonerb |
| 6,250,488 B1 | 6/2001 | Narahara et al. |
| 6,305,845 B1 | 10/2001 | Navin |
| 6,450,356 B1 | 9/2002 | Alexander et al. |
| 7,029,178 B2 | 4/2006 | Grybowski |
| 7,073,676 B1 | 7/2006 | Town |
| 7,074,174 B2 | 7/2006 | Lindgren et al. |
| 7,845,511 B1 | 12/2010 | Strickland et al. |
| 8,129,702 B2 | 3/2012 | Bakker et al. |
| 8,191,722 B1 | 6/2012 | Town |
| 8,499,953 B1 | 8/2013 | Town |
| 8,562,212 B1 * | 10/2013 | Strickland .......... B65D 88/1681 383/61.3 |
| 8,894,281 B2 | 11/2014 | Town et al. |
| 8,894,282 B2 | 11/2014 | Town et al. |
| 9,169,061 B2 * | 10/2015 | Blanchard ............ B65D 90/046 |
| 9,359,175 B2 | 6/2016 | Beale |
| 9,365,345 B2 | 6/2016 | Town et al. |
| 9,478,322 B1 | 10/2016 | Schilling et al. |
| 9,493,299 B2 | 11/2016 | Town et al. |
| 9,679,669 B2 | 6/2017 | Schilling et al. |
| 2001/0000464 A1 | 4/2001 | Beale |
| 2003/0185465 A1 | 10/2003 | Vazquez |
| 2007/0140598 A1 | 6/2007 | McGillick et al. |
| 2012/0102891 A1 | 5/2012 | Beale |
| 2014/0254956 A1 * | 9/2014 | Buell, III ........... A45C 13/1023 383/64 |
| 2019/0375572 A1 * | 12/2019 | Nelson .................. B65D 88/72 |

\* cited by examiner

PRIOR ART

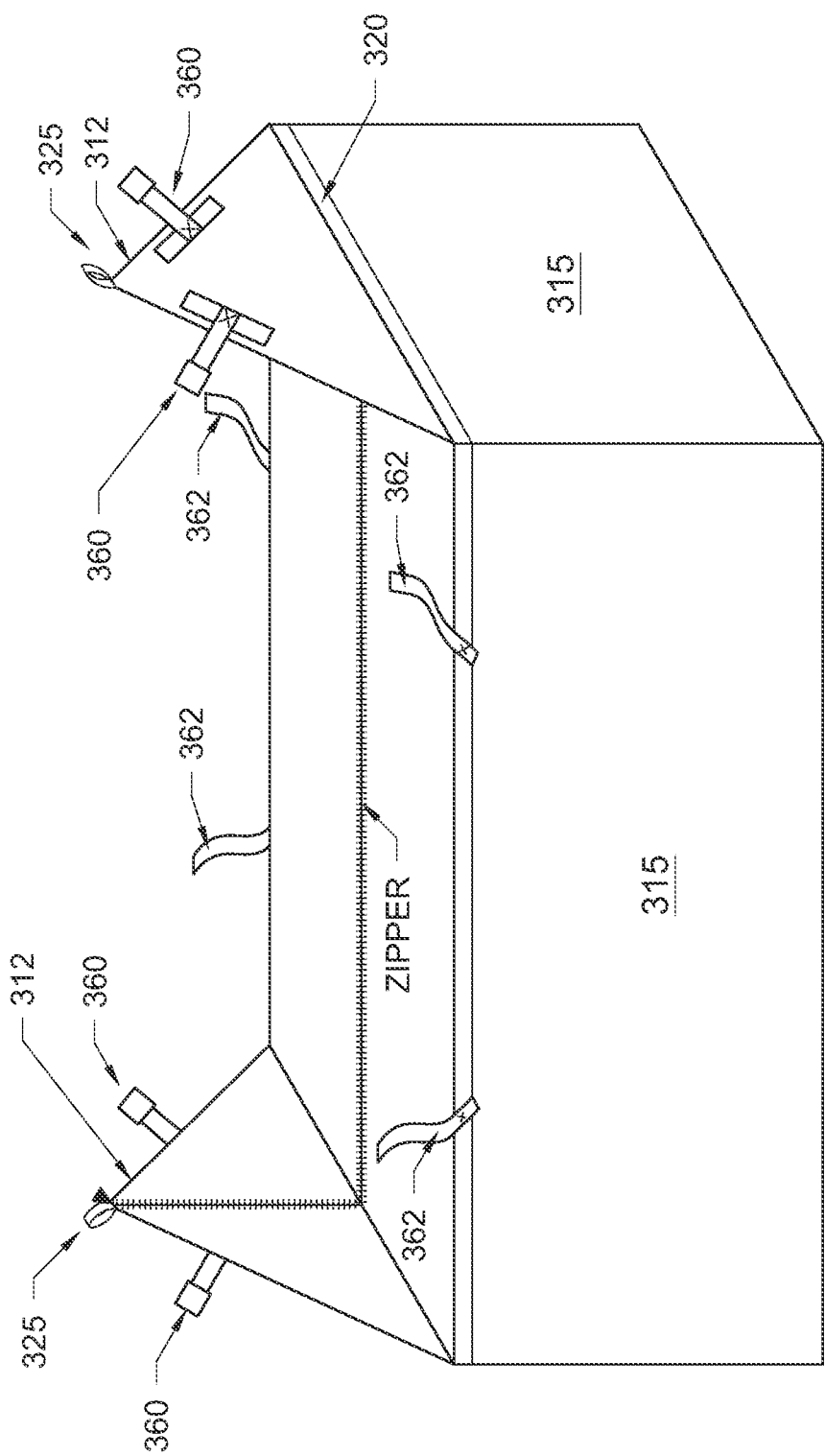

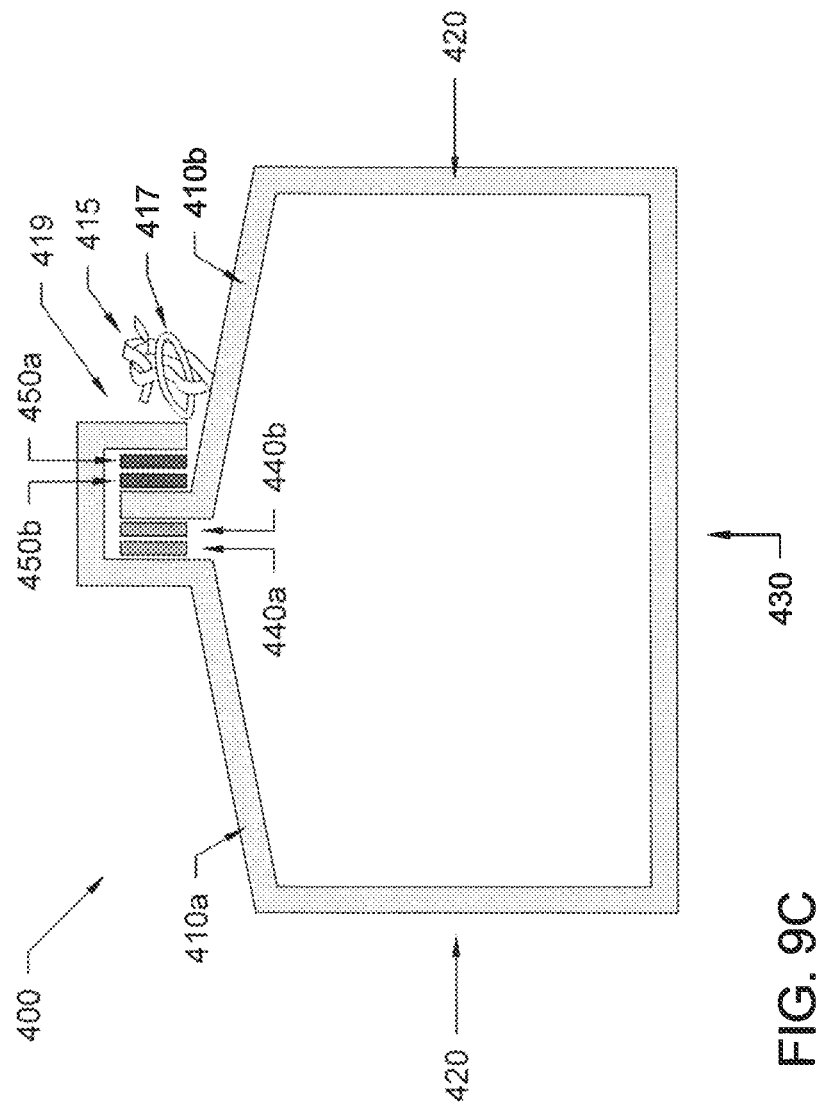

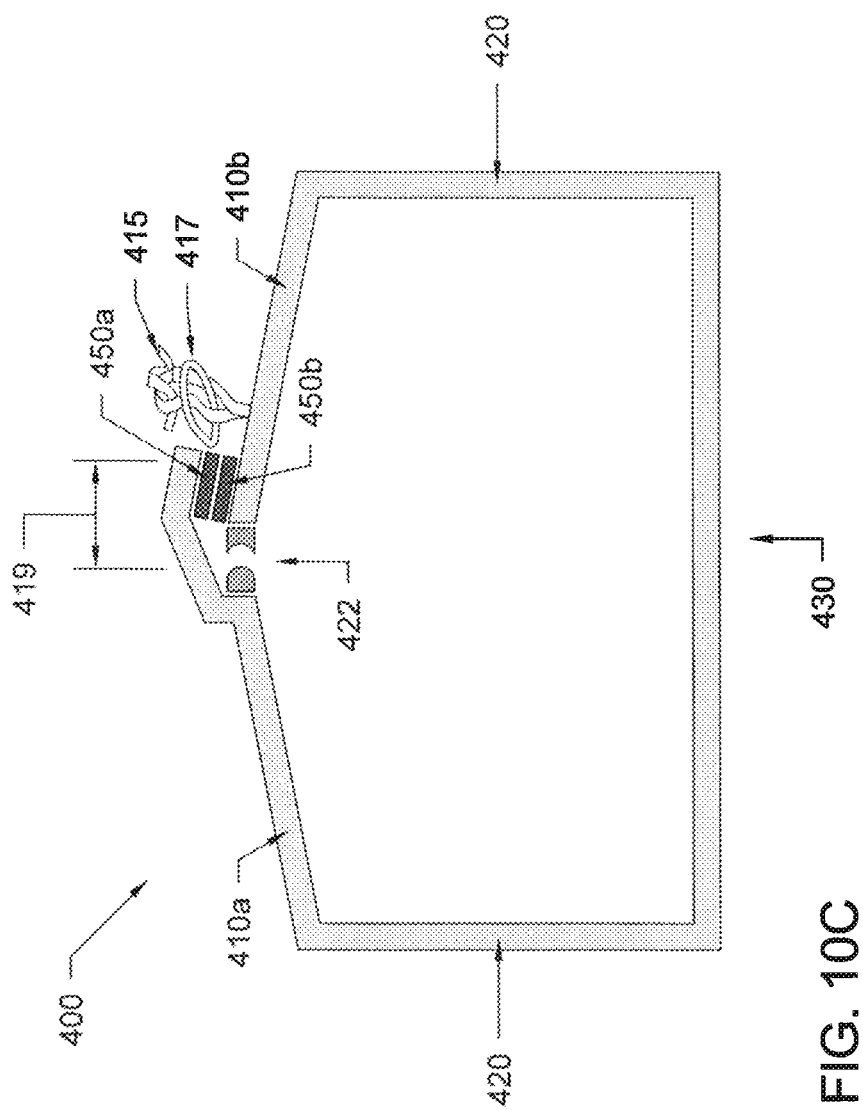

INDUSTRIAL CONTAINMENT BAGS FOR BULK MATERIALS, WASTE MATERIALS AND/OR HAZARDOUS MATERIALS WITH VARYING LEVELS OF RADIOACTIVITY

This non-provisional application claims priority to and the benefit of U.S. Provisional Application No. 62/829,761, filed on Apr. 5, 2019, herein incorporated in its entirety by reference.

FIELD OF THE INVENTION

The invention pertains to new and improved industrial containment bags which can be used for transporting, disposing and/or storing of: (a) hazardous materials with varying levels of radioactivity, (b) industrial bulk materials, and/or (c) industrial waste materials; as well as, methods of manufacturing, using, filling, lifting, transporting, storing, and/or disposing of such bags.

BACKGROUND OF THE INVENTION

Methods of, and apparatus for, transporting, storing and/or disposing of cargo (or goods) are as varied as the cargo itself. As for transporting, that involves moving one or more items of the cargo from one place (i.e., the point of origin) to another place (i.e., the destination point). The cargo may be said to be "shipped" or "transported" from the point of origin to the destination point.

When the items of the cargo are loose, such items are not contained for transport by other than the walls or the bottom or the top of the transport vehicle (e.g., a railroad car, a dumpster, a truck, etc.) that is used for the transport. Thus, the loose items are not in packages or boxes when they are transported. Such loose cargo is said to be transported "in bulk" and may be referred to as industrial "bulk cargo" or as industrial "bulk goods".

Transportation of industrial bulk materials and wastes in the United States is regulated by the United States Department of Transportation. For normal bulk cargo, such as plastic pellets for extruding machines or bulk foodstuffs, the regulations are relatively simple, as compared to regulations controlling the transport of industrial wastes and/or industrial hazardous materials. Such industrial wastes and/or industrial hazardous materials may include waste generated during manufacturing operations, such as toxic chemicals, or waste resulting from discarding a product after use, e.g., polychlorinatedbiphenols ("PCBs") which were in electrical transformers. Although such toxic chemicals and PCBs are closely regulated at the state and Federal levels, industrial hazardous materials that are radioactive or that are nuclear wastes ("radioactive hazardous material waste") are even more closely regulated. Such radioactive hazardous material waste includes materials resulting from the manufacture of weapons (e.g., radioactive dirt) and radioactively contaminated demolition debris (e.g., building materials, concrete pillars and beams and scrap steel found, for example, at sites which are being dismantled). Radioactive hazardous material waste may include radioactive materials that meet criteria as "low level radioactive" radioactive hazardous material waste, which while being radioactive, their level of radioactivity is typically two picocuries or less.

Regulations controlling the containment, transportation, disposal and/or storing of such radioactive hazardous material waste include the following:

(i) a complete accountability and documentation of every pound of radioactive hazardous material waste;

(ii) state licensing of certain containers in which radioactive hazardous material waste is transported, e.g., licensing of intermodal containers ("IMCs"), which includes documenting the transport of such IMCs;

(iii) Federal, local, and state control of the movement of radioactive hazardous material waste at or from a site at which the radioactive hazardous material waste was generated (the "remediation site");

(iv) requirements that the containers in which radioactive hazardous material waste is transported either does not become contaminated with the radioactive hazardous material waste, or if they become contaminated, that such contaminated containers be decontaminated after use;

(v) prohibitions against transferring loose (uncontained) radioactive hazardous material waste from one transport container to another, and if radioactive hazardous material waste is to be transferred from one transport vehicle to the next transport vehicle, requiring that the radioactive hazardous material waste be contained within a licensed container prior to and during the transfer;

(vi) establishing "exclusionary zones" at sites at which radioactive hazardous material waste is located, defining Personal Protection Levels ("PPLs") which vary according to the level of radioactivity of the radioactive hazardous material waste, and requiring that personnel who enter such "exclusionary zones" wear clothing suitable for protecting against injury from the radioactive hazardous material waste (i.e., personnel must be "suited up") according to the applicable PPL; and (vii) prohibitions against allowing loose liquid ("free liquid") from being transported in anything other than a special tank car (whether via railroad or truck); for example.

If the point of origin (e.g., the remediation site) does not have a railroad spur on-site (i.e., if it is not "rail-served"), such transporting can be "intermodal", such as via truck (one mode) from the remediation site (the point of origin) to a nearby railroad for long-distance railroad transport (another mode) to the destination point. If the destination point is not rail-served and the licensed container is an intermodal container ("IMC"), the railroad can be used to deliver the licensed IMC (which contains radioactive hazardous material waste) to an intermodal railyard near the destination point. At the intermodal railyard, such licensed IMC can be taken off the railroad car and put on a truck for further transport to the destination point (e.g., a storage site for the radioactive hazardous material waste). Such IMC may be moved within the storage site to a "cell" to which the radioactive hazardous material waste from the particular point of origin is assigned for storage.

Radioactive hazardous materials are said to be "stored" because the radioactive materials of such hazardous material waste do not decompose in the manner of other hazardous material waste, due to the very long half-life of radioactive materials. Hazardous material waste that does not contain radioactive materials is said to be "disposed of", or put into a landfill for "disposal", because it decomposes over a relatively short time period, e.g., a few years.

Low level radioactive contaminated hazardous solid waste materials and debris are generated during industrial maintenance, spill response, and building decontamination projects. Such debris can include piping, pumps, valves, duct work, process tanks, wooden and concrete flooring, spill control booms, personnel protective equipment (PPE), soils and a wide variety of other solid items. Disposal of such radioactive contaminated hazardous waste materials is a major concern, especially in the United States. Low level radioactive contaminated wastes are defined in the *Low-level*

*Radioactive Waste Policy Act* of 1985, as later amended (including Class A, B and C wastes) 40 USC 2021, and also in 10 CFR 61.2.

Low level radioactive wastes are generally defined as radioactive waste not classified as high-level radioactive waste (those being transuranic waste, spent nuclear fuel, or byproduct material as defined in Section 11e (2) of the *Atomic Energy Act* (AEA)). Low level radioactive wastes characterization does not depend upon the level of radioactivity it contains. Solid wastes are defined in *Resource Conservation and Recovery Act* (RCRA).

Hazardous wastes are solid wastes meeting certain criteria as established in (and regulated by) the RCRA—See e.g., 40 CFR Part 261. Mixed Wastes are a specific class of hazardous wastes and include a mix of low-level radioactive wastes and hazardous wastes. Such mixed wastes are regulated by both the RCRA and the AEA. While these types of contaminated materials are generally disposed in landfills, the contaminated solid materials have to be properly treated and "packaged" for disposal to reduce the potential for spread of contamination by leachate. While the materials of concern are solid materials (as opposed to liquid), some entrained liquids may be present in the materials. In the following, the materials are understood to be such solid low-level radioactive contaminated hazardous wastes or "mixed wastes" (as classified by the Department of Energy and the Nuclear Regulatory Commission).

Generally, the contaminated materials are stored on site in temporary containers, such as metal drums or boxes. For transport and disposal, the materials are moved out of the temporary storage containers to an approved disposal container and the approved disposal container is then buried in a landfill. An approved disposal container is generally a highly corrosion resistant container, such as a stainless-steel container or a plastic drum or box. Prior to the burying of the approved disposal container, the container will be sealed shut, such as by welding the container top shut to prevent fluids from entering or exiting the container. Standard metal boxes or standard metal drums cannot be used for ultimate disposal, unless the hazardous materials in the interior of the metal box are encased in an encapsulating material within the metal container, such as Portland cement. However, encasement of the materials makes that container extremely heavy, and presents significant problems in shipping due to the weight.

Low-level radioactive hazardous waste materials may be disposed of using a macroencapsulation technique. In the industry, the term "macroencapsulation" is defined as the encapsulation of the hazardous materials with: (1) surface coating materials, or (2) the use of a jacket of inert inorganic materials to substantially reduce surface exposure to potential leaching media. The treatment objective of macroencapsulation is to meet the treatment standards for debris as specified in 40 CFR 268.45 and radioactive lead solids as specified in 40 CFR 268.40 and 40 CFR 268.42. Depending upon the size and weight of the waste and the radiation hazard presented by that waste either a commercially available macroencapsulation unit or a custom macroencapsulation process will be used.

Conventional industrial containment bags are typically not used for disposal of debris having many sharp or jagged edges, as the integrity of the bag with such sharp-edged debris could be jeopardized. For disposal of these types of materials, the standard macroencapsulation techniques are used. These include placing the wastes in a stainless-steel box or plastic drum, or encased in Portland cement in a standard metal box.

The United States guidelines specify testing requirements that certain packaging must undergo to be certified—see e.g., 49 CFR 173.465. Included in these testing/certification procedures are a free drop test and a stacking test. The free drop test requires a package to be loaded or filled to its design weight capacity and dropped from a specific height (e.g., 1-10 feet, depending on design, weight, and/or materials contained therein) and to maintain structural integrity after impact. The stack test requires a loaded package to be subject to a compressive load of, for example, 2-10 times the actual capacity weight of the package. Such testing requirements place substantial restrictions on possible construction of the packaging. For packaging that comprises a flexible bag capable of being lifted when loaded, the drop test and stack test present heavy design hurdles—see generally, 49 CFR 173 (incorporated herein in its entirety by reference) and specifically Subpart I. Certain packaging design guidelines for Industrial Packaging, Types 1, 2, or 3, or Type A package (see e.g., 40 CFR 173.403).

Transportation of industrial bulk materials, industrial wastes and/or industrial hazardous materials with varying levels of radioactivity is similarly regulated in Europe and other parts of the world. Industrial containment bags designed to large scale storage and transportation are typically adapted to carry loads in excess of 10,000 pounds.

Notwithstanding the extensive use of the industrial containment bags throughout the world, studies of such conventional methods of, and apparatus for, manufacturing, using, filling, lifting, transporting, storing and/or disposing of the same have shown that fairly significant problems exist that have yet to be remedied. Many of these problems pertain to the bags' closure systems, as well as to the inherent flexible nature of industrial containment bags.

For example, since industrial containment bags can be used to lift, transport, store and/or dispose of tens of thousands of pounds of industrial wastes—some of which are highly toxic and/or radioactive, it is critical that the bags' closure system(s) maintain secure once sealed, and that such closure system(s) remain uncompromised during typical lifting, transporting, storing and/or disposing processes. For, if a closure system of an industrial containment bag containing thousands of pounds of highly toxic or radioactive material was to fail, the results will most likely be catastrophic and extremely dangerous to the surrounding people and environment.

Moreover, since industrial containment bags inherently have at least a partially flexible nature, during their lifting and transporting processes, materials contained therein often times shift. This, in turn, can result in there being an uneven load distribution in the bag. Such unevenness can cause the bag to tip over and/or to slip off of its lifting or transportation device. If this was to occur, the integrity of the bag's closure system (and/or the bag's outer surface itself) can be compromised. As stated above, if an industrial containment bag containing thousands of pounds of highly toxic or radioactive material was to fail, this will produce catastrophic and extremely dangerous results.

Accordingly, those in the industrial containment bag industry are continually seeking new and better processes and technologies, not only for sealing such bags (especially those designed for containing toxic or radioactive wastes); but also, for insuring that such bags remain sealed while they are being handled. Accordingly, if there were methods and/or technologies that can improve the overall integrity of such a bag during its lifting, transporting, storing and/or disposing processes (e.g., by providing methods/technologies for improving the integrity and sealing capabilities of the closure system(s) being employed in industrial containment bags and/or by providing methods/technologies for assessing the load balance of the materials being contained therein so that, if necessary, adjustments can be made before something catastrophic was to occur), such would be overwhelmingly welcomed by all in the industry as a great advancement in the art.

Therefore, one object of this invention is to provide new and improved industrial containment bags wherein the improvement comprises improving the integrity of such bags by providing a means for improving the sealing capabilities of the bags' closure system(s)—including methods of manufacturing, using, filling, lifting, transporting, storing, and/or disposing of such improved bags.

Another object on this invention is to provide new and improved industrial containment bags wherein the improvement comprises improving the integrity of such bags by providing a means for assessing the load balance of the materials being contained therein; and thereafter, compensating for any significant load imbalances—including methods of manufacturing, using, filling, lifting, transporting, storing, and/or disposing of such improved bags.

Other objects will become apparent to those skilled in the art as the various embodiments of the invention become better understood by reference to the following DETAILED DESCRIPTION, especially when such is considered together with the accompanying CLAIMS appended hereto, and the FIGURES, briefly described below.

BRIEF SUMMARY OF THE INVENTION

Briefly, the present invention is directed to new and improved industrial containment bags wherein the improvement comprises providing methods and technologies for improving the integrity of such bags during processes designed for lifting, transporting storing and/or disposing of the same. In certain embodiments of this invention, the bags' improved integrity is provided by new and unique methods and technologies for improving the sealing capabilities of the bags' closure system(s). In other embodiments of this invention, the bags' improved integrity is provided by new and unique methods and technologies for assessing the load balance of materials being contained in such industrial containment bags; and thereafter, compensating for any significant load imbalances. The present invention is also directed to methods of manufacturing, using, filling, lifting, transporting, storing, and/or disposing of such new and improved industrial containment bags.

BRIEF DESCRIPTION OF THE DRAWINGS

The present invention is illustrated by way of example, and not by way of limitation, in the figures of the accompanying drawings, in which:

FIG. 6A is a perspective view of another embodiment of a new and improved industrial containment bag encompassed by this invention, wherein the bag comprises: (a) a centrally-positioned closure system which creates two-opposing triangular-shaped folds when closed, and (b) another means for independently securing each of such triangular-shaped folds to the bag's top portion;

FIG. 9C is a cross-sectional view of the industrial containment bag of FIG. 9A with the bag's opening in a fully-closed position;

FIG. 10C is a cross-sectional view of the industrial containment bag of FIG. 10A with the bag's opening in a fully-closed position;

DETAILED DESCRIPTION OF THE INVENTION

Figure 1:
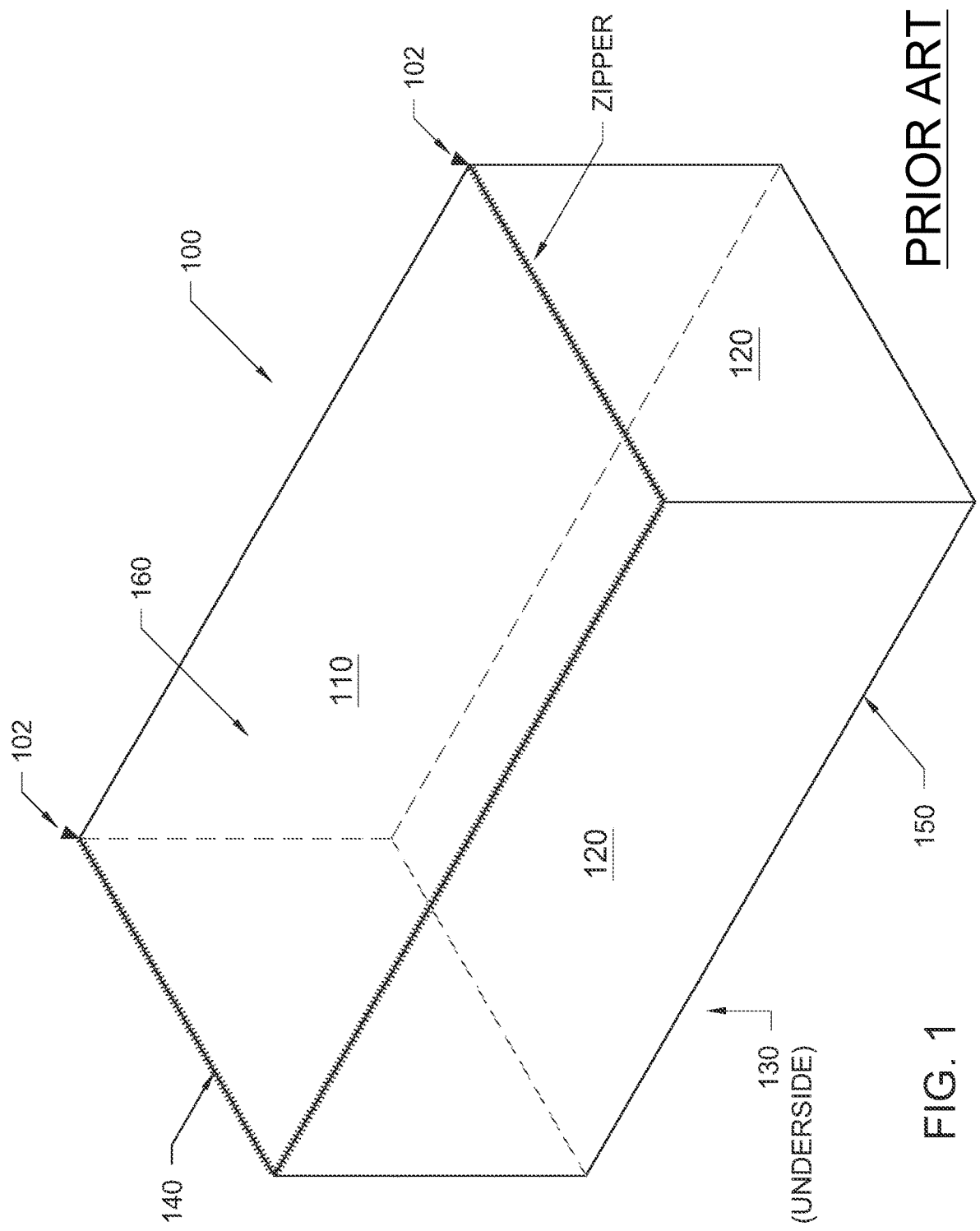
FIG. 1 is a perspective view of a prior art industrial containment bag with a single closure system positioned directly on the bag's top perimeter edge.

Unless defined otherwise, all technical terms used herein have the same meanings as commonly understood by those of ordinary skill in the art. While specific devices and methods are being described, any devices and methods that are similar or equivalent to those described herein can be used in the practice of, and are encompassed by, the present invention. This includes such similar or equivalent devices and methods which have not yet been discovered or developed, but after being discovered or developed would have been obvious to use or implement to those skilled in the art at the time that this invention was made.

In the following description, details are set forth in order to provide a more thorough understanding of the present invention. That being said, it will be apparent to skilled artisans that the various embodiments of the invention disclosed herein may be practiced without all of the recited specific details.

The present invention is directed to new and improved industrial containment bags, wherein the improvement comprises providing methods and technologies for improving the integrity of such bags such that they can better withstand subsequent lifting, transporting, storing and/or disposing processes. The present invention is also directed to methods of manufacturing, using, filling, lifting, transporting, storing, and/or disposing of such new and improved bags.

In one embodiment of this invention, the new and improved industrial containment bags comprise a closure system centrally-positioned on the bag's top portion. A bag with this type of a closure system configuration forms two-opposing triangular-shaped folds when the closure system is in its closed position. In this particular embodiment, the improvement comprises providing a system for independently securing the formed triangular-shaped folds to the bag's top and/or sidewall portion(s).

In another embodiment of this invention, the new and improved industrial containment bags comprise a system for reducing the torsional forces exerted on the bag's closure system(s). This embodiment's closure pressure-relieving system is designed and configured to carry at least some of the outwardly-displaced torsional forces exerted onto the bag's closure system when the filled bag is lifted, transported, stored and/or disposed. In certain preferred embodiments, the closure pressure-relieving system is designed and configured such that, in addition to carrying at least some of the outwardly-displaced torsional forces exerted onto the bag's closure system when the bag is handled, it also places an additional cover over portions of the bag's closure system.

In yet another embodiment of the invention, the new and improved industrial containment bags comprise a system for assessing the load balance of materials being contained therein. By being able to make such an assessment, the end user will know whether any adjustments need to be made to the load, itself, and/or to any subsequent lifting, transporting, storing and/or disposal process(es), to compensate for any significant load imbalances. This is accomplished through the integration of at least one inspection flap integrated onto the bag (e.g., on its top and/or sidewall portion). Specifically, with the utilization of such an inspection flap system, prior to a filled bag being handled, the end user can assess how the load is positioned within the confines of the bag to determine whether any, and/or what, measures need to be taken to minimize problems that may occur during a subsequent lifting, transporting, storing and/or disposal process(es) (e.g., opening the bag and readjusting the load, adjusting the weight-bearing configuration of the lifting system, adjusting how the bag is secured during transportation, etc.)

FIGS. 1-3 and FIGS. 4A-4E illustrate various examples of conventional (prior art) industrial containment bags that can be improved by the implementation of one or more embodiments of this invention.

FIG. 1 is a perspective view of a prior art industrial containment bag with a single closure system positioned directly on the bag's top perimeter edge. In FIG. 1, industrial containment bag 100 can be "self-supporting" (i.e., able to stand in an upright and opened position without the use of an external supporting structure when empty) or "non self-supporting" (i.e., requires the use of an external supporting structure to be able to stand in an upright and opened position when empty). Below, there is a more detailed description of what constitutes "self-supporting" and "non self-supporting" industrial containment bags.

For illustrative purposes only, the containment bag shown in FIG. 1 will be deemed to be a "non self-supporting" bag. Accordingly, containment bag 100 is made entirely of non self-supporting materials. Since containment bag 100 is non self-supporting, it is designed to be used in conjunction with an external supporting structure such as, for example, a "dumpster-type" container (defined infra.) or a "loading frame" (defined infra.).

It should be noted that, when used with such supporting structures, non self-supporting bags typically employ some method for holding their sidewalls in an upright position within the structure so that the bag's opening substantially aligns with the supporting structure's opening when the bag is empty. One example of such a method used in the industry to hold up the bag's sidewalls employs the use of a series of straps having one end which is attached to the external surface of the bag's sidewalls and another end, which is lose (a.k.a. "hold-up straps"). In practice, after a non self-supporting bag is placed into the open cavity of its supporting structure, the hold-up straps' loose ends are pulled outwardly until the bag's opening substantially aligns with the supporting structure's opening; and thereafter, secured in that position by being affixed to the outside wall of the support structure (see, e.g., FIGS. 11A and 11B). This particular hold-up method is typically employed with non self-supporting bags that have an opening which is position directly on, or aligned with but inwardly spaced from, the bag's top perimeter edge. Another example of a conventional method used in the industry to hold up the walls of a non self-supporting bag when it is empty and positioned within a supporting structure is to fold the upper portion of the bag's sidewalls over the edge of the supporting structure's walls. This method can only be used with bags having a closure system centrally-positioned on the bag's top portion when closed (see, e.g., FIG. 4B).

In this specification, unless otherwise stated, industrial containment bags identified herein as being "non self-supporting" are to be assumed as employing some sort of a method for holding their sidewalls in an upright position within a supporting structure when the bag is empty—even if a particular hold-up method is not disclosed or illustrated for that particular industrial containment bag. It is also to be assumed that, unless otherwise stated, such methods for holding the sidewalls of non self-supporting bags in an upright position within a supporting structure when the bag can either be any conventional method known in the industry, or any new method that may be invented in the future.

In addition to the above, regardless of whether the industrial containments encompassed by this invention are self-supporting or non self-supporting, it may be desirable to lift or move those bags once filled. Regarding prior art containment bags where subsequent lifting/moving is desired, there are many ways in which this can be accomplished. Examples of conventional containment bag lifting/moving techniques include, without limitation, the use of the following: (a) a fork lift or pallet system designed to lift the bag from its top or bottom; (b) "pull straps" designed to pull/slide the bag; (c) a lifting strap system where the straps are everywhere detached from the bag (see, e.g., U.S. Pat. No. 8,894,281 (the '281 patent), U.S. Pat. No. 8,894,282 (the '282 patent), U.S. Pat. No. 9,365,345 (the '345 patent) and U.S. Pat. No. 9,493,299 (the '299 patent)—all of which are herein incorporated in their entirety by reference); (d) a lifting strap system where the straps are attached (e.g., sewn) to the bag's bottom and sidewalls (see, e.g., U.S. Pat. No. 6,155,772 (the '772 patent) and U.S. Pat. No. 6,079,934 (the '934 patent)—all of which are herein incorporated in their entirety by reference); and (e) a lifting strap system where the straps are attached to the bag's bottom, but not to the bag' sidewalls (see, e.g., "*Soft-Sided Waste Containers*" published by the U.S. Department of Energy in July 1999—the "Innovative Technology 1999 Report"). If/When it becomes desirable to lift/move industrial containment bags encompassed by the present invention, unless otherwise stated, such bags are assumed employ some sort of a method for doing the same (—even if a particular lifting/moving method is not disclosed or illustrated for that particular industrial containment bag. It is also to be assumed that, unless otherwise stated, such methods for lifting/moving such bags can either be any conventional method known in the industry, or any new method that may be invented in the future.

Referring now back to FIG. 1, containment bag 100 may be made of woven or non-woven materials. Examples of materials that can be used to make bag 100 include, without limitation, the following: a woven polypropylene, a polyvinyl chloride (PVC)—reinforced or non-reinforced, a woven or non-woven polyethylene, or other suitable materials, such as woven fiberglass. The bag material from which containment bag 100 is made can also be coated. Examples of materials that can be used to coat the material making up bag 100 include, without limitation, the following: a polyethylene or polypropylene coating placed on the interior or exterior of the bag.

Bag 100 has a top portion 110, sidewall portions 120, and a bottom portion 130 (not shown). Top portion 110 is parallel to, and laterally spaced above, bottom portion 130; bottom portion 130 is parallel to, and laterally spaced below, top portion 110; and sidewall portions 120 are perpendicular to the bag's top and bottom portions and positioned therebetween.

The path along which sidewall portions 120 interconnect with top portion 110 creates the bag's top perimeter edge 140. Similarly, the path along which sidewall portions 120 interconnect with bottom portion 130 creates the bag's bottom perimeter edge 150.

Bag 100 has one primary closable opening/flap 160 located on its top portion 110. In FIG. 1, closable opening/flap 160 encompasses the entire top of the bag and is in its closed position.

In FIG. 1, top portion 110 is secured in its closed configuration with a zipper closure system which transverses a "U-shaped" path along three sides of closable opening/flap 160. The portion of the bag's top perimeter edge without a zipper functions as opening/flap 160's hinge. While it is possible for closure systems to be aligned with, but inwardly (or outwardly) positioned from, a bag's top perimeter edge, in the particular configuration illustrated in FIG. 1, the bag's zipper closure system is positioned directly on the bag's top perimeter edge 140.

One example of a preferred zipper closure system comprises a coil nylon zipper with at least one zipper pull 102 positioned on the zipper's tracks. If a zippered closure system is desired, there are a multitude of other types of zippers can be employed.

Bag 100 may optionally incorporate the use of a separate inner liner (not shown). Inner liners are often times useful when the stored materials are wet or liquids. If employed, one example of a material from which a suitable inner liner can be made is a low-density polyethylene. One particular illustrative example of a suitable inner liner that can be employed with the new and improved industrial containment bags encompassed by this invention is disclosed in U.S. Pat. No. 5,110,005 (the '005 patent)—herein incorporated in its entirety by reference. If employed, inner liners may be sewn to the inside wall surface of the outer bag or attached thereto by any other suitable means—e.g., glued, heat-sealed, etc.

Figure 2:
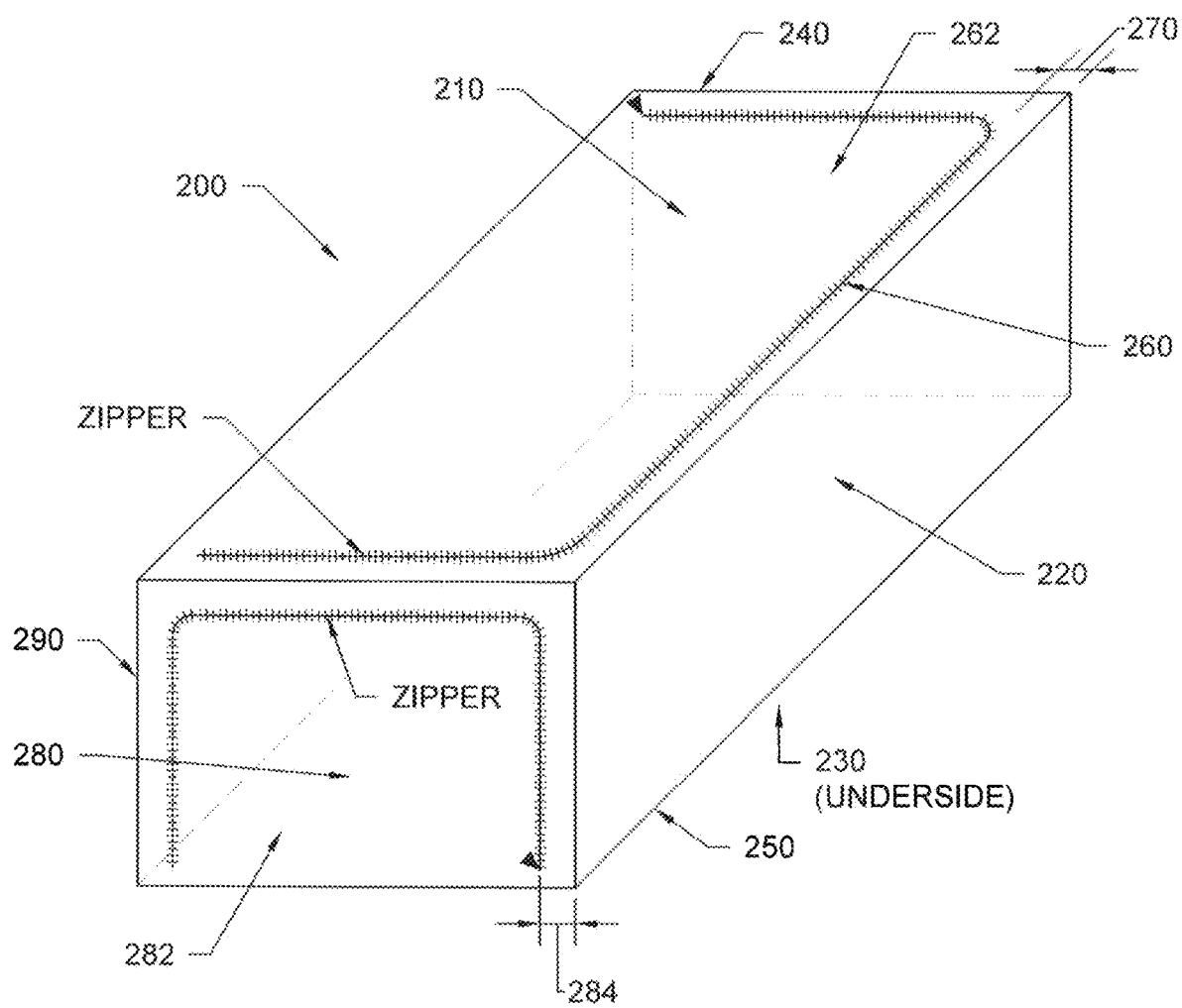
FIG. 2 is a perspective view of a prior art industrial containment bag with a first closure system aligned with, but positioned inward from, the bag's top perimeter edge, and an "optional" second closure system aligned with, but positioned inward from, one of the bag's side perimeter edges.

FIG. 2 is a perspective view of another prior art industrial containment bag with a first closure system aligned with, but inwardly spaced from, the bag's top perimeter edge, and an optional second closure system aligned with, but inwardly spaced from, one of the bag's side perimeter edges. In FIG. 2, industrial containment bag 200 can be self-supporting or non self-supporting. However, for illustrative purposes only, the containment bag shown in FIG. 2 is deemed to be non self-supporting. Accordingly, containment bag 200 is made entirely of non-self-supporting materials.

Since containment bag 200 is non-self-supporting, it is designed to be used in conjunction with a supporting structure such as, for example, a dumpster-type container or a loading frame. If used in this manner, bag 200 will need to employ some sort of a means to hold up its walls in a supporting structure (not shown here). Containment bag 200 may be made of woven or non-woven materials. The bag material from which containment bag 200 is made can also be coated.

Bag 200 has a top portion 210, sidewall portions 220, and a bottom portion 230 (not shown). Top portion 210 is parallel to, and laterally spaced above, bottom portion 230; bottom portion 230 is parallel to, and laterally spaced below, top portion 210; and sidewall portions 220 are perpendicular to the bag's top and bottom portions and positioned therebetween.

The path along which sidewall portions 220 interconnect with top portion 210 creates the bag's top perimeter edge 240. Similarly, the path along which sidewall portions 220 interconnect with bottom portion 230 creates the bag's bottom perimeter edge 250.

Bag 200 has one closable opening 260 located on top portion 210. In FIG. 2, closable opening 260 does not encompass the entire top of the bag. Rather, the bag's top portion 210 is comprised of a top flap portion 262 and a top edge portion 270. FIG. 2 shows the bag's top flap portion 262 in its closed position.

In this embodiment, top flap portion 262 is secured in its closed configuration with a zipper closure system which transverses a "U-shaped" path along three sides of closable opening 260. In this particular configuration, the bag's top zipper closure system is not positioned directly on the bag's top perimeter edge 240. Rather, here, the bag's top zipper closure system is aligned with, but inwardly spaced from, top perimeter edge 240.

The embodiment of the industrial containment bag illustrated in FIG. 2 also includes an optional second closable opening 280. In this illustrative example, closable opening 280 does not encompass the entire sidewall of the bag upon which it is configured. This particular sidewall portion of bag 200 is comprised of side flap portion 282 and side edge portion 284. FIG. 2 shows the bag's side flap portion 282 in its closed position.

In this embodiment, side flap portion 282 is secured in its closed configuration with a zipper closure system which transverses a "U-shaped" path along three sides of closable opening 280. In this particular configuration, the bag's side zipper closure system is not positioned directly on the bag's side perimeter edge 290. Rather, here, the bag's side zipper closure system is aligned with, but positioned inward from, its side perimeter edge 290.

Detailed descriptions of other illustrative examples of industrial containment bags similar to that shown in FIG. 2 (and thus can be improved by any of the embodiments of this invention) are set out in U.S. Pat. No. 8,562,212 (the '212 patent)—herein incorporated in its entirety by reference.

Figure 3:
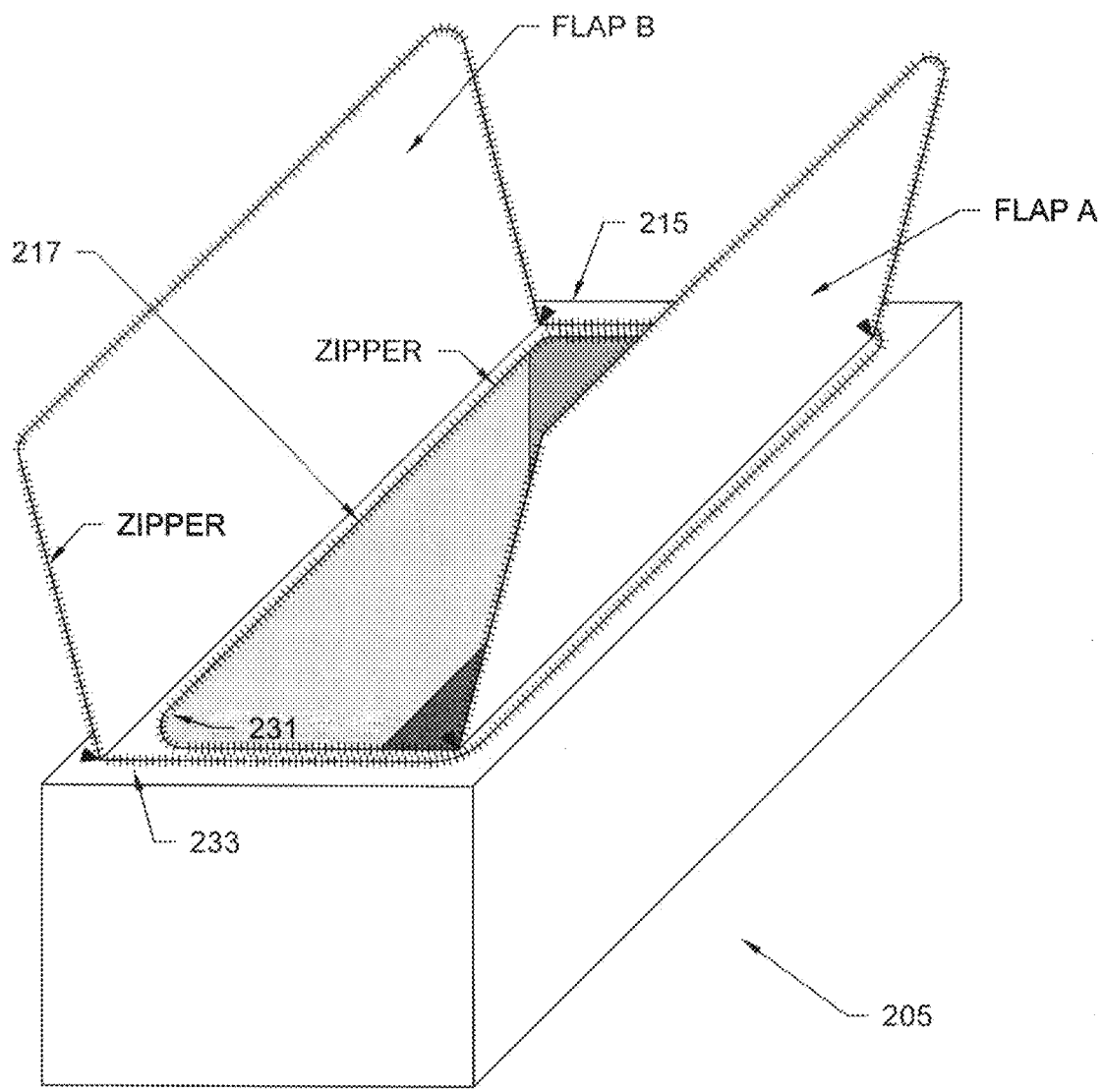
FIG. 3 is a perspective view of a prior art industrial containment bag with multiple closure systems positioned on the bag's top portion.

FIG. 3 is a perspective view of still another prior art industrial containment bag with multiple closure systems positioned on the bag's top portion. In FIG. 3, industrial containment bag 205 can be self-supporting or non self-supporting. However, for illustrative purposes only, the containment bag shown in FIG. 3 is deemed to be non self-supporting. As such, for this example, the containment bag in FIG. 3 is made entirely of non self-supporting materials.

Since containment bag 205 is non self-supporting, it is designed to be used in conjunction with a supporting structure such as, for example, a dumpster-type container or a loading frame. If used in this manner, bag 205 will need to employ some sort of a means to hold up its walls in a supporting structure (not shown here). Containment bag 205 may be made of woven or non-woven materials. The bag material from which containment bag 205 is made can also be coated.

Containment bag 205 is constructed of two separate layers of material: an inner material layer and an outer material layer. Both of these layers can be made of a woven or a non-woven material, or one can be made of a woven material while the other is made of a non-woven material. In addition, a liquid impervious material layer can, optionally, be sandwiched between the bag's inner and outer layers, or the bag's inner and/or outer layer, itself, can be made of a liquid impervious material.

In practice, such multiple-layered bags can be manufactured separately; and thereafter, one bag inserted into the other (i.e., a "nested relationship") until the desired number of layers making up the multiple-layered final product is achieved. The individual bags making up such a multiple-layered final product are then fixedly joined together (e.g., by stitching).

In one illustrative example, the innermost layer can be a bag which is made from a felt-like material that is puncture resistant. In such a situation, this felt-like material can further operate as a thin cushion; thus, helping to maintain bag integrity when materials are dumped therein. The bag's outer layer can be a bag which is made from a strong tear resistant material which helps keep the multi-layered bag system together during filling, lifting storing and/or disposing processes. This particular combination of such a two-layer containment system provides a resilient and strong industrial containment bag system.

Bag 205 has a primary top opening 217 that is sealingly closable. As shown, bag 205 has a top opening with two sealable flaps, FLAP A and FLAP B. The innermost sealable flap "FLAP A" is a continuation of the innermost bag layer; and the outermost sealable flap "FLAP B" is a continuation of the outermost bag layer.

As shown in FIG. 3, both FLAP A and FLAP B have a sealable closure system—closure 231 for FLAP A, and closure 233 for FLAP B. In the illustrative example shown in FIG. 3, closures 231 and 233 are both zipper closure systems. The closures for both FLAPS A and B are aligned with, but positioned inward from, their respective bag material layer's top perimeter edge.

As shown in FIG. 3, the FLAPS A and B are opposingly closable. This relationship is preferred, but not required. Particularly, the ability to close FLAPS A and B in opposition ensures that the long length-wise side of a zipper is not adjacent to another zipper; thus, making it more difficult for materials to penetrate through to the inside of the bag system.

Figure 4A:
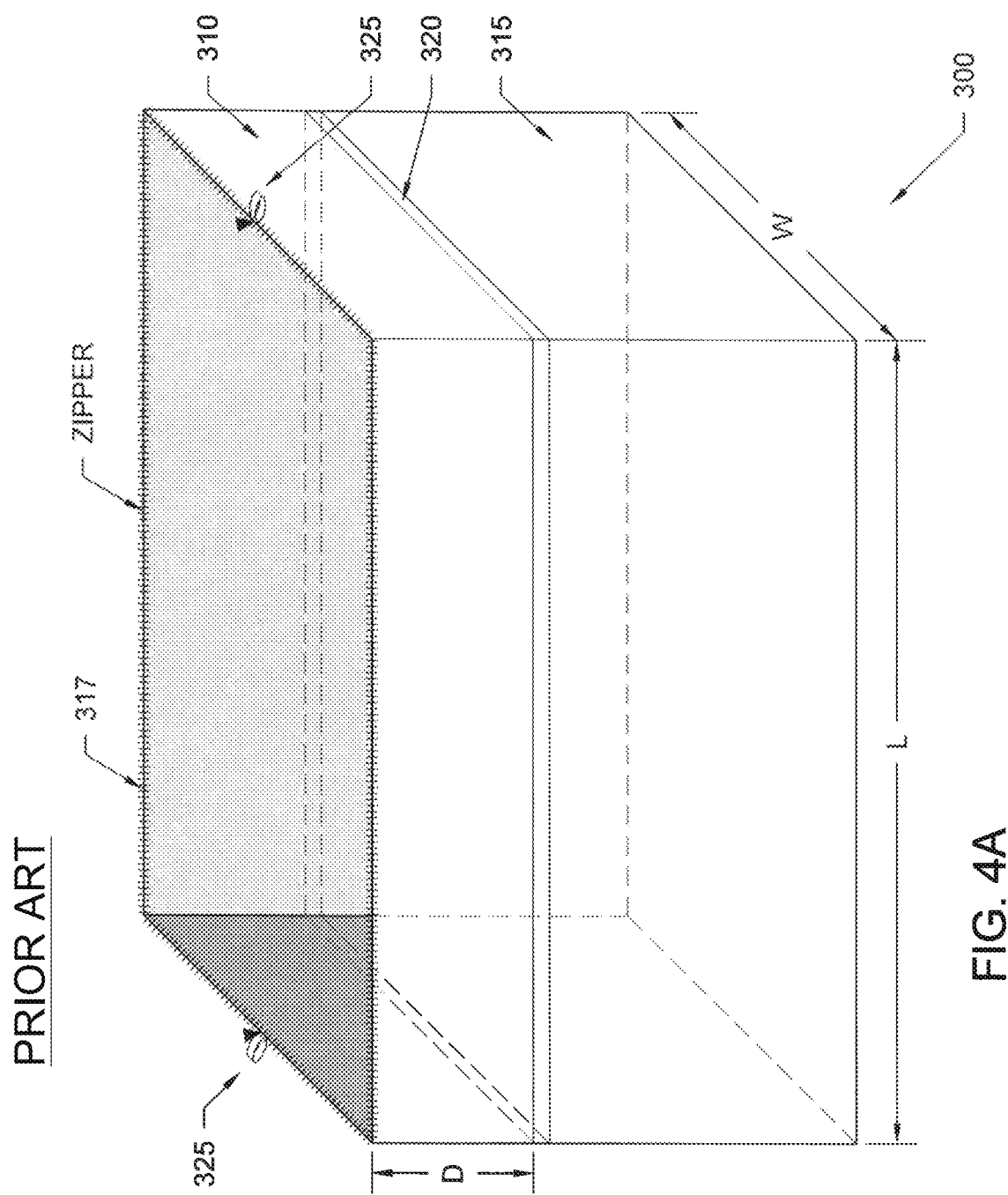
FIG. 4A is a perspective view of a prior art industrial containment bag with a closure system centrally-positioned on the bag's top surface which creates two-opposing triangular-shaped folds when closed, but is shown with this closure system in its opened position.
Figure 4B:
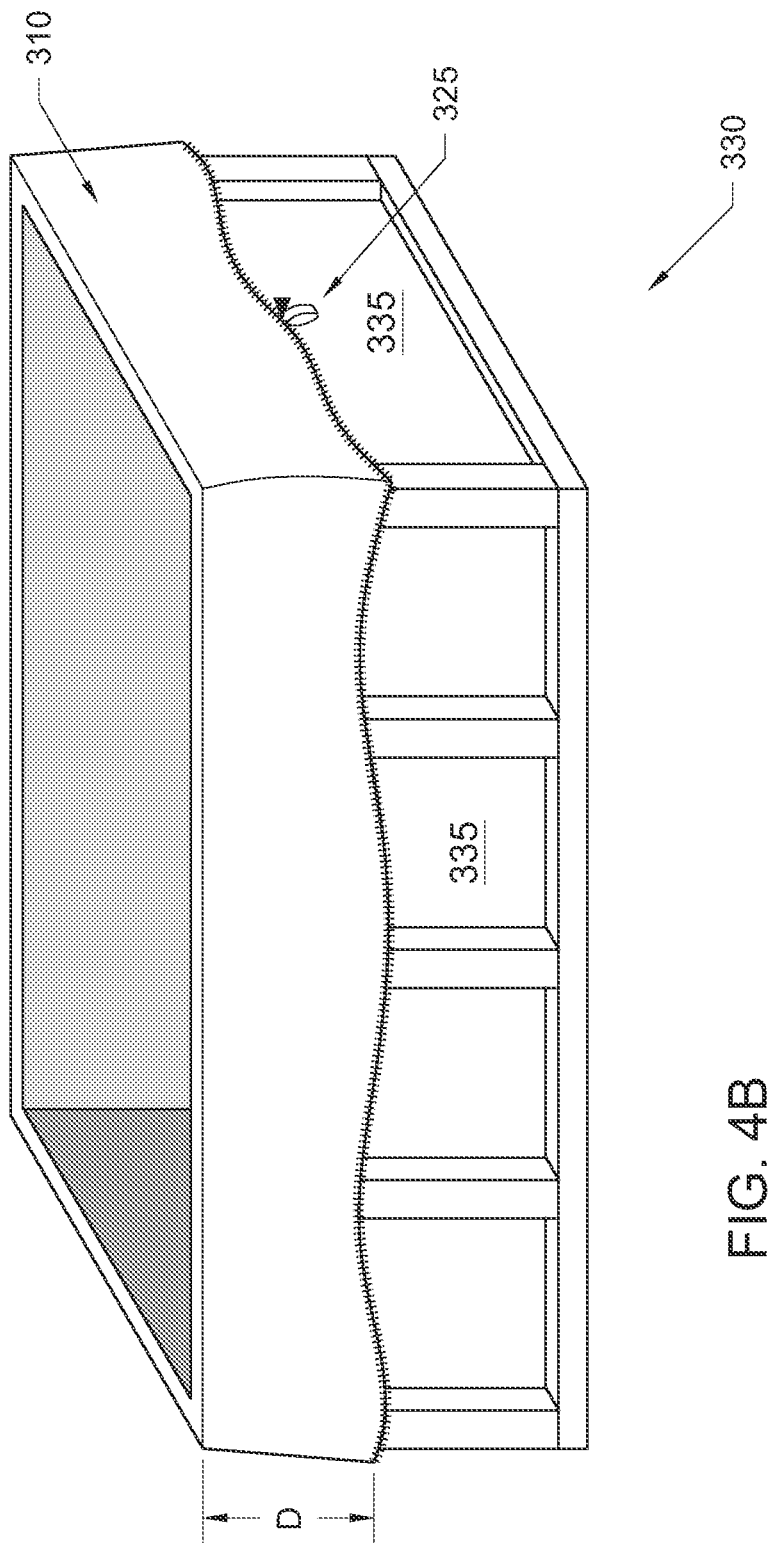
FIG. 4B is a perspective view of the prior art industrial containment bag of FIG. 4A placed in a dumpster-type container, with the bag's closure system in an opened position, and with a portion of the bag's top portion inverted over the sidewalls of the container.

It is also possible for either the inner bag layer or the outer bag layer, or both bag layers, to have a "duffel-type" configuration (see, e.g., FIGS. 4A and 4B). It is also possible for the inner bag layer to not be sealable in a closed position.

Another possible configuration of a multi-layered industrial bag configuration is that where each layer is sealed in a closed position by a different closure system. For example, if the inner bag layer has a "duffel-type" closure configuration and the outer bag has a "flap-type" closure configuration, the closure system for the "duffel-type" bag could be a "hook and loop" closure, while the closure system for the "flap-type" bag could be a zipper closure, or vice versa.

Detailed descriptions of other illustrative examples of an industrial containment bags similar to that shown in FIG. 3 are set out in U.S. Pat. No. 8,191,722 (the '722 patent)—herein incorporated in its entirety by reference.

FIGS. 4A-4E are perspective views of various embodiments of another type of a prior art industrial containment bag with a closure system centrally-positioned on the bag's top portion when in its closed position.

In FIG. 4A, industrial containment bag 300 can be self-supporting or non self-supporting. However, for illustrative purposes only, the containment bag shown in FIG. 4A is non self-supporting. As such, for this example, the containment bag in FIG. 4A is made entirely of non self-supporting materials.

Since containment bag 300 is non self-supporting, it is designed to be used in conjunction with a supporting structure such as, for example, a dumpster-type container or a loading frame. If used in this manner, bag 300 will need to employ some sort of a means to hold up its walls in a supporting structure (not shown here). Containment bag 300 may be made of woven or non-woven materials. The bag material from which containment bag 300 is made can also be coated.

Bag 300 has a "duffel-type" configuration having a length "L" and a width "W". With this configuration, the bag's sidewalls have an upper portion 310 and a lower portion 315. Bag sidewall lower portion 315 is typically configured such that its height is substantially aligned with the opening of the supporting structure in which it is placed for filling (i.e., the height of bag sidewall 315 is substantially the same as the height of the supporting structure's sidewalls). As such, bag sidewall upper portion 310 is designed to extend above the top opening of the supporting structure in which it is placed for filling (i.e., above the supporting structure's sidewalls).

In this particular illustration, the bag's side walls also have an "optional" fabric band 320 attached thereto which is positioned at essentially the level of the supporting structure's top opening.

In this configuration, the sidewall's upper portion 310 will be used to form the bag's closable top portion. The closure system for this "duffel-type" bag design is located along the upper edge 317 of sidewall upper portion 310. In the particular illustration, a zipper closure system is employed.

In FIG. 4A, the distance "D" that sidewall's upper portion 310 extends above the supporting structure's top opening (represented by band 320) is at least ½ W. Also, in this configuration, centered on each side the top edge of the W-side of the sidewall's upper portion 310 is an "optional" grasping means 325.

Figure 4C:
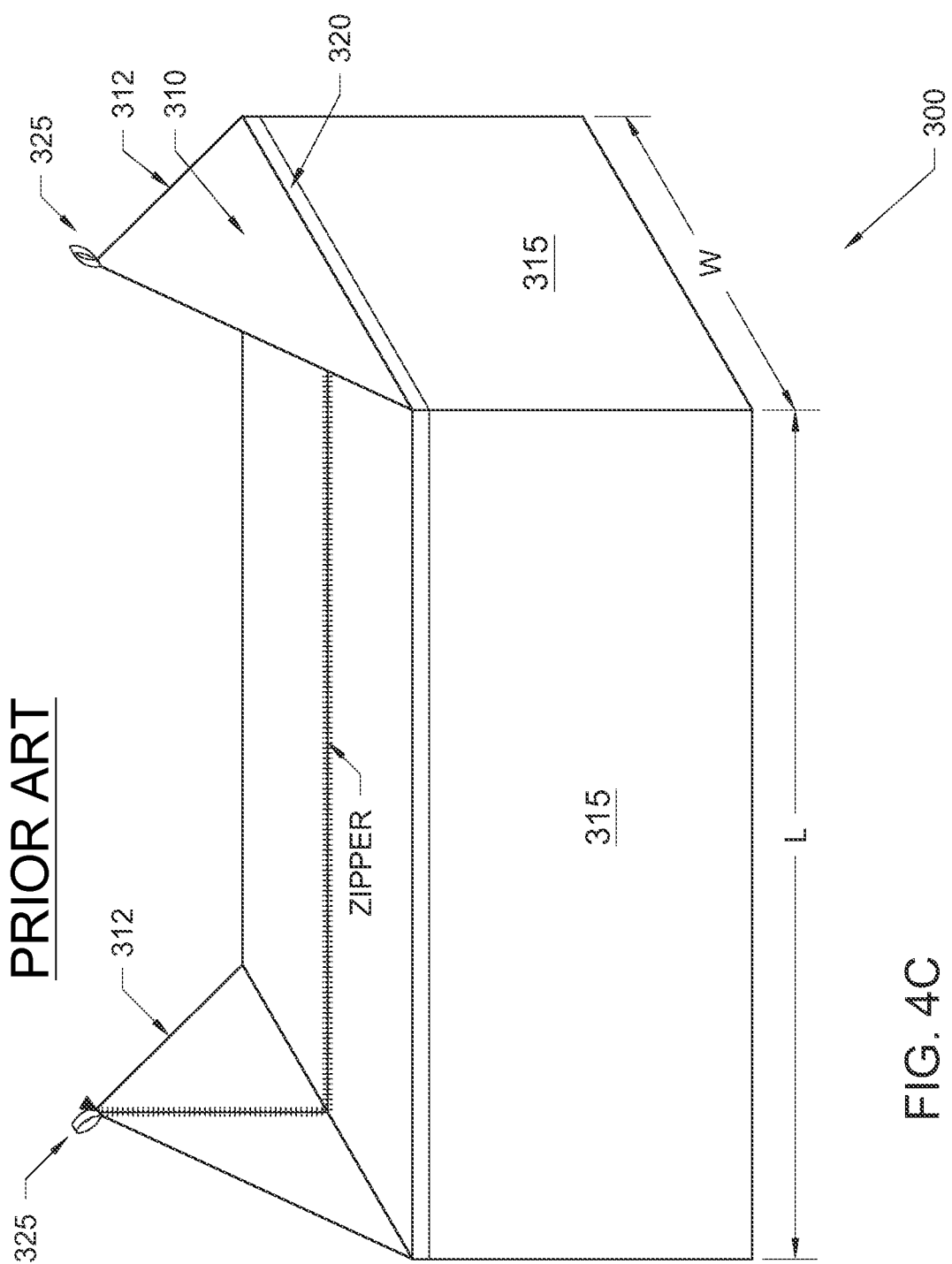
FIG. 4C is a perspective view of the prior art industrial containment bag of FIG. 4A with its closure system in a partially-closed position so as to form two-opposing triangular-shaped folds.

When the two grasping means 325 are both pulled outwardly and away from one another (i.e., outwardly and away from the W-side of the bag's sidewalls), the top edge 317 of the opposing L-sides of the sidewall's upper portion 310 are drawn together. When grasping means 325 are pulled to their respective furthest extent, the opposing L-sides of the sidewall's upper portion 310 come together to form the bag's top portion, as well as two opposing triangular-shaped folds on the opposing W-side of the containment bag. The top portion of bag 300 has a zipper closure system bisecting it down the center. FIG. 4C shows a "duffel-type" bag configuration with the closure system in its closed position.

FIG. 4B shows a conventional method wherein the bag sidewall's upper portion 310 is used to cover and protect a supporting structure's sidewalls during the filling process. Specifically, since the sidewall's upper portion 310 extends above the top of the supporting structure 330, this portion of the sidewalls can be inverted over the supporting structure's sidewalls 335. By employing this procedure, the sidewall's upper portion 310 cover and protect the supporting structure's sidewalls 335 during the filling process.

FIG. 4C shows a "duffel-type" bag configuration with the closure system in its sealed position. Specifically, as stated above, when grasping means 325 are pulled to their respective furthest extent, the opposing L-sides of the sidewall's upper portion 310 come together to form the bag's top portion, as well as two opposing triangular-shaped folds 312 on opposing the W-side of the containment bag. The top portion of bag 300 has a zipper closure system bisecting it down the center.

Figure 4D:
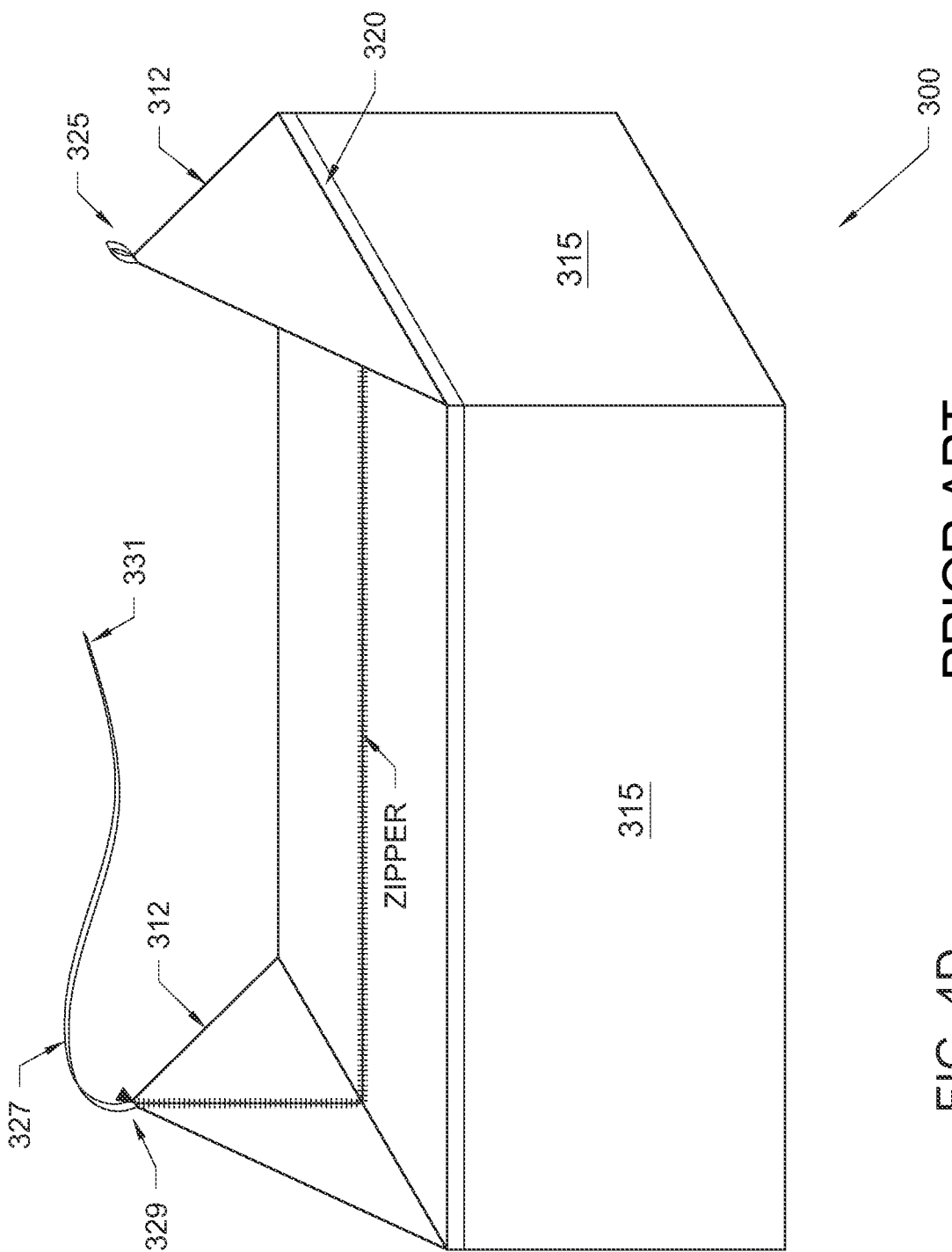
FIG. 4D is a perspective view of a prior art industrial containment bag with its closure system in a partially-closed position so as to form two-opposing triangular-shaped folds, and with a single linking strap (a.k.a. a "lineal connector") used to draw together the terminal ends of these two-opposing triangular folds.

When industrial containment bags have a "duffel-type" configuration as shown in FIG. 4A, in certain preferred embodiments, it is desirable to secure the opposing triangular-shaped folds in a manner where they do not dislodge or flap when a filled and secured bag is being transported from one location to another. FIG. 4D shows a method that has been used in the industry to secure the opposing triangular-shaped folds in a manner where they do not dislodge or flap when a filled and secured bag is being transported from one location to another.

Specifically, FIG. 4D shows a conventional "duffel-type" industrial containment bag in its partially closed position so as to form two opposing triangular-shaped folds 312. Positioned on the terminal end of one of the triangular-shaped folds is grasping means 325; and positioned on the terminal end of the opposing triangular-shaped fold is a linking strap 327. End 329 of linking strap 327 is fixedly attached to the triangular-shaped fold's terminal end, while the strap's other end 331 of linking strap 327 is loose. In the industry, such types of linking straps are also referred to as "lineal connectors".

Linking strap 327 has a length which is greater than the distance between the terminal ends of the two-opposing triangular-shaped folds when the folds are lying flat on the bag's top portion. Linking strap 327 is designed to have its loose end 331 slidingly pass through an opening in grasping means 325, and to be pulled back towards the fold's terminal end to which it is attached, resulting in the strap drawing the two terminal ends of the opposing triangular-shaped folds together (see, e.g., FIG. 4E).

Figure 4E:
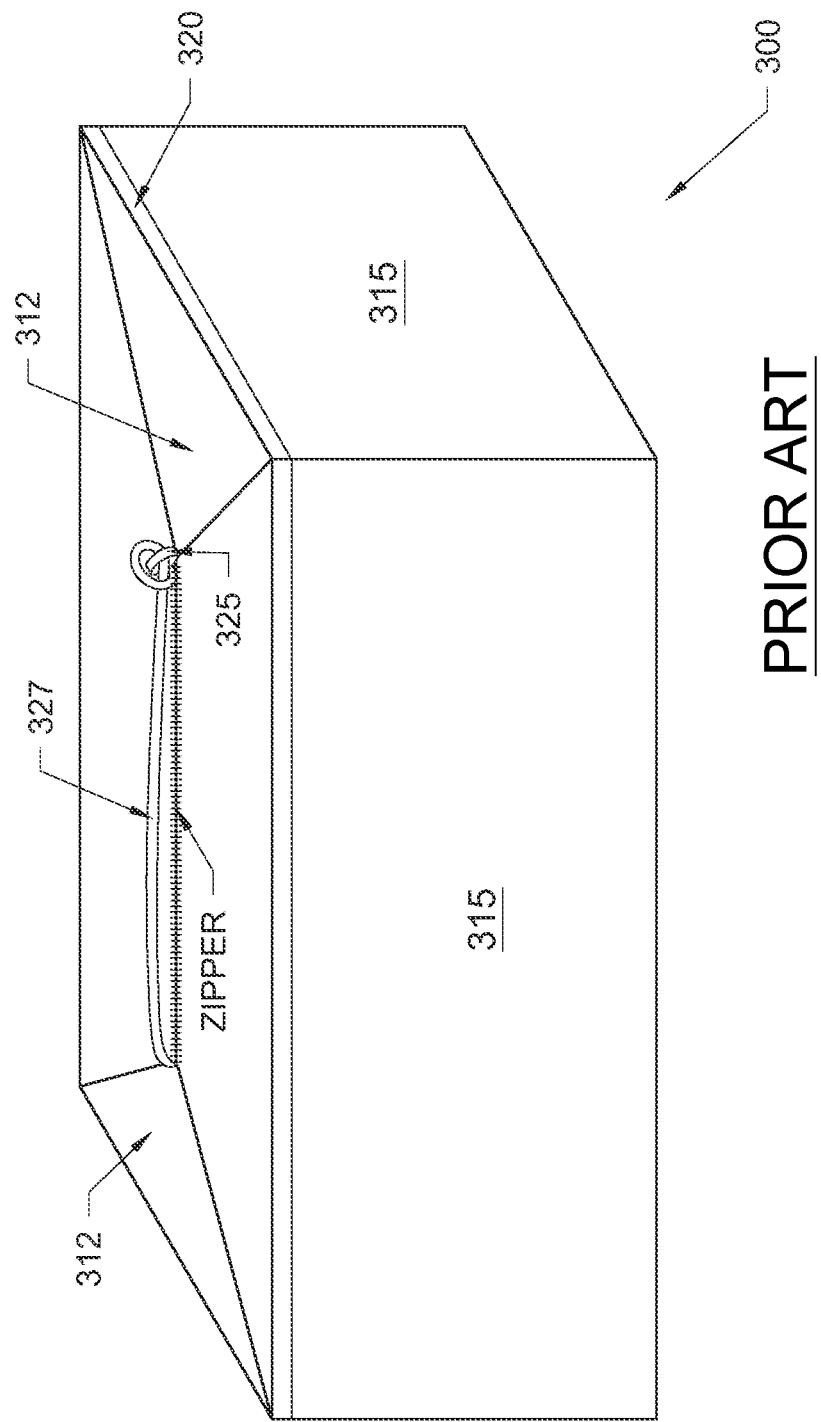
FIG. 4E is a perspective view of the prior art industrial containment bag illustrated in FIG. 4D, with its closure system in a fully-closed position, and with the triangular folds' terminal ends drawn together with the lineal connector.

FIG. 4E is a perspective view of the industrial containment bag illustrated in FIG. 4D, with its centrally-positioned closure system in a fully closed position and the terminal ends of the two-opposing triangular-shaped folds interconnected by linking strap 327.

Detailed descriptions of other illustrative examples of industrial containment bags similar those shown in FIGS. 4A-4E are set out in the '212 patent. As stated above, the '212 patent is incorporated herein in its entirety by reference.

Notwithstanding the fact that the use of lineal connectors to hold-down the two-opposing terminal ends of a "duffel-type" bag configuration has been used in the industry prior to and after the effective filing date of the '212 patent, such an interconnection means can result in a situation which is extremely dangerous and problematic, especially if the linking strap loosens or breaks prior to or during transportation. In such a circumstance, since the linking strap is the only means which interconnects the two-opposing triangular-shaped folds, if the linking strap was to break or loosen, both of the folds would be subjected to flap vigorously during transportation. Since the bag's top closure system is integrated as a part of these folds, the loosening or breaking of the linking strap prior to or during transportation can significantly jeopardize the integrity of the bag's closure system; thus, potentially exposing the bag's contents to the surrounding people or environment.

Accordingly, one object of this invention is to provide a new industrial containment bag which includes a centrally-positioned closure system (i.e., a "duffel-type" bag configuration) with an improved integrity, wherein the improvement comprises the integration of a system for independently and tightly securing each of the bag's two-opposing triangular-shaped folds to the bag's top portion, preferably at multiple locations. One particular embodiment of the invention which provides such an independent fold-securing system is shown in FIGS. 5A and 5B.

Figure 5A:
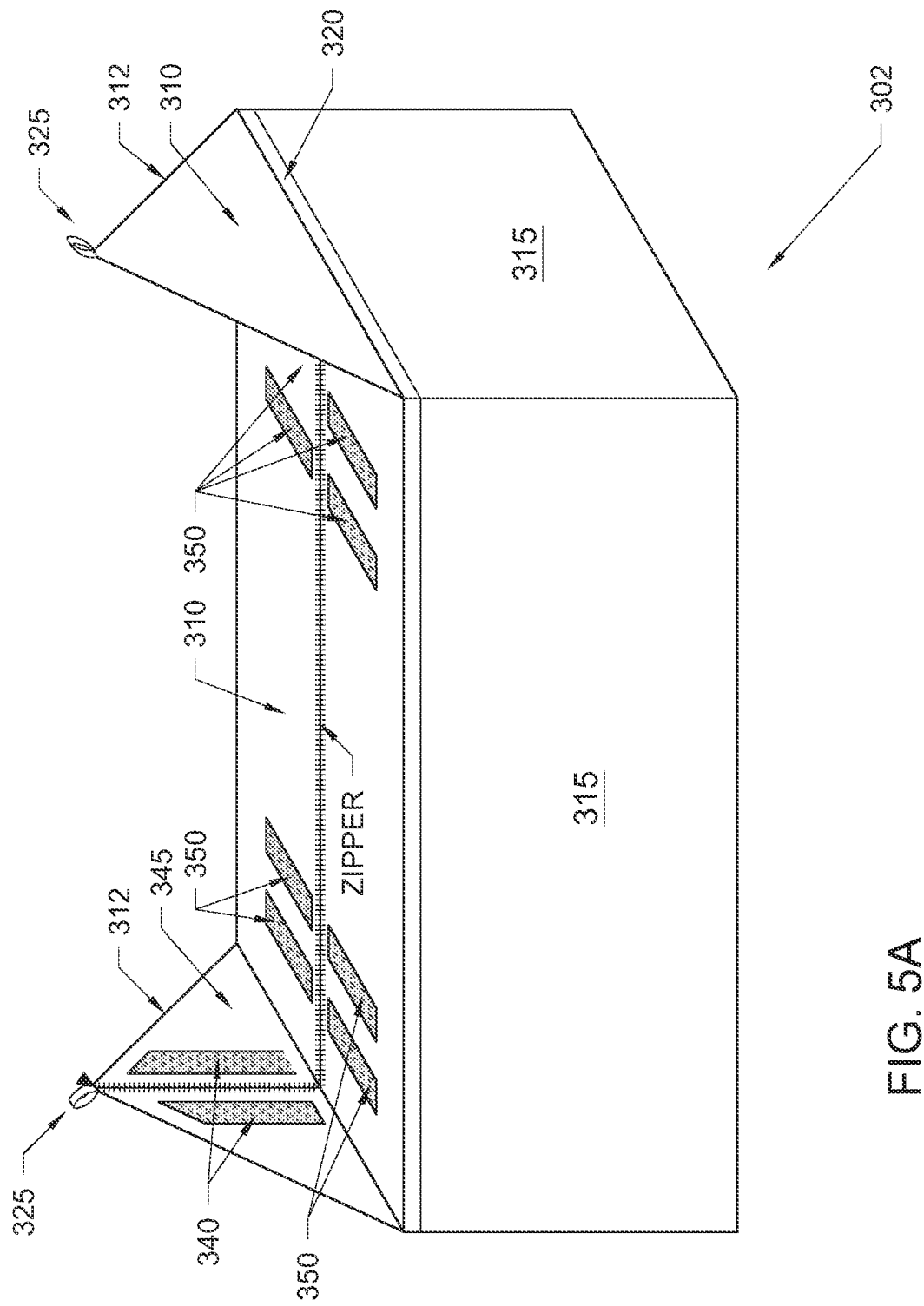
FIG. 5A is a perspective view of one embodiment of a new and improved industrial containment bag encompassed by this invention, wherein the bag comprises: (a) a centrally-positioned closure system which creates two-opposing triangular-shaped folds when closed, and (b) a means for independently securing each of such triangular-shaped folds to the bag's top portion.
Figure 5B:
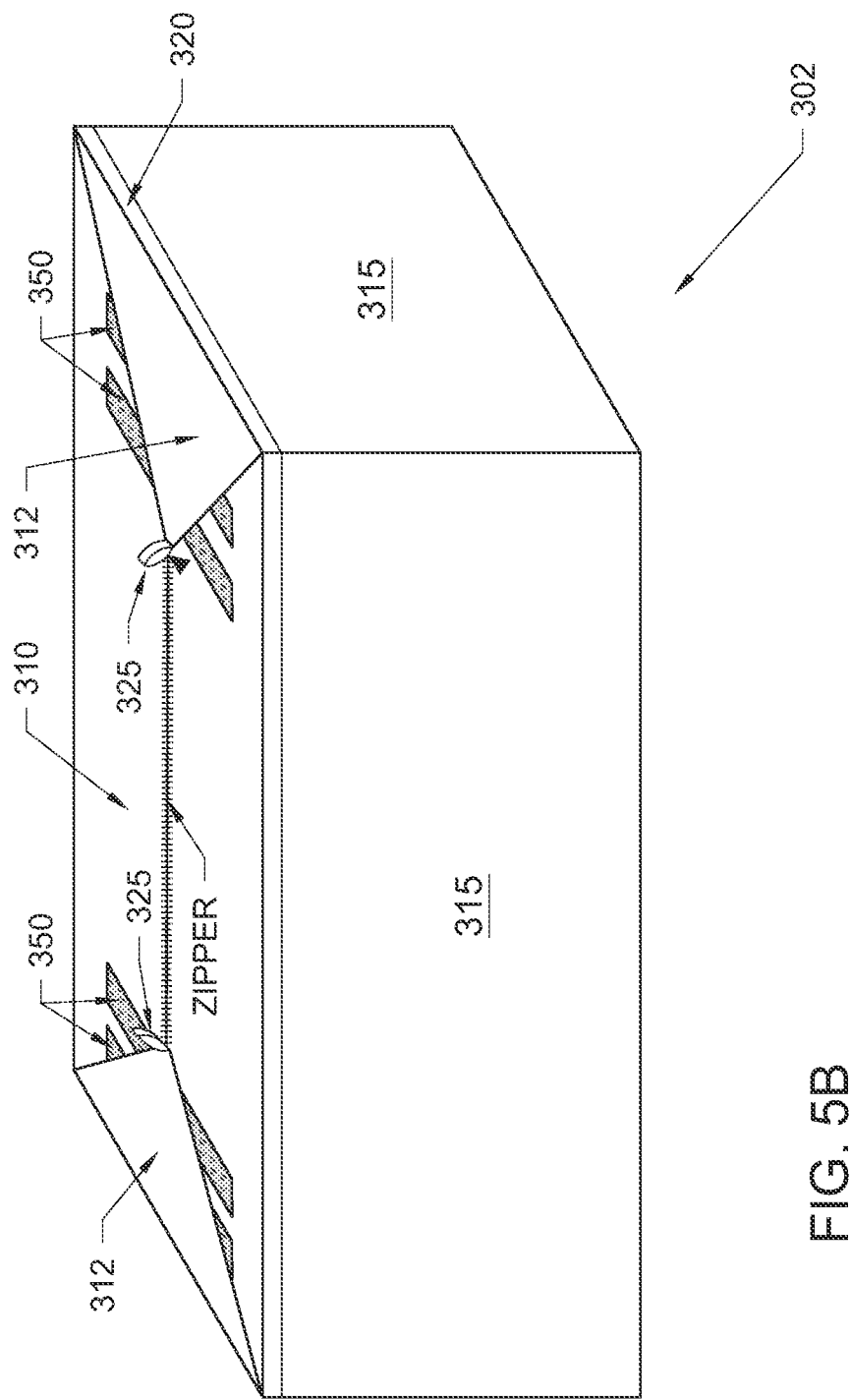
FIG. 5B is a perspective view of the containment bag illustrated in FIG. 5A, with its closure system in a fully-closed position, and with each of its triangular-shaped folds independently secured to the bag's top portion.

FIGS. 5A and 5B illustrate an industrial containment bag which has a "duffle-type" opening—similar to that shown in FIGS. 4A-4E. However, the novel independent fold-securing system shown in FIGS. 5A and 5B differs significantly from the prior art fold-securing system shown in FIGS. 4A-4E (which uses a single lineal connector as the sole means of holding both triangular folds together).

Specifically, in FIGS. 5A and 5B, the novel independent fold-securing system comprises the implementation of a hook and loop securing system. Here, a first part 340 of a two-part fold-securing system (e.g. the "hook" component of a hook and loop securing system) is attached to what will be the underside surface 345 of each triangular-shaped fold 312—preferably on each side of the centrally-positioned zipper closure system as illustrated in FIG. 5A. Then, the corresponding second part 350 of the two-part fold-securing system (e.g., the "loop" component of a hook and loop securing system) is attached to the top/outer surface of the sidewall's upper portion 310 that forms the bag's top portion. By positioning corresponding ends 340 and 350 properly, the two-opposing triangular-shaped folds 312 can be folded onto the bag's top portion and be secured tightly thereto by the hook and loop system. FIG. 5B shows this novel embodiment of the "duffel-type" containment bags in a fully-closed position.

Figure 6B:
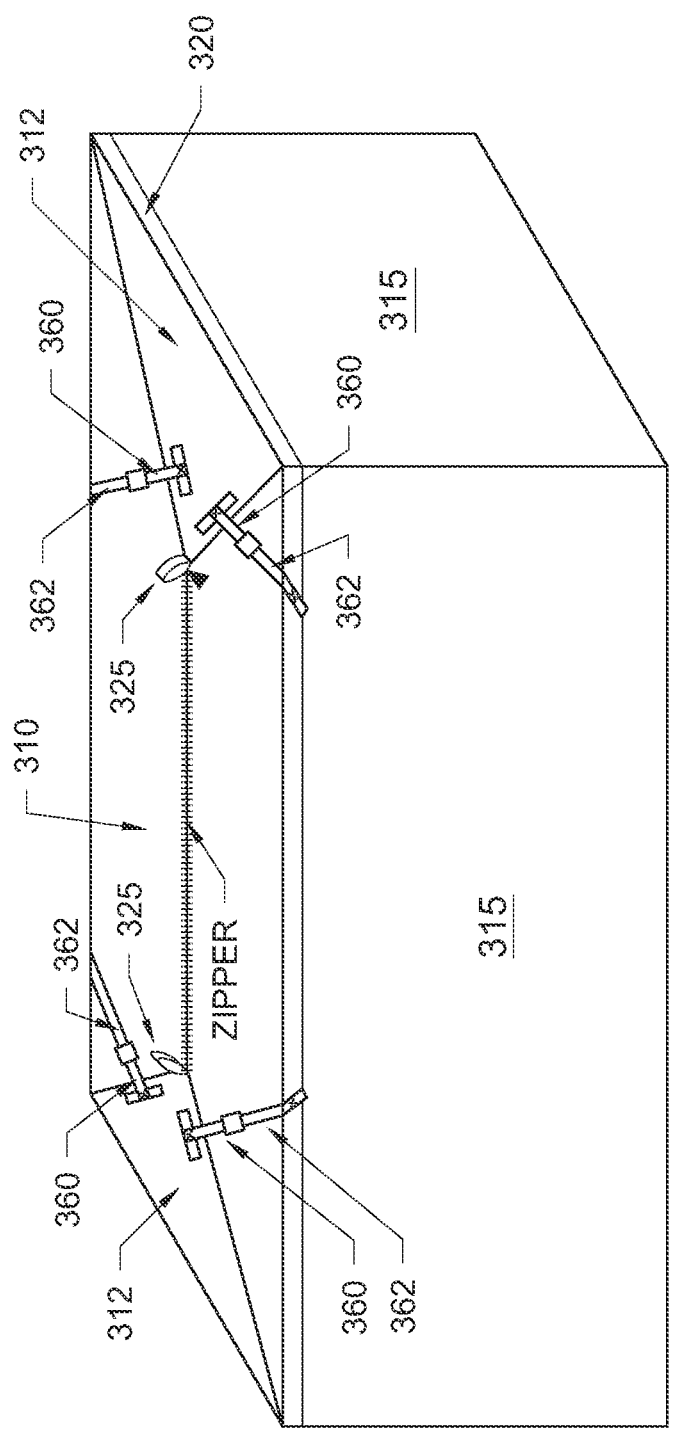
FIG. 6B is a perspective view of the containment bag illustrated in FIG. 6A with its closure system in a fully-closed position, and with each of its triangular-shaped folds independently secured to the bag's top portion.

Another embodiment of the invention which provides a novel independent fold-securing system is that shown in FIGS. 6A and 6B. Specifically, in FIGS. 6A and 6B, the novel independent fold-securing system comprises the implementation of a two-part strap-securing system. Here, a first part 360 of a two-part strap-securing system has one end which is fixedly attached (e.g., sewn) to what will be the top surface of each triangular-shaped fold 312 and another end which is loose. The loose end of each strap component 360 has a receiving means (e.g., a loop, a buckle, one part of a hook and loop system, etc.) which is designed to receive the loose end of a corresponding second part (defined infra.) of the same two-part strap-securing system. In the specific embodiment illustrated in FIGS. 6A and 6B, there are two separate strap-securing systems for each triangular-shaped fold (one located on each side of the bag's closure).

Particularly, in this embodiment, a second part 362 of a particular two-part strap-securing system has one end which is fixedly attached (e.g., sewn) to the bag's outer surface (e.g., to its sidewall or top), and another end which is loose. In the specific embodiment illustrated in FIGS. 6A and 6B, the second part of each two-part strap securing system is attached to the bag's sidewall portion. The positioning of strap component 362 is such that its loose end can be secured to the loose end of a corresponding strap component 360.

When practicing the particular embodiment illustrated in FIGS. 6A and 6B, the two-opposing triangular-shaped folds 312 are laid flat onto the bag's top portion. Then, the loose end of each strap component 362 is secured to the loose end of its corresponding strap component 360. This process is repeated for all of the other independent strap-securing systems attached to the bag's triangular-shaped folds. FIG. 6B shows this novel embodiment of "duffel-type" containment bags in a fully-closed position.

It is within the purview of this invention for strap component 360 not to have any type of a receiving means on its loose end. Rather, the receiving means can be attached to the loose end of strap component 362. It is also within the purview of this invention: (a) for there to be a receiving means on both loose ends of strap components 360 and 362, as well as (b) for there to be no receiving means on either of the loose ends of strap components 360 or 362. In the latter scenario, the loose ends of corresponding strap components 360 and 362 can be secured tightly together by any available means (e.g., being tied together).

The embodiments of this invention which include configurations of tightly and independently securing each of the bag's triangular-shaped folds to the bag's top portion (see e.g., FIGS. 5A, 5B, 6A and 6B, are a significant improvement over those prior art configurations which only employ a single fold-securing means such as the linking strap configuration illustrated in FIGS. 4D and 4E. Specifically, the particular configurations of the embodiments illustrated in FIGS. 5A, 5B, 6A and 6B the bag's integrity is improved by employing a means for independently and tightly securing together the adjacent surfaces of each triangular-shaped fold and the bag's top portion. Also, in the particular preferred embodiments illustrated in FIGS. 5A, 5B, 6A and 6B, the bag's integrity is further improved by having each fold independently secured to the bag at multiple locations.

Another aspect of this embodiment of the invention is that, in the unlikely instance where one of the fold-securing means was to dislodge, that would not affect the integrity of any of the other fold-securing means being employed. For example, in the embodiment illustrated in FIGS. 6A and 6B, if one of the two belt-securing systems was to fail, this would not immediately cause the failure of that fold's other belt-securing system, or either of the belt-securing systems securing the bag's other fold. However, when compared to the conventional "linking strap" system illustrated in FIGS. 4D and 4E, if the single linking strap was to fail, this would immediately and simultaneously result in both of the bag's folds becoming dislodged.

Moreover, in the embodiment illustrated in FIGS. 5A and 5B, if one of the hook and loop systems of this fold-securing means was to dislodge, as in the other embodiment set out above, such a dislodging would not affect the integrity of any of the other hook and loop systems holding down the folds. For example, in the embodiment illustrated in FIGS. 5A and 5B, if one of the two hook and loop systems on one of the folds was to fail, this would not immediately cause the failure of that fold's other hook and loop system, or either of the hook and loop systems securing the bag's other fold. Yet another novel feature of this particular embodiment is that, due to the inherent nature of how hook and loop system function, if one (or both) from one side was to dislodge resulting is a portion of the fold beginning to flap during transportation, as soon at the loose side of the hook and loop system comes into contact with its a corresponding part, the two parts would reconnect with one another; thus, at least partially re-securing the fold to the bag's top portion.

The possibility of a failed conventional linking strap system (such as that illustrated in FIGS. 4D and 4E) reconnecting on its own during transportation simply does not exist. That being said, it is within the purview of this embodiment of the invention for a linking strap system to be used in conjunction with the independent securing means disclosed above, especially those embodiments illustrated in FIGS. 5A and 5B, and in FIGS. 6A and 6B.

Accordingly, the embodiments of the invention illustrated in FIGS. 5A and 5B and in FIGS. 6A and 6B have many advantages over the prior art system illustrated in FIGS. 4D and 4E. For example, in the embodiments of the invention illustrated in FIGS. 5A and 5B and in FIGS. 6A and 6B: (a) each of the triangular folds 312 are independently secured to the bag's top portion; and (b) each of the triangular fold 312 are optionally secured thereto at multiple locations.

The concept of independently securing the two-opposing triangular-shaped folds to the top or sidewall portion(s) of "duffel-type" industrial containment bags as disclosed herein is novel and, as explained above, will be a tremendously welcomed advancement in the art. Once skilled artisans read and understand the embodiment of the invention as disclosed herein, such skilled artisans will be able to conceive of multiple other methods and devices to independently secure the two-opposing triangular-shaped folds to the top or sidewall portion(s) of "duffel-type" industrial containment bags. It is intended that all such other methods and devices are encompassed by this particular embodiment of the invention.

Notwithstanding their accepted use in the industry, one of the major concerns that has faced the soft-sided industrial containment bag industry pertains to the strength and permeability of the bag's closure system(s). Specifically, due to the inherent nature of soft-sided industrial containment bags, when a filled bag is lifted, its contents often shift and settle. This phenomenon results in outwardly-displaced torsional forces being exerted on the bag's sidewalls. This, in turn, results in outwardly-displaced torsional forces being exerted on both sides of the bag's closure system. If these torsional forces exceed the holding strength of the particular closure system being employed, this can result in the bag's closure system failing by being pulled apart. And, as is the inherent nature of zipper closure systems, once even the smallest portion of such a closure system fails, a "zipper-effect" can occur which results in the remainder of the closure system failing.

As indicated above, if the contents of a soft-sided industrial containment bag happened to be toxic or radioactive, the failure of its closure system (even if only partial) can have catastrophic effects on the surrounding people and environment. As such, those in the soft-sided industrial containment bag industry are constantly seeking methods and systems which minimizes the possibility of the bag's closure system failing during filling, lifting, transporting, storing and/or disposing.

To that end, other embodiments of this invention designed to provide industrial containment bags with an improved integrity include, without limitation, the following: (a) providing methods for reducing the torsional forces exerted on the bag's closure system(s); (b) providing closure pressure-relieving systems designed to hold the closure system(s) of industrial containment bags in a closed, sealed, and optionally covered position; (c) providing closure pressure-relieving systems designed to hold the closure system(s) of industrial containment bags in a closed and sealed position, and to optionally facilitate the closure system's closing process; (d) providing improved industrial containment bags comprising a closure pressure-relieving system which is designed to hold the closure system(s) of such bags in a closed, sealed, and/or optionally covered position, and to optionally facilitate the bag's closure system's closing process; and (e) methods of manufacturing, using, filling, lifting, transporting, storing, and/or disposing of such improved industrial containment bags.

The "closure pressure-relieving systems" of the present invention are designed to, among other things, assist in holding the closure systems of industrial containment bags in a closed, sealed, and optionally covered position. Such closure pressure-relieving systems comprise a means for interconnecting and holding together portions of the bag's outer surfaces located on opposing sides of the bag's closure systems desired to be secured. Closure pressure-relieving systems employed when practicing certain embodiments of the present invention should be configured such that they can withstand outwardly-displaced torsional forces which are greater than those that can be withstood by the closure system being secured thereby.

Figure 7:
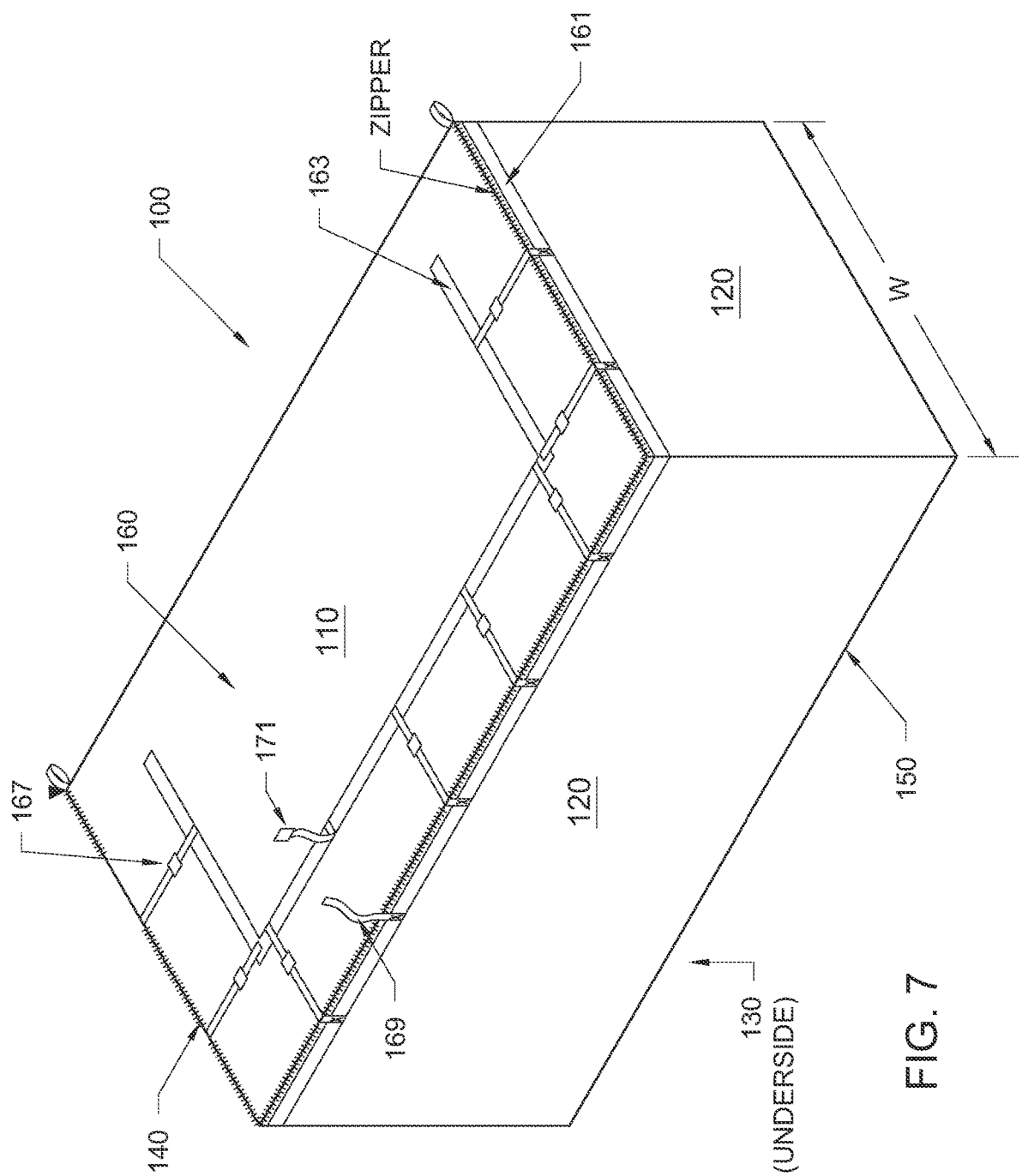
FIG. 7 is a perspective view of yet another embodiment of a new and improved industrial containment bag encompassed by this invention, wherein the bag comprises: (a) a closure system positioned directly on its top perimeter edge, and (b) a closure pressure-relieving system with a "belt-securing" configuration which is designed to, among other things, reduce the torsional forces exerted on the bag's closure system when it is filled and subsequently lifted, transported, stored and/or disposed.
Figure 8A:
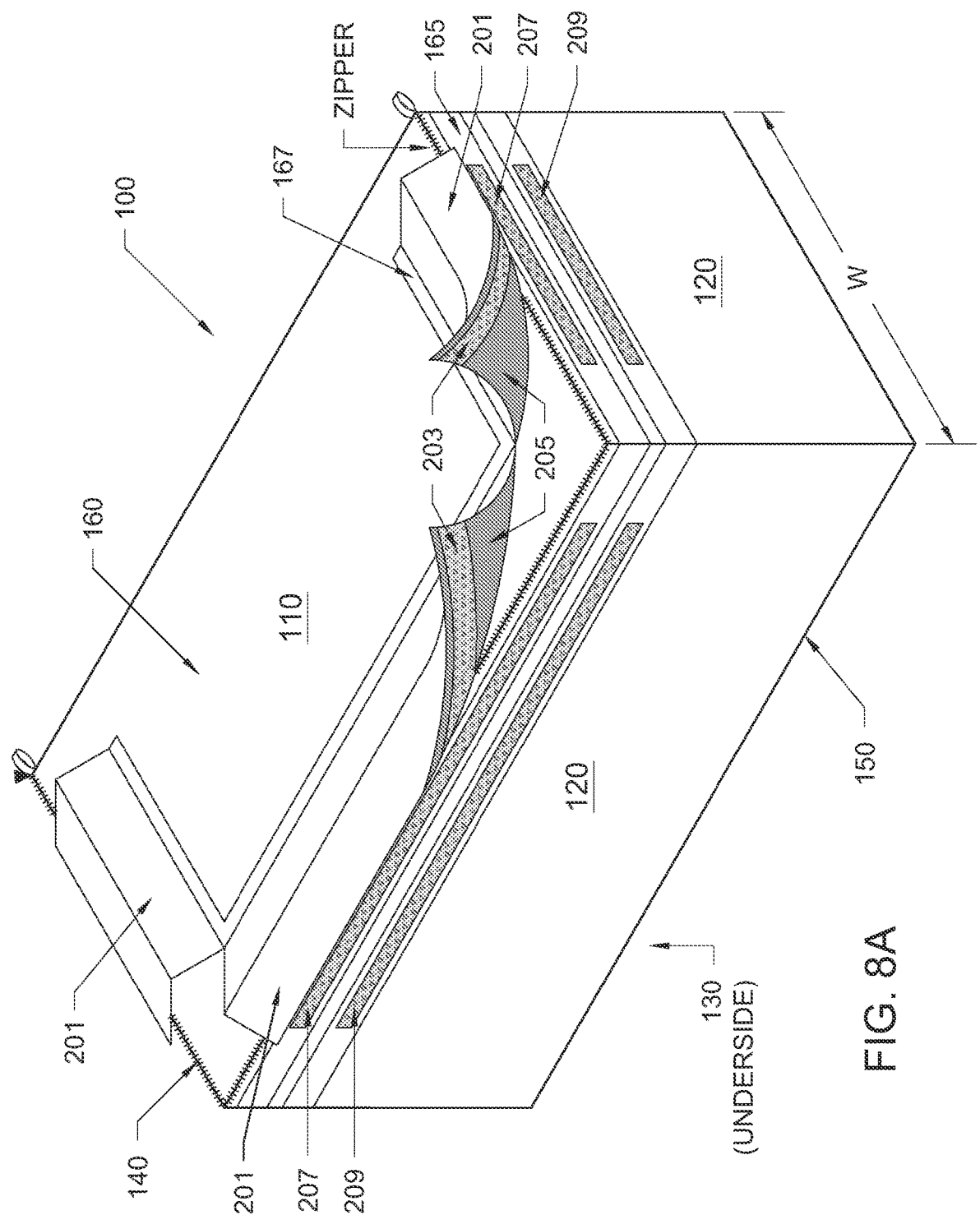
FIG. 8A is a perspective view of still another embodiment of a new and improved industrial containment bag encompassed by this invention, wherein the bag comprises: (a) a closure system positioned directly on its top perimeter edge, and (b) a closure pressure-relieving system with a "flap-securing" configuration employing a "hook and loop-type" securing system, wherein this particular "flap-securing" configuration is designed to, among other things: (i) reduce the torsional forces exerted on the bag's closure system when it is filled and subsequently lifted, transported, stored and/or disposed, and (ii) cover and protect that portion of the bag's closure system over which it traverses.
Figure 8B:
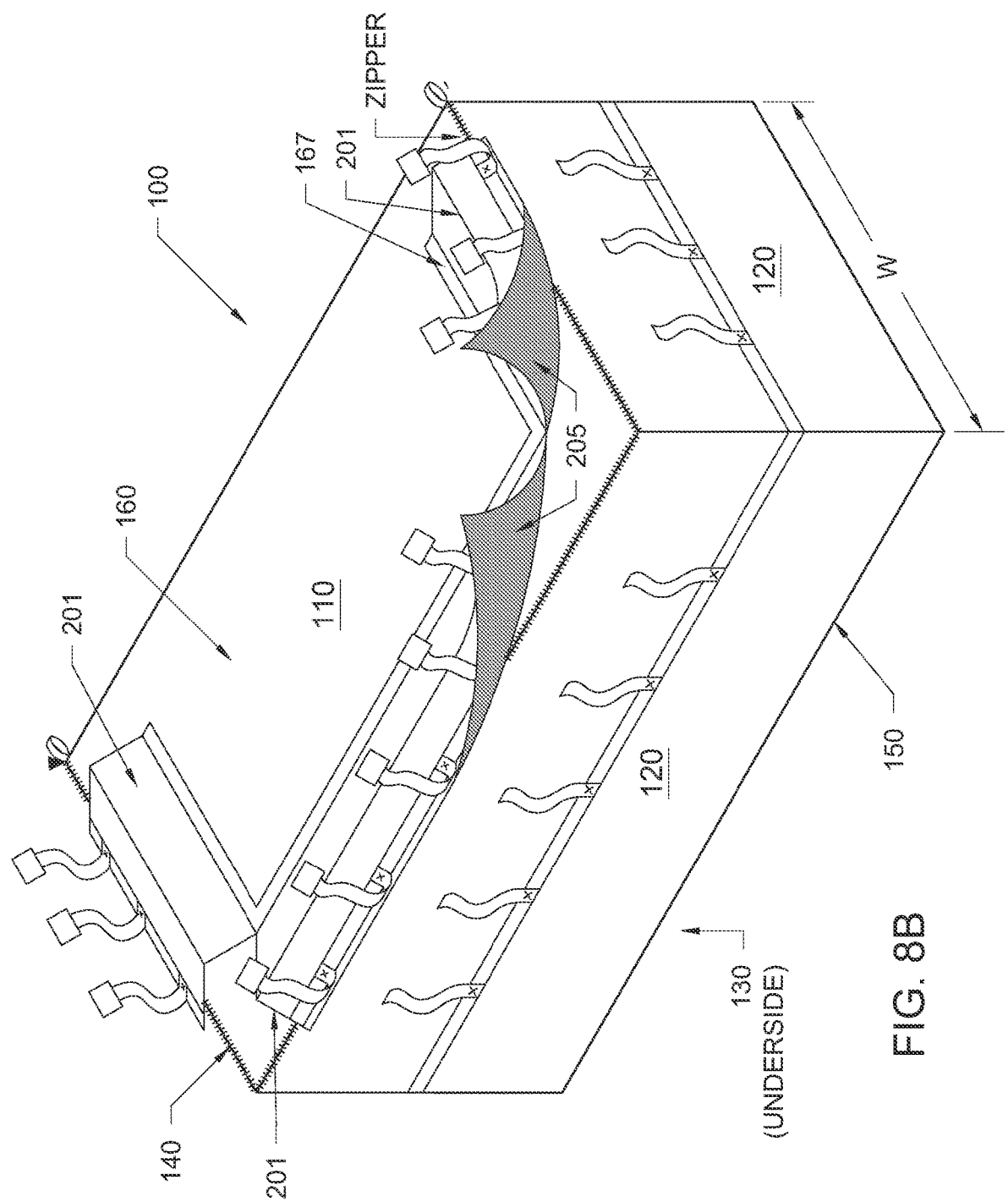
FIG. 8B is a perspective view of even another embodiment of a new and improved industrial containment bag encompassed by this invention, wherein the bag comprises: (a) a closure system positioned directly on its top perimeter edge, and (b) a closure pressure-relieving system with a "flap-securing" configuration employing a "strap-type" securing system, wherein this particular "flap-securing" configuration is designed to, among other things (i) reduce the torsional forces exerted on the bag's closure system when it is filled and subsequently lifted, transported, stored and/or disposed, and (ii) cover and protect that portion of the bag's closure system over which it traverses.
Figure 8C:
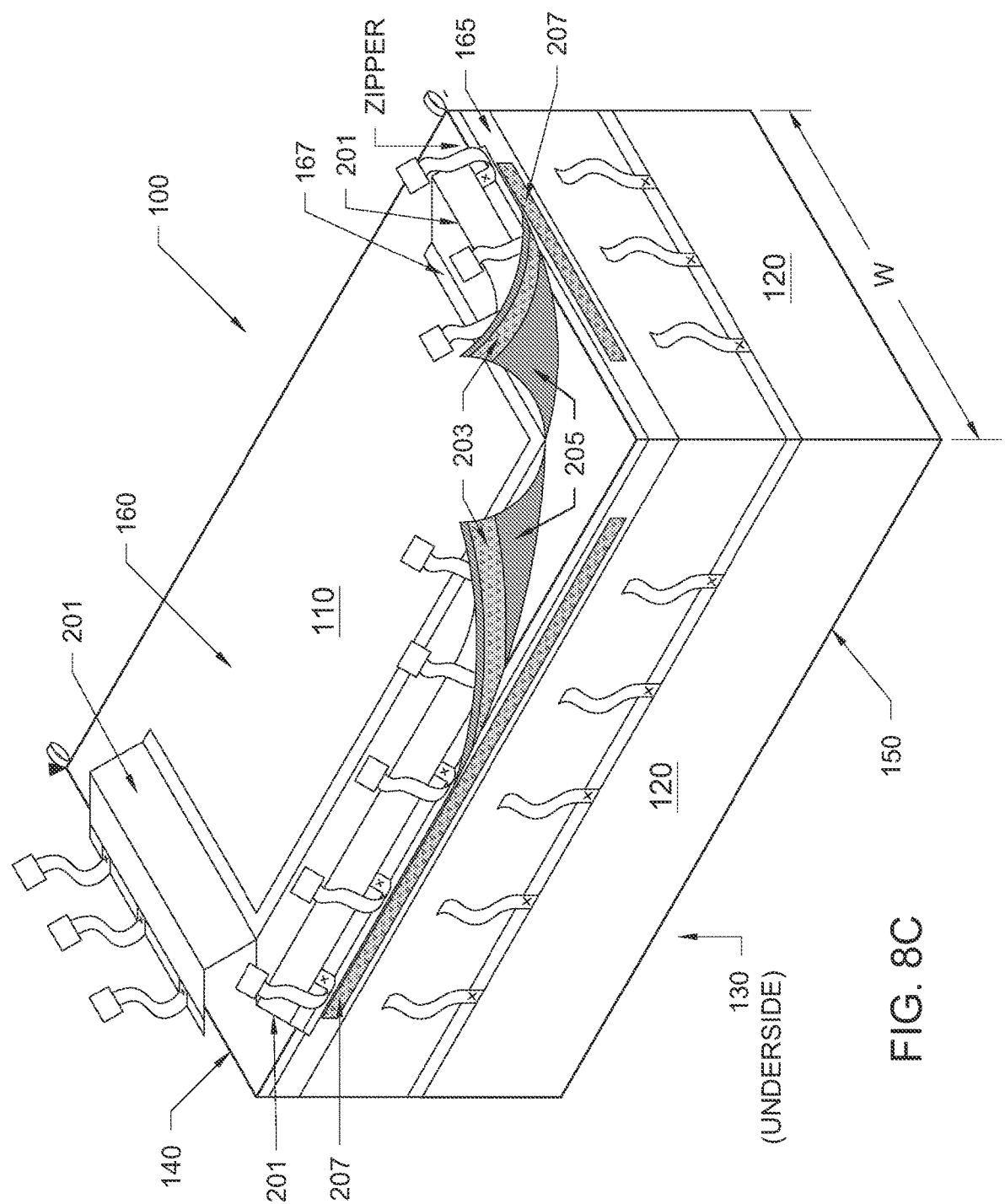
FIG. 8C is a perspective view of yet another embodiment of a new and improved industrial containment bag encompassed by this invention, wherein the bag comprises: (a) a closure system positioned directly on its top perimeter edge, and (b) a closure pressure-relieving system with a "flap-securing" configuration employing both, a "hook and loop-type" securing system and a "strap-type" securing system, wherein this particular "flap-securing" configuration is designed to, among other things: (i) reduce the torsional forces exerted on the bag's closure system when it is filled and subsequently lifted, transported, stored and/or disposed, and (ii) cover and protect that portion of the bag's closure system over which it traverses.

Once skilled artisans read and understand this embodiment of the invention as disclosed herein, these artisans will be able to configure other embodiments of closure pressure-relieving systems which are encompassed by the parameters of this invention. Accordingly, any of these other configurations (past, present and/or future) are deemed to be encompassed by the present invention. That being said, certain preferred illustrative examples of such closure pressure-relieving systems include, without limitation, the following: (a) those pressure-relieving systems which have a "belt-securing" configuration (e.g., one specific embodiment of such is illustrated in FIG. 7, described infra.); (b) those pressure-relieving systems which have a "flap-securing" configuration (e.g., specific embodiments of such are illustrated in FIGS. 8A-8C, all described infra.); and (c) those pressure-relieving systems which have both, a "belt-securing" configuration and a "flap-securing" configuration (e.g., specific embodiments of such are illustrated in in FIGS. 9A-9C, and in FIGS. 10A-10C, all described infra.).

Belt-securing configurations of closure pressure-relieving systems encompassed by (and/or which can be used when practicing) the present invention comprise a "series of" (i.e., two or more) individual strapping systems. In addition to a series of individual strapping systems, a belt-securing configuration of a closure pressure-relieving system encompassed by this invention can also, optionally, include reinforcement bands. When used, the reinforcement bands provide a strong foundation onto which the individual strapping systems can be secured to the bag's outer surface. One particular example of this embodiment is shown in FIG. 7.

FIG. 7 shows one illustrative example of a closure pressure-relieving system that can be employed when practicing this particular embodiment of the invention. Specifically, FIG. 7 is a perspective view of one particular embodiment of an improved industrial containment bag with a closure system positioned directly on the bag's top perimeter edge. This improved bag comprises, among other things, an integrated closure pressure-relieving system designed to improve the integrity of the bag's closure system by, among other things, reducing the torsional forces exerted on the its closure system when the bag's closure system when it is filled and subsequently lifted, transported, stored and/or disposed. The example illustrated in FIG. 7 is the industrial containment bag of FIG. 1 with a closure system pressure-relieving system incorporated therein. This unique combination results in a new and improved industrial containment bag which is encompassed by the present invention.

As in FIG. 1, FIG. 7 shows industrial containment bag 100. Although containment bag 100 can be self-supporting or non self-supporting, for illustrative purposes only, the containment bag shown in FIG. 7 is non self-supporting. As such, for this example, the containment bag in FIG. 7 is made entirely of non self-supporting materials. Accordingly, by being non self-supporting, bag 100 will need to employ some sort of a means to hold up its walls in a supporting structure (not shown here).

Bag 100 has a top portion 110, sidewall portions 120, and a bottom portion 130 (not shown). Top portion 110 is parallel to and laterally spaced above bottom portion 130; bottom portion 130 is parallel to and laterally spaced below bottom portion 110; and sidewall portions 120 are perpendicular to the bag's top and bottom portions and positioned therebetween.

The path along which sidewall portions 120 interconnect with top portion 110 creates the bag's top perimeter edge 140. Similarly, the path along which sidewall portions 120 interconnect with bottom portion 130 creates the bag's bottom perimeter edge 150.

Bag 100 has one closable opening/flap 160 on its top portion. In FIG. 7, closable opening/flap 160 is shown in the closed position. In this embodiment, closable opening/flap 160 is secured in a closed configuration with a zipper closure system running along a U-shaped path and positioned directly on the bag's top perimeter edge 140. A preferred zipper is a coil nylon zipper, with two pulls positioned on the zipper tracks. Since the closure system of closable opening/flap 160 is positioned directly on the bag's top perimeter edge 140, the bag's entire top portion 110 is comprised of closable opening/flap 160. The portion of the bag's top perimeter edge without a zipper functions as opening/flap 160's hinge.

While FIG. 7 shows the use of a specific zipper closure, it is within the scope of this invention for other type(s) of closure(s) to be used in conjunction with the embodiment of the closure pressure-reliving system illustrated in this Figure. For example, as long as the corresponding parts of the closure pressure-relieving system are attached to opposing sides of the bag's closure system (such that the closure pressure-relieving system can transverse over a portion of that closure system and be affixed in a manner to reduce the torsional forces exerted thereon), the following types of closures can be used to close the top of bag 100: (a) other zipper-type closures, (b) closures that are aligned with, but inwardly positioned from, the bag's top perimeter edge, (c) closures that are aligned with, but outwardly positioned from, the bag's top perimeter edge, (d) closures that are positioned substantially down the center of the bag's top (e.g., all types of zipper closures, all types of hook and loop closures, etc.).

As mentioned above, in FIG. 7, the closure pressure-relieving system illustrated on bag 100 is one which has a "belt-securing" configuration. The particular belt-securing configuration of this example comprises: (a) a series of individual strapping systems, and (b) in a preferred embodiment, an "optional" reinforcement band system. In this example, each of the series of individual strapping systems 167 is positioned such that it crosses over a portion of the bag's closure system. While, in FIG. 7 each individual strapping system 167 perpendicularly crosses over the bag's closure system, as will be discussed later, it is within the purview of this invention for these stripping systems to cross over the closure system at other angular configurations—depending, for example, of the direction of the torsional forces being exerted thereon.

In FIG. 7, all but one of the pressure-relieving device's individual strapping systems 167 is shown in its closed and secured position. The one which is not shown in its closed position is being done so to better show its various components.

Particularly, each individual strapping system 167 has two parts—(a) a strap part 169 which has one of its ends fixedly attached (e.g., sewn) to the optional lower reinforcement band 161 (described below in more detail) and another end which is loose, and (b) a strap-receiving part 171 which has one of its ends fixedly attached (e.g., sewn) to the optional upper reinforcement band 163 (also described below in more detail) and another end which is loose. The number of, lateral spacing between, and/or the cross-over angular configuration of (e.g., crossing over the closure system at a 90° angle, or crossing over the closure system at an angle which is greater or less than 90°) individual strapping systems 167 is dependent, in part, upon the location, severity, and/or direction of torsional forces exerted on the bag's closure system which the end user desires the closure pressure-relieving system to carry, and/or the material from which the individual strapping systems are made. That being said, individual strapping systems 167 are preferably made of a reinforced webbing material.

When practicing the particular embodiment of the invention illustrated in FIG. 7, after bag 100 is filled and opening/flap 160 is zippered closed, before the bag is lifted or moved, the series of individual strapping systems are secured in a manner where each reduce the torsional forces exerted on the bag's closure system over which it transverses. In this particular example, this is accomplished by slidingly passing the loose end of strap part 169 through an opening in the loose end of its corresponding strap-receiving part 171. After being passed therethrough in this manner, the loose end of strap part 169 is pulled back towards lower reinforcement band 161 until it is taught and reduced at least some of the pressure from that portion of the zipper closure over which it crosses. Thereafter, strap part 169 is secured and locked into that position. This process is repeated for all of the other individual strapping systems positioned along the bag's closure.

The individual strapping systems are configured such that each one crosses over various sections of the bag's closure system. As mentioned above, the number of, lateral spacing between, and/or the cross-over angular configuration of, individual strapping systems is dependent, in part, upon factors such as: the location, direction, and/or severity of torsional forces that the end user desires the closure pressure-relieving system of this present invention to carry, and/or the material from which the individual strapping systems are made. For example, the greater the number of individual strapping systems employed and/or the stronger the materials from which the strapping systems are made, the greater the pressure-relieving features of such a belt-securing configuration.

In order to equally disburse the pressure-relieving effects of such a belt-securing configuration, the individual strapping systems are preferably equally spaced along those sections of the bag's closure system sought to be secured thereby. In certain embodiments, the individual strapping systems are equally-positioned along the length of the bag's closure system with a spacing therebetween of 10 feet or less. In such embodiments, it is typically preferred that the equal distant spacing between the individual strapping systems is 8 feet or less; more preferably, 6 feet or less; and even more preferably, 4 feet or less. Each individual strapping system is comprised of at least two parts—a first part and a corresponding second part—with each part being: (a) linearly positioned with respect to one another, and (b) attached to the bag on opposing sides of the section of the closure system sought to be secured. In one preferred embodiment of a belt-securing configuration of pressure-reliving system encompassed by this invention, the configuration's individual strapping systems are attached are in a relatively close proximity to those sections of the closure system sought to be secured. It should be noted, however, that it is not necessary for each part of an individual strapping system to be spaced an equal distance from that portion of the bag's closure system sought to be secured.

Another way of identifying particularly preferred embodiments of this aspect of the invention is by defining preferred overall lengths of the individual strapping system when they are in their secured and locked position (i.e., the overall length between the locations where the corresponding parts of an individual strapping system are fixedly attached to the bag's outer surface). One way of determining the "overall length" of the individual strapping system (i.e., their overall length when in a secured and locked position) is by measuring the distance between the points where the "secured" (as opposed to "loose") ends of a corresponding set of an individual strapping system's first and second parts are each fixedly attached to the bag's outer surface. When using this means of determining the overall length of the individual strapping system, it is typically preferred that the overall length is 6 feet or less; more preferably, 5 feet or less; and even more preferably, 4 feet or less. In certain special embodiments, it is within the scope of this invention to have the overall length of the individual strapping system (when in their secured and locked position) to be 3 feet or less, and even 2 foot or less.

Another way of identifying the overall length of the individual strapping systems is by comparing such a length to the width of the bag's surface that the closure system is securing shut. For example, in the particular embodiment illustrated in FIG. 7, the surface of bag 100 that is being secured shut is its top portion 110 which has a width of "W". Accordingly, when using this means of determining the overall length of the individual strapping system, the length of each is preferably not greater than ¾ W; more preferably, not greater than ½ W; and even more preferably, not greater than ⅓ W.

As mentioned above, each individual strapping system of a closure pressure-relieving system encompassed by the present invention which has a belt-securing configuration has two parts—i.e., a first part and a corresponding second part—with each part being fixedly attached to the bag on opposing sides of the section of the closure system sought to be secured thereby so as to reduce the torsional forces exerted thereon. Both parts of each individual strapping system have one end secured to the outer surface of the bag, and another end which is loose. In practice, once the bag is secured closed by its closure system of choice, the corresponding loose ends of each individual strapping system are connected to one another and tightened until each strapping system relieves at least some of the outward pressure exerted on the bag's closure system over which it transverses.

In one preferred embodiment, the first part of the strapping system comprises a strap which has one end attached (e.g., sewn) to the bag and another end which is loose; and the corresponding second part comprises a strap which also has one end attached (e.g., sewn) to the bag and another end which is also loose. In this preferred embodiment, the loose end of the strapping system's second part includes a receiving component which has an opening configured such that the loose end of the system's first part can be somehow securedly attached thereto.

In this particular embodiment, the attachment can be by any suitable means such as, for example: (a) having the loose end of the system's first part slidingly passing through the receiving component on the system's second part, or (b) having one part of an attachment means (e.g., one part of a hook and loop system, one part of a zipper system, one part of a snap or button system, etc.) attached to the system's first part's loose end, and having the corresponding part of the particular attachment means employed attached to (or being, itself) the system's second part's loose end.

If the configuration of the system's strap-receiving part is such that the system's strap part can slidingly pass therethrough, in a preferred embodiment there is a way for the strap part to, thereafter, be pulled taught to reduce the torsional forces exerted on the bag's closure, and for its loose end to then be locked into such a position. Illustrative examples of how this can occur includes, without limitation, the following: having the system's strap-receiving part comprise a buckle means; and/or having the system's strap part include an attachment means such that, after slidingly passing through its corresponding strap-receiving means, it can thereafter be secured to itself (e.g., through the implementation of a hook and loop system).

That being said, if the loose end of the strapping system's second part does not include a receiving component as mentioned above, it is within the purview of this invention for the two loose ends to be merely tied together. In such an embodiment, once the bag's closure system is secured in its closed position, the two loose ends of a particular strapping component are pulled together and tightly secured (e.g., tied) to one another, such that that particular strapping component reduces the torsional force exerted on that portion of the bag's closure system over which it transverses.

The individual strapping systems can be made of any suitable material which enables it to function in their desired manner. For example, in certain embodiments, any straps used in an individual strapping system can be constructed from a polypropylene or polyester webbing material, an elastic knitted latex webbing material, or any other suitable material, such a polyethylene, a polypropylene or a nylon material. The width and thickness of the selected straps depends, in part, upon the desired level of torsional forces that the end user wished the pressure-relieving system to carry and the material from which the straps are made. However, as an illustrative example, straps used in a strapping system generally have a width ranging from between about 0.5 inch to about 6 inches; preferably, ranging from between about 1 inch to about 5 inches; and more preferably, ranging from between about 2 inches to about 4 inches.

When practicing the particular embodiment of the invention employing a belt-securing configuration of a closure pressure-reliving system, after the containment bag is filled to its desired level, the bag's closure system is secured into is closed position. Then, before the bag is lifted or moved, the corresponding parts of the closure pressure-relieving system's individual strapping systems are interconnected to one another in a manner which reduces the torsional forces exerted on of the bag's closure system over which it crosses. This process is then repeated for all of the other individual strapping systems positioned along the bag's closure.

As mentioned above, in certain preferred embodiments, the particular belt-securing configuration of a closure pressure-relieving system encompassed by this invention further comprises a reinforcement band(s) onto which one or both the parts of the system's components are attached. If reinforcements bands are employed, they are typically attached to the outer surface of the bag. The implementation of such reinforcement bands can add strength to the closure pressure-relieving systems encompassed by this invention.

To illustrate such a preferred embodiment, the pressure-relieving system shown in FIG. 7 further includes such an optional reinforcement band system which comprises both: (a) a lower reinforcement band component, and (b) an upper reinforcement band component. Generally speaking, if a dual reinforcement band system is employed, the upper reinforcement band component is sewn at a location which is along a path of, and inwardly-displaced from, the bag's closure system sought to be secured thereby; and the lower reinforcement band component is sewn at a location which is along a path of, and outwardly-displaced from, that same closure system. In the particular reinforcement band system illustrated in FIG. 7, the lower reinforcement band component 161 is sewn to the upper portion of sidewalls 120 (at a location which is along a path of, and outwardly-displaced from the bag's closure system), and an upper reinforcement band component 163 is sewn to top portion 160 (at a location which is along a path of, and inwardly-displaced from the bag's closure system).

To add even more strength, these reinforcement bands can be placed on both sides (i.e., on the inside and outside) of the bag's surfaces. In one embodiment of such a configuration, the bag's actual surface is sandwiched between a set of reinforcement band—one which is secured (e.g., sewn) to the bag's outer surface, and another which is secured (e.g., sewn) to the bag's inner surface. In an even more preferred embodiment, if a top and bottom reinforcement band configuration is implemented when practicing this invention, a single sewing process can be employed which passed through the top reinforcement band, the bag's actual top or wall portion, and the bottom reinforcement band.

Accordingly, reinforcement band components 161 and 163 can also, optionally, have a corresponding second set of reinforcement bands spatially displaced in a parallel manner and attached to the inside wall surface of the bag (not shown because the bag in FIG. 7 is closed). As mentioned above, such a configuration serves to "double-up" the particular reinforcement band component; thus, making it significantly stronger and creating a lesser possibility of the pressure exerted of being able to tear that portion of the bag's walls to which it is sewn or otherwise attached.

If employed when practicing this embodiment of the invention, upper and/or lower reinforcement band components are preferably made of a reinforced webbing material. Since the implementation of a reinforcement band component is optional, it is within the purview of this invention for the belt-securing configuration of the pressure-relieving device to employ: (a) no reinforcement band components, (b) only an upper reinforcement band component—which is or is not "doubled-up", (c) only a lower reinforcement band component—which is or is not "doubled-up", or (d) both, upper and lower reinforcement band components—either one (or both) of which is/are or is/are not "doubled-up".

Reinforcement bands used when practicing this invention can be made of any suitable material which enables them to function in their desired manner. For example, in certain embodiments, they can be constructed from a polypropylene or polyester webbing material. The width and thickness of the selected reinforcement bands depends, in part, upon the desired level of torsional forces that the end user wished the pressure-relieving system to carry and the material from which the bands are made. However, as an illustrative example, reinforcement bands used in a belt-securing configuration of a pressure-relieving system generally have a width ranging from between about 1 inch to about 5 inches; and preferably, ranging from between about 2 inches to about 4 inches.

As mentioned above, in addition to the closure pressure-relieving systems of the present invention being designed to reduce the torsional forces exerted on a bag's closure by tightly securing it in a "closed" and "sealed" position, these closure pressure-relieving systems can also, optionally, be designed to hold the closure systems of industrial containment bags in a "covered" position. Thus, in another embodiment of this invention, additional protection is provided to the bag's closure system through the implementation of a closure pressure-relieving system which comprises a "flap-securing" configuration. Illustrative examples of this embodiment are shown in FIGS. 8A-8C, below.

Specifically, FIG. 8A is a perspective view of the industrial containment bag of FIG. 1 with a closure pressure-relieving system incorporated therein having a "flap-securing" configuration. This unique combination results in a new and improved industrial containment bag which is encompassed by the present invention.

The flap securing configuration of FIG. 8A: (a) is incorporated on a bag having a U-shaped zipper closure system positioned directly on the bag's top perimeter edge; (b) comprises three individual securing flaps—one dedicated to cover at least a portion of each side of the bag's U-shaped zipper closure system; and (c) each of the individual securing flaps have one of their ends fixedly attached (e.g., sewn) to the outer surface of the bag at a location which is aligned with but inwardly position from, the various sides of the U-shaped zipper closure system, and have another end which is loose. In the illustrative example shown in FIG. 8A: (a) each of the loose ends (defined infra.) of its closure pressure-relieving system having a "flap-securing" configuration are designed to be independently secured in place through the use of a securing system (i.e., in this particular example, through the use of a conventional "hook and loop"

system); and (e) each individual flap is positioned such that it perpendicularly crosses over the portion of the bag's closure system.

As in FIG. 1, FIG. 8A shows industrial containment bag 100. Bag 100 has a top portion 110, sidewall portions 120, and a bottom portion 130 (not shown). The path along which sidewall portions 120 interconnect with top portion 110 creates the bag's top perimeter edge 140. Bag 100 has one closable opening/flap 160 on its top portion—which is shown in the closed position, and is secured in a closed configuration with a zipper closure system positioned directly on the bag's top perimeter edge 140. A preferred zipper is a coil nylon zipper, with two pulls positioned on the zipper tracks. Since the closure system of closable opening/flap 160 is positioned directly on the bag's top perimeter edge 140, the bag's entire top portion 110 is comprised entirely of closable opening/flap 160. The portion of the bag's top perimeter edge without a zipper functions as opening/flap 160's hinge.

While FIG. 8A shows the use of a zipper closure, it is within the scope of this invention for other type(s) of closure(s) to be used. For example, the following types of closures can be used to close the top of bag 100: (a) other zipper-type closures, (b) closures that are aligned with, but inwardly positioned from, the bag's top perimeter edge, (c) closures that are aligned with, but outwardly positioned from, the bag's top perimeter edge, (d) closures that are positioned substantially down the center of the bag's top (e.g., all types—of zipper closures, all types of hook and loop closures, etc.).

As mentioned above, in FIG. 8A, the closure pressure-relieving system illustrated on bag 100 is one which has a "flap-securing" configuration. The particular flap-securing configuration of this example comprises: (a) a flap system, and (b) in a preferred embodiment, an "optional" reinforcement band system. The particular "flap system" employed in FIG. 8A comprises a series of three individual flaps 201. In this particular configuration, each flap 201 has a first end fixedly attached (e.g., sewn) to one portion of the bag's outer surface and a second loose end which is designed to: (a) cross over at least a portion of the bag's closure system, and (b) attach itself, or become secured to, another one of the bag's surfaces.

In FIG. 8A, the particular attachment means employed to secure the flap's second (i.e., loose) end to one of the bag's surfaces is a "hook and loop" system. In this particular embodiment, a first part 203 of a conventional hook and loop system is secured (e.g., sewn) to the underside 205 of each of flap's 201 loose ends. The second/corresponding part 207 of the hook and loop system is secured at the "appropriate distance" down along bag side wall 120. This "appropriate distance" is that which, when the loose end of each flap 201 is secured thereto at that location, this secured configuration reduces the torsional forces exerted on that portion of the bag's closure system over which it traverses.

Since, in some instances, bags are not completely filled to their top, in one preferred embodiment, there are multiple locations along the bag's sidewalls which have the second part of the hook and loop system attached. As one illustrative example of such a configuration, FIG. 8A has such another second part 209 of a hook and loop system positioned at a location which is lower down on the bag's sidewall 120 (i.e., closer to the bag's bottom) than the upper second part 207 With this unique design, the pressure-relieving device's flap-securing configuration can relieve at least some of the outward torsional forces exerted on that portion of the bag's closure system over which it traverses, even in those instances where the bag is not completely filled.

In the preferred embodiment of a pressure-relieving system illustrated in FIG. 8A, an optional reinforcement band system is also incorporated. This particular reinforcement band system comprises: (a) a lower reinforcement band component 165 sewn to the upper portion of sidewalls 120 (at a location which is along a path of, and outwardly-displaced from, the bag's closure system), and (b) an upper reinforcement band component 167 sewn to top portion 160 (at a location which is along a path of, and inwardly-displaced from, the bag's closure system).

As with the optional reinforcement band(s) pertaining to closure pressure-relieving systems having a "belt-securing" configuration (see, e.g., FIG. 7), those upper and/or lower reinforcement band components for closure pressure-relieving systems having a "flap-securing" configuration are preferably made of a reinforced webbing material. Also as with the optional reinforcement band(s) pertaining to closure pressure-relieving systems having a "belt-securing" configuration, it is within the purview of this invention for those having a flap-securing configuration to employ: (a) no reinforcement band components, (b) only an upper reinforcement band component—which is or is not "doubled-up", (c) only a lower reinforcement band component—which is or is not "doubled-up", or (d) both, upper and lower reinforcement band components—either one (or both) of which is/are or is/are not "doubled-up".

While FIG. 8A shows a particular illustrative example of a "flap-securing" configuration where the individual flap's secured ends are fixedly attached to the bag's top, it is within the purview of this invention for the individual flap's secured ends to be fixedly attached to the bag's sidewalls. In such a configuration, if a hook and loop attachment system is employed to secure the flap's loose end(s) to the bag's outer surfaces, the second/corresponding component of such a hook and loop system would be attached at an "appropriate location" on the bag's top portion. It is further within the purview of this invention for at least one of the flaps to have its secured end fixed attached to the bag's top portion, while at least another of the flaps (of the same flap-securing configuration) to have its secured end fixedly attached to the bag's side wall portion (i.e., for the particular closure pressure-relieving system having a "flap configuration" to be staggered).

FIG. 8B is also a perspective view of the industrial containment bag of FIG. 1 with a closure pressure-relieving system incorporated therein which has a "flap-securing" configuration. Accordingly, this unique combination results in another new and improved industrial containment bag which is encompassed by the present invention.

Here, although the particular flap securing configuration is incorporated on a bag having a U-shaped zipper closure positioned directly on the bag's top perimeter edge, and comprises three individual securing flaps—one dedicated to cover at least a portion of each side of the bag's U-shaped zipper closure system (i.e., similar to the system illustrated in FIG. 8A), in FIG. 8B, each of the individual securing flaps have their respective loose end (defined infra.) secured in place through the use of a "belt-securing" configuration (similar to that illustrated in FIG. 7).

FIG. 8C is also a perspective view of the industrial containment bag of FIG. 1 with a closure pressure-relieving system incorporated therein which has a "flap-securing" configuration. Accordingly, this unique combination results in yet another new and improved industrial containment bag which is encompassed by the present invention.

Here, although the particular flap securing configuration is incorporated on a bag having a U-shaped zipper closure positioned directly on the bag's top perimeter edge, and comprises three individual securing flaps—one dedicated to cover at least a portion of each side of the bag's zipper closure system (i.e., similar to the system illustrated in FIG. 8A), in FIG. 8C, each of the individual securing flaps have their respective loose end (defined infra.) secured in place through the use of both, a "belt-securing" configuration (similar to that illustrated in FIG. 7), and a "hook and loop" securing configuration (similar to that illustrated in FIG. 8A).

In all three FIGS. 8A-8C, and in their corresponding FIG. 1, like item numbers refer to the same components identified therein.

The "flap-securing" configuration employed when practicing this particular embodiment of the invention is configured such that it has at least one securing flap that crosses over that portion of the bag's closure system sought to be secured. The number of, shape, and cross-over angular configuration of, the securing flaps being employed depends, in part, upon factors such as: the location, severity and/or direction of torsional forces that the end user desires the pressure-relieving device to carry, and the material from which the securing flap(s) are made.

Since a "flap-securing" configuration is an integral portion of this particular closure pressure-relieving system being employed, it is preferably constructed of a material and/or in a manner which can withstand greater outwardly-displaced torsional forces than those that can be withstood by the closure system being secured thereby. For example, it can be constructed of the same material used in the construction of the bag's outer walls.

When practicing the particular embodiment which employs a closure pressure-relieving system having a flap-securing configuration, after the flap(s) is/are draped over the bag's closure system, the loose end of each flap: (a) is pulled taught such that it reduces the torsional forces exerted on that portion of the bag's closure system over which it is draped; and thereafter, (b) is secured to the bag in that position. This can be accomplished in a number of different manners.

For example, the individual flap's loose end can be secured to the bag through the use of a hook and loop system (see, e.g., FIG. 8A). Also, a series of individual strapping systems can be used to secure each flap's loose end to the bag (see, e.g., FIG. 8B). In such an embodiment, the upper part of each individual strapping system can have its fixedly secured end sewn to an "optional" upper reinforcement band attached to the loose end of a securing flap; and the strapping system's corresponding lower part can be fixedly attached to an "optional" lower reinforcement band attached to the bag's side wall (or top portion—depending upon which of the bag's surface's the flap's secured end is fixedly attached). Moreover, it is also within the purview of this invention for each flap's loose end to be secured by both, a series of individual strapping systems and a hook and loop system (see, e.g., FIG. 8C).

One way of identifying particularly preferred embodiments of this aspect of the invention is by defining preferred "overall length" of an individual flap when it is in its secured and locked position (i.e., the overall length being measured between the locations where the flap's secured end is fixedly attached to the bag's outer surface, and where the flap's loose end is secured another part of the bag's outer surface). When using this means of determining the overall length of the individual strapping system, it is typically preferred that the flap's overall length is 6 feet or less; more preferably, 5 feet or less; and even more preferably, 4 feet or less. In certain special embodiments, it is within the scope of this invention to have the overall length of a flap to be 2 feet or less, and even 1 foot or less.

Another way of identifying the overall length of a flap employed when practicing this invention is by comparing such a length to the width of the bag's surface that the closure system is securing shut. For example, in the particular embodiment illustrated in FIG. 8, the surface of bag 100 that is being secured shut is its top portion 110 which has a width of "W". Accordingly, when using this means of determining the overall length of an individual flap, its length is preferably not greater than ¾ W; more preferably, not greater than ½ W; and even more preferably, not greater than ⅓ W.

The closure pressure-relieving systems illustrated in FIG. 7 and in FIGS. 8A-8C demonstrate how certain preferred embodiments of this invention function to reduce the torsional forces exerted on the closure system(s) of industrial containment bags having an opening which is secured shut by a U-shaped zipper-type closure positioned directly on one of the bag's perimeter edges. However, as explained above, it is within the purview of this invention for the closure pressure-relieving systems encompassed by this invention to also be used to reduce the torsional forces exerted on the closure system(s) of industrial containment bags having an opening(s) which is/are secured shut by any one or more of the following: (a) U-shaped zipper-type closures aligned with, but positioned inward from, one of the bag's perimeter edges (see, e.g., FIGS. 2 and 3); (b) U-shaped zipper-type closures aligned with, but positioned outward from, one of the bag's perimeter edges; (c) hook and loop-type closures which are centrally-positioned on one of the bag's surfaces (see, e.g., FIGS. 9A-9C, infra.); and (d) zipper-type closures which are centrally-positioned on one of the bag's surfaces (see, e.g., FIGS. 10A-10C, infra.).

Figure 9A:
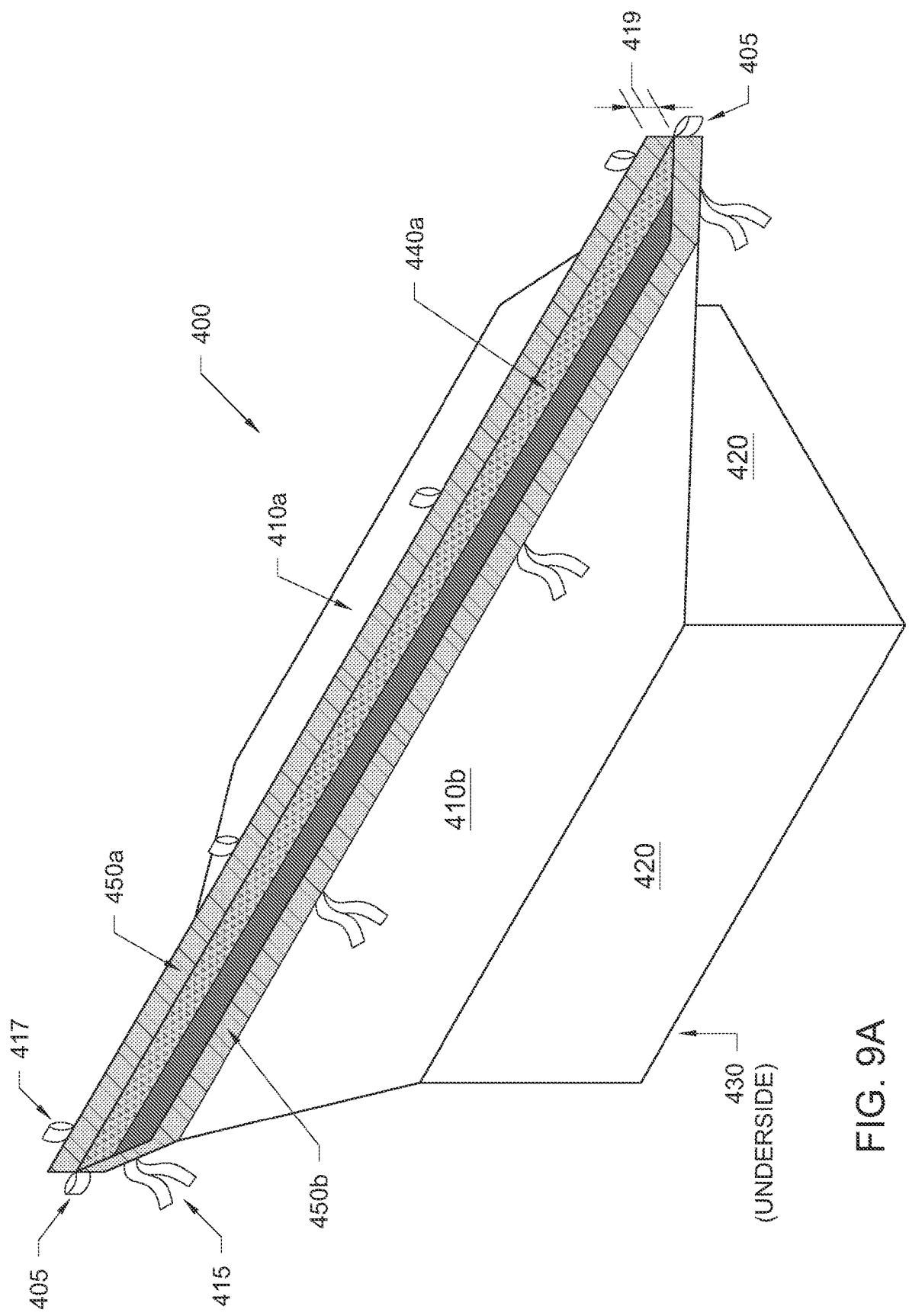
FIG. 9A is a perspective view of still another embodiment of a new and improved industrial containment bag encompassed by this invention, wherein the bag comprises: (a) a "hook and loop-type" closure system centrally-positioned on the bag's top surface which creates two-opposing triangular-shaped folds when closed, and (b) of a closure pressure-relieving system with a "flap-securing" configuration employing both, a "hook and loop-type" securing system and a "strap-type" securing system, wherein this particular "flap-securing" configuration is designed to, among other things: (i) reduce the torsional forces exerted on the bag's closure system when it is filled and subsequently lifted, transported, stored and/or disposed, and (ii) cover and protect that portion of the bag's closure system over which it traverses.

FIG. 9A is a perspective view of yet another embodiment of this invention. In FIG. 9A, industrial containment bag 400 has a hook and loop-type closure system which is centrally-positioned on the bag's top surface. The bag's top, when closed, is represented by corresponding top portion segments 410a and 410b. Bag 400 has sidewall surfaces 420 and a bottom surface 430 (not shown). Bag 400 also has pull straps 405 which, when pulled in opposite directions away from their respective sidewall, result in the bag's top portion segments 410a and 410b moving together towards a closed position. In the particular view illustrated in FIG. 9A, bag 400 is shown in a partially-closed position.

Bag 400's primary closure system connecting/securing its top portion segments 410a and 410b together is a "hook and loop" type closure system. This hook and loop closure system is represented by: (a) hook and loop component 440a which is attached to the inside wall surface of the bag at a location which is aligned with, but positioned inward from, the upper edge of top portion segment 410a, and (b) corresponding hook and loop component 440b which is attached to the inside wall surface of the bag at a location which is aligned with, but positioned inward from, the upper edge of top portion segment 410b—while not shown in FIG. 9A, this can be seen in the cross-sectional views FIGS. 9B and 9C (defined infra.). A more detailed explanation of bag 400's closure system and how its respective components are positioned thereon will be discussed in FIGS. 9B and 9C, below.

Referring back to FIG. 9A, the closure pressure-relieving system used in this particular embodiment comprises both, a "flap-securing" configuration and a "belt-securing" configuration. Here, the flap securing configuration is an integrated part of the bag's top portion segment 410*a* (as opposed to being a separate flap sewn to the bag's surface as illustrated in the earlier embodiments). Specifically, as will be demonstrated in more detail when discussing FIGS. 9B and 9C, bag top portion segment 410*a* is longer in length than its corresponding top portion segment 410*b*. The additional length of bag top portion segment 410*a* creates pressure-relieving flap 419.

In FIG. 9A, the "flap-securing" configuration being employed comprises a "hook and loop" type system. This particular hook and loop system comprises: (a) pressure-relieving flap 419 which is an integral part of bag top portion segment 410*a*; (b) hook and loop component 450*a* which, while it is attached to the inside wall surface of the bag at a location which is aligned with, but positioned inward from the upper edge of top portion segment 410*a*, it is also at a location which is above hook and loop component 440*a* (see, e.g., FIGS. 9B and 9C), and (c) corresponding hook and loop component 450*b* which is attached to the outside wall surface of the bag at a location which is aligned with, but positioned inward from, the upper edge of top portion segment 410*b*.

The "belt-securing" configuration of this particular closure pressure-relieving system comprises a series of individually-linking strap systems. In this particular embodiment, each individually-linking strap system comprises a first strap component 415 which has one end fixedly attached to the outside wall surface of bag's top portion segment 410*b*, and two other ends, both of which are loose. It is within the purview of this invention for there to be only one loose end on first strap component 415.

Each individually-linking strap system in this embodiment also has a corresponding receiving component 417 which is fixedly attached to the outside wall surface of bag top portion segment 410*a*. In FIG. 9A, receiving component 417 has a "belt loop" configuration such that at least one of the loose ends of strap component 415 can pass there through.

Figure 9B:
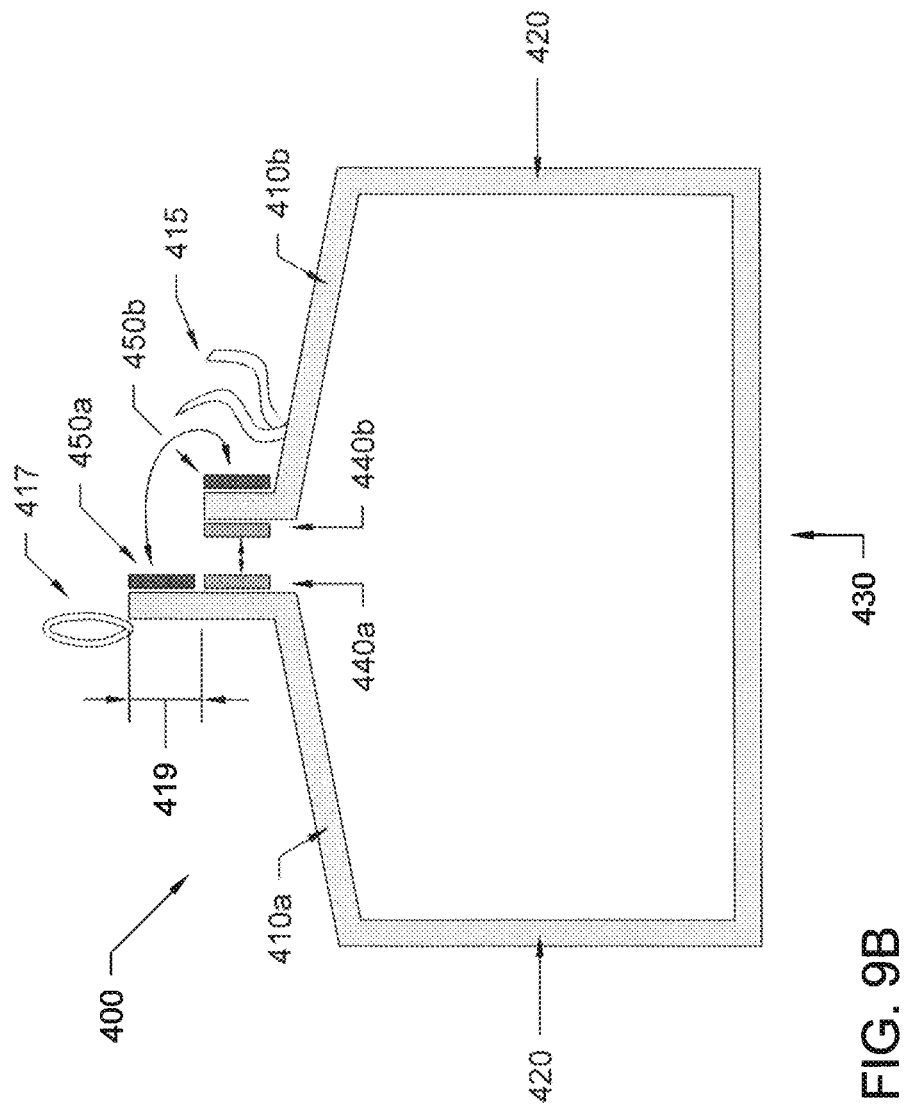
FIG. 9B is a cross-sectional view of the industrial containment bag of FIG. 9A with the bag's opening in a partially-closed position.

In order to better visualize how this particular embodiment of the invention functions to, not only reduce the torsional forces exerted on the closure system of bag 400; but also at the same time, cover and protect a portion of that bag's closure system, refer now to FIGS. 9B and 9C—both of which are cross-sectional depictions of bag 400 illustrated in FIG. 9A. Specifically, FIG. 9B shows a cross-sectional view of bag 400 in a partially closed position; and FIG. 9C shows a cross-sectional view of bag 400 in a fully closed position. In FIGS. 9A-9C, like numbers are used to identify like components.

In FIG. 9B, this particular cross-sectional view shows bag 400's closure system in a partially-closed position, with hook and loop component 440*a* and corresponding hook and loop component 440*b*. In practice, as loops 405 (not shown) are pulled away from one another, hook and loop components 440*a* and 440*b* move closer together until they unite and adhere to each other as is shown in FIG. 9C (defined infra.).

In conventional prior art practices, industrial bags using centrally-displaced hook and loop closure systems typically stop at this step and deem the bag to be secured in its closed position (i.e., no further securing practices are employed). However, problems have been noticed throughout the industry when outwardly-displaced torsional forces are exerted on such conventional hook and loop closure systems. For example, depending upon that level of outwardly-displaced torsional force, since conventional hook and loop systems are inherently designed to be "pulled apart", the exertion of such forces can cause the hook and loop system to open; thus, exposing the bag's contents to the surrounding people and environment. Although this is an inherent (and potentially highly dangerous) problem of such a closure system, prior to the advent of the present invention, prior to the advent of this invention, the industry had not devised a successful method to minimize its probability of occurring, while at the same time: (a) retaining the ability of hook and loop closure systems to be easily re-opened at some point in the future if so desired; (b) reducing the torsional forces exerted on the bag's closure system when it is filled and subsequently lifted, transported, stored and/or disposed; and (c) adding an additional layer of protection by covering that closure system.

As can be seen in FIGS. 9A-9C, this invention provides such a resolution to this problem. Specifically, as can be better seen in FIGS. 9B and 9C, in addition to the conventional closure system represented by corresponding hook and loop components 440*a* and 440*b*, bag 400 also includes a closure pressure-relieving system represented by the following: (a) flap portion 419; (b) corresponding hook and loop components 450*a* and 450*b*, and (c) belt strap and receiving components 415 and 417, respectively. After hook and loop components 440*a* and 440*b* are interconnected (see, FIG. 9C), flap 419 is pulled tightly and draped over the bag's closure created by the interconnection of hook and loop components 440*a* and 440*b*. Then, while continuing to keep flap 419 pulled tightly, corresponding hook and loop components 450*a* and 450*b* are used to lock flap 419 into its closure pressure-relieving position so as to reduce the torsional forces exerted on the bag's closure system when it is filled and subsequently lifted, transported, stored and/or disposed.

While it is within the purview of this invention to stop here, FIGS. 9A-9C show a preferred embodiment were the closure pressure-relieving system further comprises a belt-securing configuration. Specifically, in this preferred embodiment, after the closure pressure-relieving system components 450*a* and 450*b* are interconnected to one another in a closure pressure-relieving position, the loose end(s) of strap component 415 of each individually-linking strap system is/are passed through the corresponding receiving component 417. Thereafter, the components 415 and 417 are tightly interconnected to one another (e.g., by tying) preferably in a manner where they too assist in reducing the torsional forces exerted on the bag's closure system when it is filled and subsequently lifted, transported, stored and/or disposed.

Figure 10A:
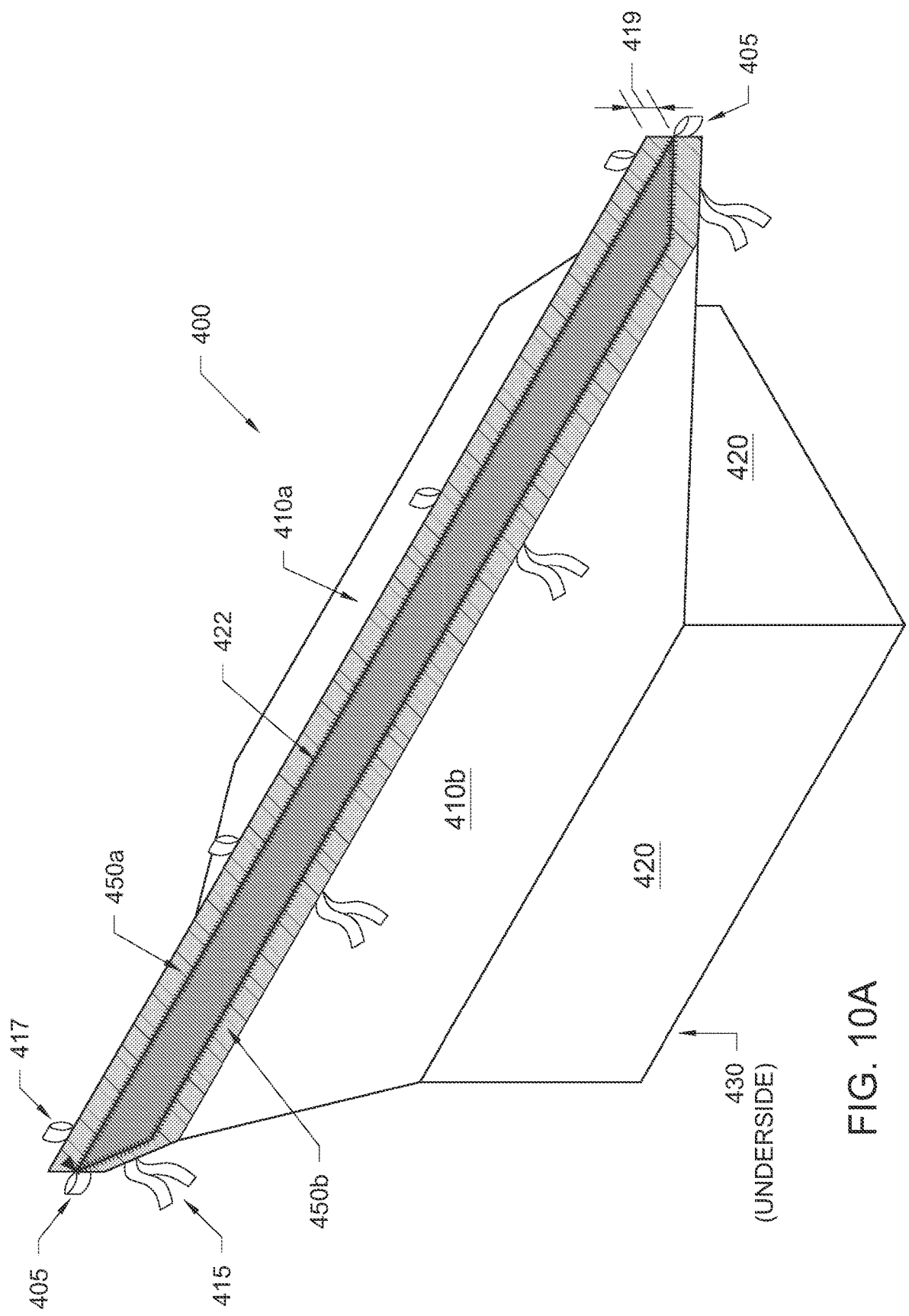
FIG. 10A is a perspective view of even another embodiment of a new and improved industrial containment bag encompassed by this invention, wherein the bag comprises: (a) a "zipper-type" closure system centrally-positioned on the bag's top surface which creates two-opposing triangular-shaped folds when closed, and (b) a closure pressure-relieving system with a "flap-securing" configuration employing both, a "hook and loop-type" securing system and a "strap-type" securing system, wherein this particular "flap-securing" configuration is designed to, among other things: (i) reduce the torsional forces exerted on the bag's closure system when it is filled and subsequently lifted, transported, stored and/or disposed, and (ii) cover and protect that portion of the bag's closure system over which it traverses.
Figure 10B:
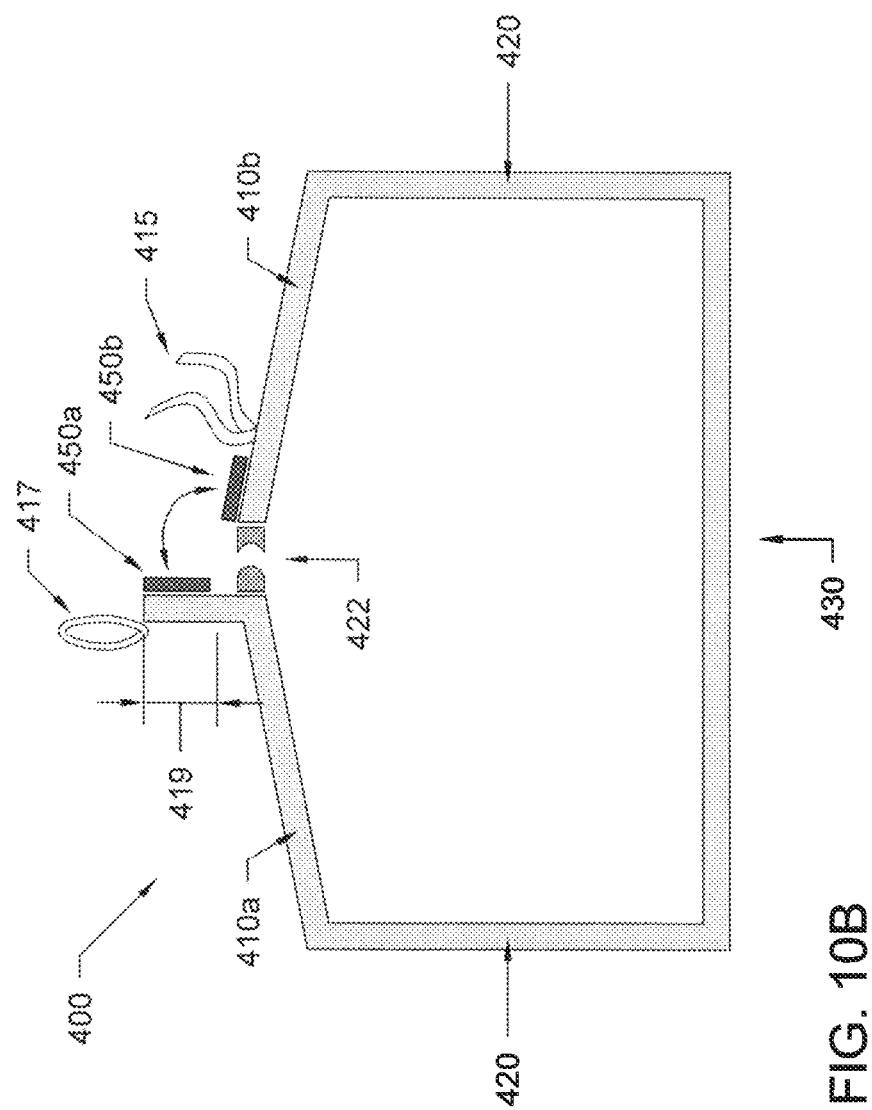
FIG. 10B is a cross-sectional view of the industrial containment bag of FIG. 10A with the bag's opening in a partially-closed position.

For illustrative purposes, FIGS. 10A-10C show essentially the same preferred configuration as illustrated in FIGS. 9A-9C, with the exception that, in FIGS. 10A-10C, bag 400's closure system is a centrally displace "zipper" system 422, as opposed to the centrally displaced "hook and loop" system of FIGS. 9A-9C. In FIGS. 10A-10C, like numbers are used to identify like components (see, FIGS. 9A-9C).

Regarding the embodiments illustrated in FIGS. 9A-9C and in FIGS. 10A-10C, it is within the purview of this invention for either embodiment to employ as part of their respective closure pressure-relieving system "only" a an individually-linking strap system, or "only" a hook and loop system (as oppose to "both", as is shown in those preferred embodiments). It is also within the purview of this invention for such an individually-linking strap system and/or for such a hook and loop system to employ the use of a reinforcement strap system as described earlier to provide even greater strength to the various closure pressure-relieving device components encompassed by the present invention.

When an industrial containment bag has a closure which is centrally-positioned on its top portion, and when the particular closure pressure-relieving system being employed has a flap-securing configuration, in addition to at least some of the torsional forces exerted on the bag's closure being reduces, the following other benefits also result: (a) the securing flap shields that portion of the bag's closure system over which it is draped from the weather and environment; and (b) the securing flap adds another sealing layer over at least a portion of the bag's closure system. These additional benefits have the effect of, not only making the bag's closure system more secure; but also, decreasing the permeability factor of solids, liquids and/or gasses therethrough.

As mentioned above, there are two basic types of industrial containment bags. One type has the ability to stand on its own when empty (a.k.a. "self-supporting bags"); while the other type does not have such a free-standing capability (a.k.a. "non self-supporting bags"). Regarding non-self-supporting bags, when in use, they are typically placed into a supporting structure such as a "dumpster-type container" (e.g., a railcar, an intermodal container, a dumpster, a truck bed, etc.) or a loading frame prior to being filled. However, as explained above, due to the inherent soft-sided nature of such a bag, after being placed into the dumpster-type container or loading frame, its sidewalls need to be secured in a raised position before the filling process can begin.

If a non self-supporting bag is designed such that it has a single opening centrally located on its top (see, e.g., FIG. 4A), after the bag is placed into its container/loading frame, the upper portion of its flexible sidewalls can be draped over the rigid walls of that container/loading frame (see, e.g., FIG. 4B). This draping process can be used to hold the bag's sidewalls in an upright position while the bag is still empty.

Figure 11A:
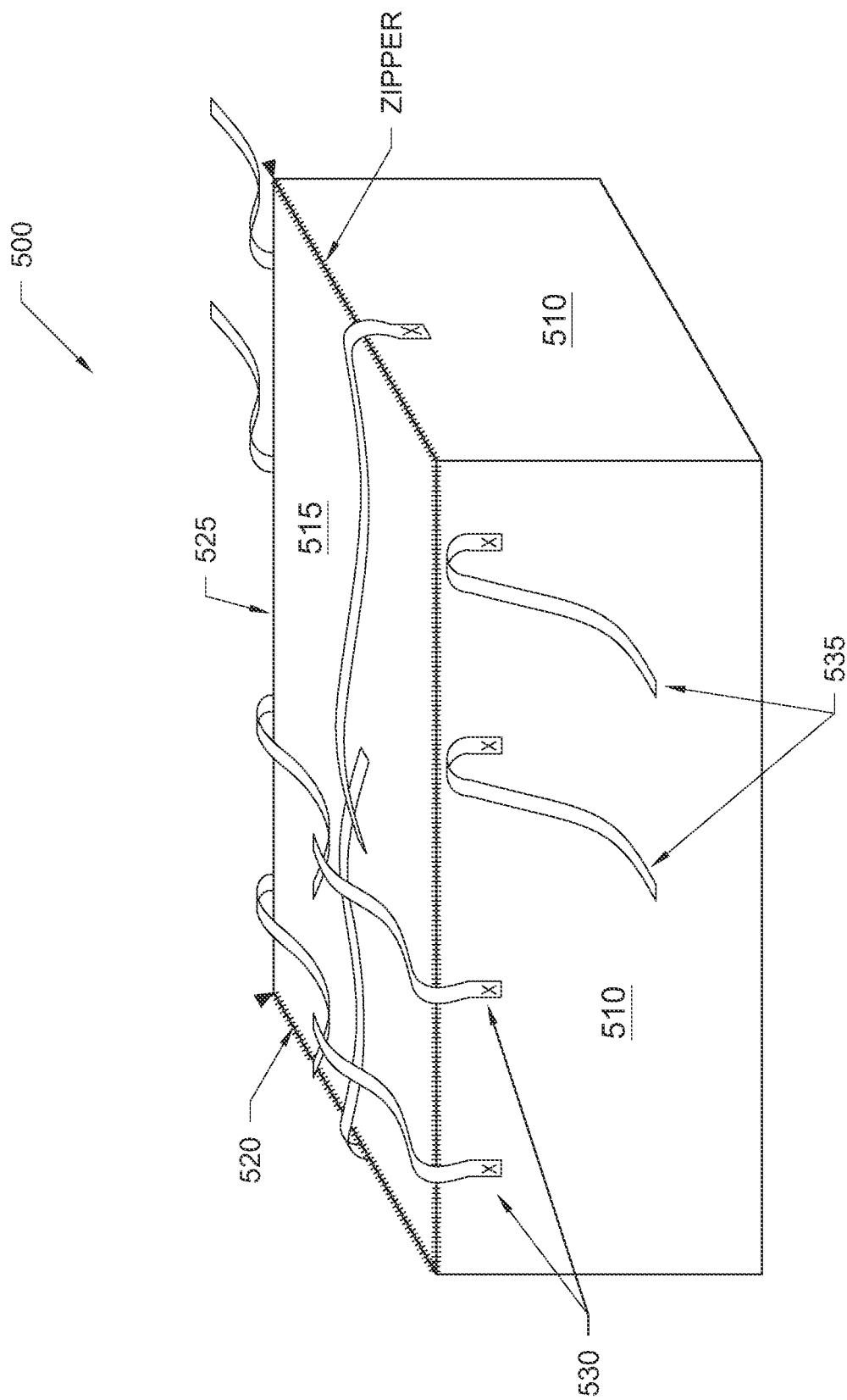
FIG. 11A is a perspective view of a prior art non self-supporting industrial containment bag with a closure positioned directly on its top perimeter edge, wherein the bag includes a plurality of "hold-up" straps fixedly attached to the exterior surface of its sidewalls, and wherein this plurality of straps are designed to hold the bag's sidewalls up against the internal walls of a supporting structure into which it is placed for filling purposes so that the bag's opened portion, when empty, substantially aligns with the container's opening.
Figure 11B:
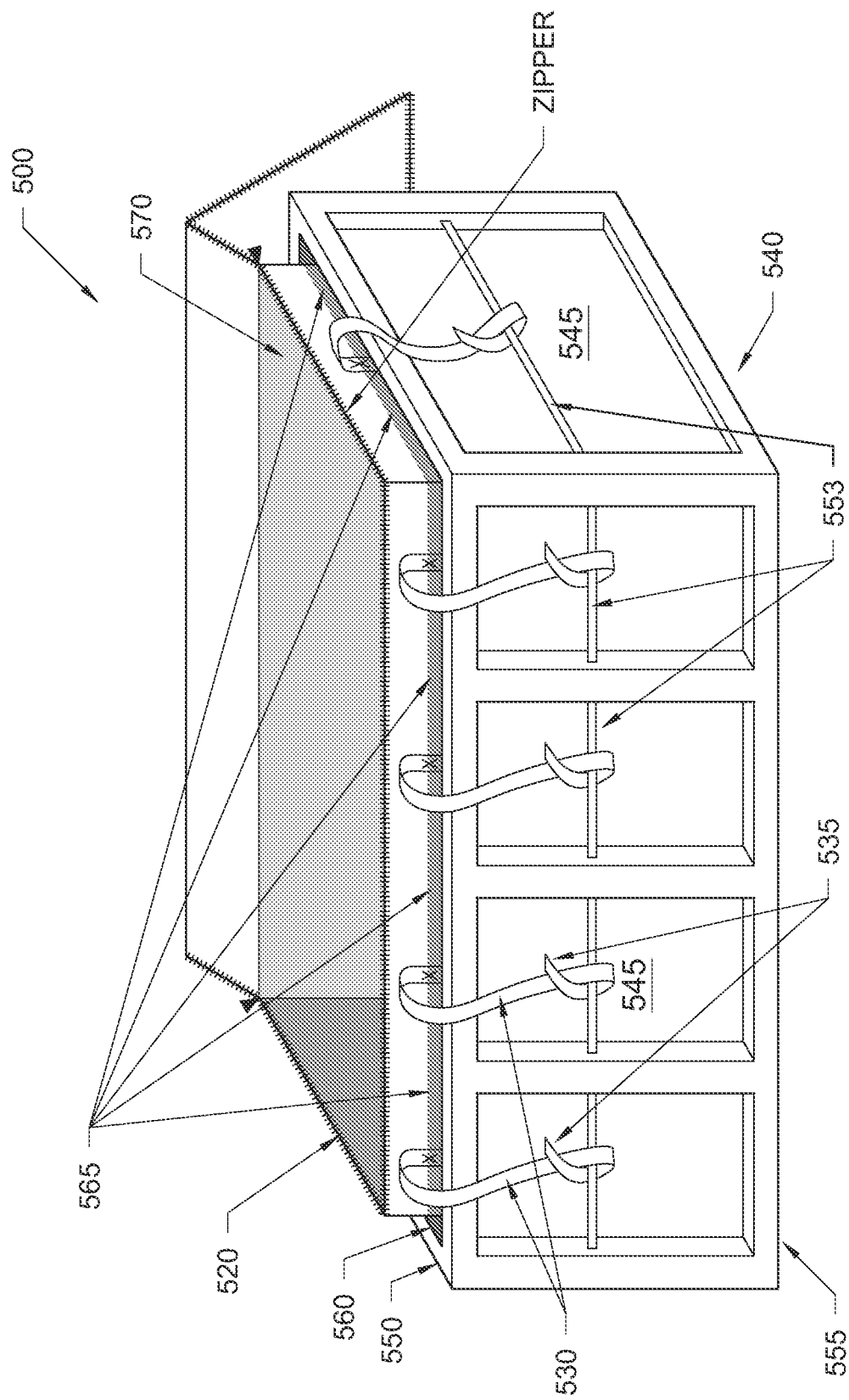
FIG. 11B is a perspective view of the prior art industrial containment bag of FIG. 11A positioned in a dumpster-type container, wherein its plurality of hold-up straps are connected to the container's outer walls such that the opened portion of the bag is held up to substantially align with the container's opening.

If, however, a non self-supporting bag is designed such that its top opening is directly on, or positioned inwardly from, its top perimeter edge (see, e.g., FIG. 1 and FIG. 2, respectively), the current method of choice for supporting the walls of such empty bags in a container/loading frame is through the use of a series of "hold-up" straps. FIGS. 11A and 11B show one prior art example of how and where such hold-up straps are typically positioned on a non self-supporting bag, as well as how such a prior art bag is typically used in conjunction with a container/loading frame.

FIG. 11A is a perspective view of a prior art bag 500. As mentioned above, bag 500 is a non self-supporting bag. Accordingly, containment bag 500 is made entirely of non self-supporting materials.

Bag 500 has sidewalls 510 and a top 515. The line where the sidewalls 510 meet top 515 is the bag's top perimeter edge 520. Bag 500 has a U-shaped zipper closure system running along three sides of its top perimeter edge. With the configuration of this zipper closure system, the entire top 515 of the bag acts like a hinged lid which can be opened and closed. The hinge 525 is that portion of the bag's top perimeter edge over which the zipper closure system does not run. In FIG. 11A, bag 500 has its opening in a closed and secured position.

Since bag 500 is non self-supporting, in order for it to be filled it typically: (a) is used in conjunction with a supporting structure, and (b) incorporates some method for holding its sidewalls 510 in an upright position when the bag is empty and positioned within a supporting structure prior to being filled. In the particular prior art configuration illustrated in FIG. 11A, bag 500 includes a series of "hold-up" straps 530, each of which: (a) has a secured end 533 which is fixedly attached to the outside surface of sidewalls 510, (b) has its secured end 533 attached to the outside surface of sidewalls 510 at a location which is aligned with, but outwardly displaced from, the bag's top perimeter edge 520, and (c) has a loose end 535.

FIG. 11B is a perspective view of how such a conventional prior art bag is typically used in conjunction with a supporting structure. Specifically, FIG. 11B shows bag 500 positioned in dumpster-type container 540. In this view, bag 500 is fully opened.

Container 540 has sidewalls 545 which define a top perimeter edge 550, and a bottom perimeter edge 555. Container 540 also has a series of tie bars 553 horizontally positioned on each of sidewalls 545 at a location which is between its top and bottom perimeter edges 550 and 555, respectively. Container 540's top perimeter edge 550 defines its opening 560.

In FIG. 11B, bag 500's top perimeter edge 520 is substantially aligned with container 540's top 560 defined by its top perimeter edge 550 After bag 500 is placed into container 540 through opening 560, but before the filling process is initiated, the loose ends 535 of each hold-up strap 530 are draped over container 540's top perimeter edge 550. Thereafter, each loose end 535 is pulled tightly enough until bag 500's top perimeter edge 520 is raised to (or slightly above) the height of container 540's sidewalls 545. Once raised to the desired level, the loose ends 535 of each hold-up strap 530 is secured (e.g., tied) to one of container 540's tie bars 553.

Although the prior art configuration illustrated in FIGS. 11A and 11B is the generally-accepted method used throughout the industrial containment bag industry for holding up non self-supporting bags within a supporting structure, it, none-the-less, has a number of inherent problems associated therewith. For example, as can be seen in FIG. 11B, regardless of how tightly hold-up straps 530 are pulled and secured in place, gaps 565 are formed. As can be seen, gaps 565 are found in numerous locations around container 540's top perimeter edge 560. Gaps 565 provide numerous opportunities for debris that is being loaded into bag 500's opening 570 to fall therein; and thus, contaminate the inside of container 540.

Another inherent problem associated with the use of such a conventional method for holding up non self-supporting bags within a support structure is that this particular method directly exposes bag 500's perimeter closure system to being contaminated by the debris as it is being loaded into bag opening 570. This contamination can damage parts of bag 500's closure system to the extent that it will not close properly (if at all) after bag 500 is filled. If this was to occur, it can result in bag 500's closure system failing (and thus exposing the bag's contents to the surrounding people and environment). Moreover, if the closure system is damaged to the extent that it will not fully close after the bag is filled, this will result in bag 500 having to be emptied, replaced with a new bag, and then re-filled.

Certain preferred embodiments of this invention resolve the problems set out above that have been plaguing the industrial containment bag industry for decades. Specifically, in addition to being able to reduce the torsional forces exerted on a bag's closure system when the bag is filled, and subsequently lifted, transported, stored and/or disposed, if these preferred embodiments are employed on non self-supporting containment bags having a closure system positioned directly on, or aligned with but set inward from, the bag's top perimeter edge, they can be used to hold up the side walls of an empty bag within a container in a manner which: (a) eliminates the formation of gaps between the outside walls of the bag and the inside walls of the container—thus minimizing the possible contamination of the support structure, and (b) moves the bag's closure system away from the bag's opening—thus, minimizing the possible contamination of that closure system during the bag filling process.

One illustrative example of such a preferred embodiment encompassed by the present invention is employed on a containment bag having a closure system positioned directly on, or aligned with but set inward from, its top perimeter edge as shown in FIGS. 12A-12E (described in detail infra.). Another illustrative example of such a preferred embodiment encompassed by the present invention is employed on a containment bag having a centrally-located closure system position in the bag's top portion as shown in FIGS. 13A-13C (described in detail infra.).

Figure 12A:
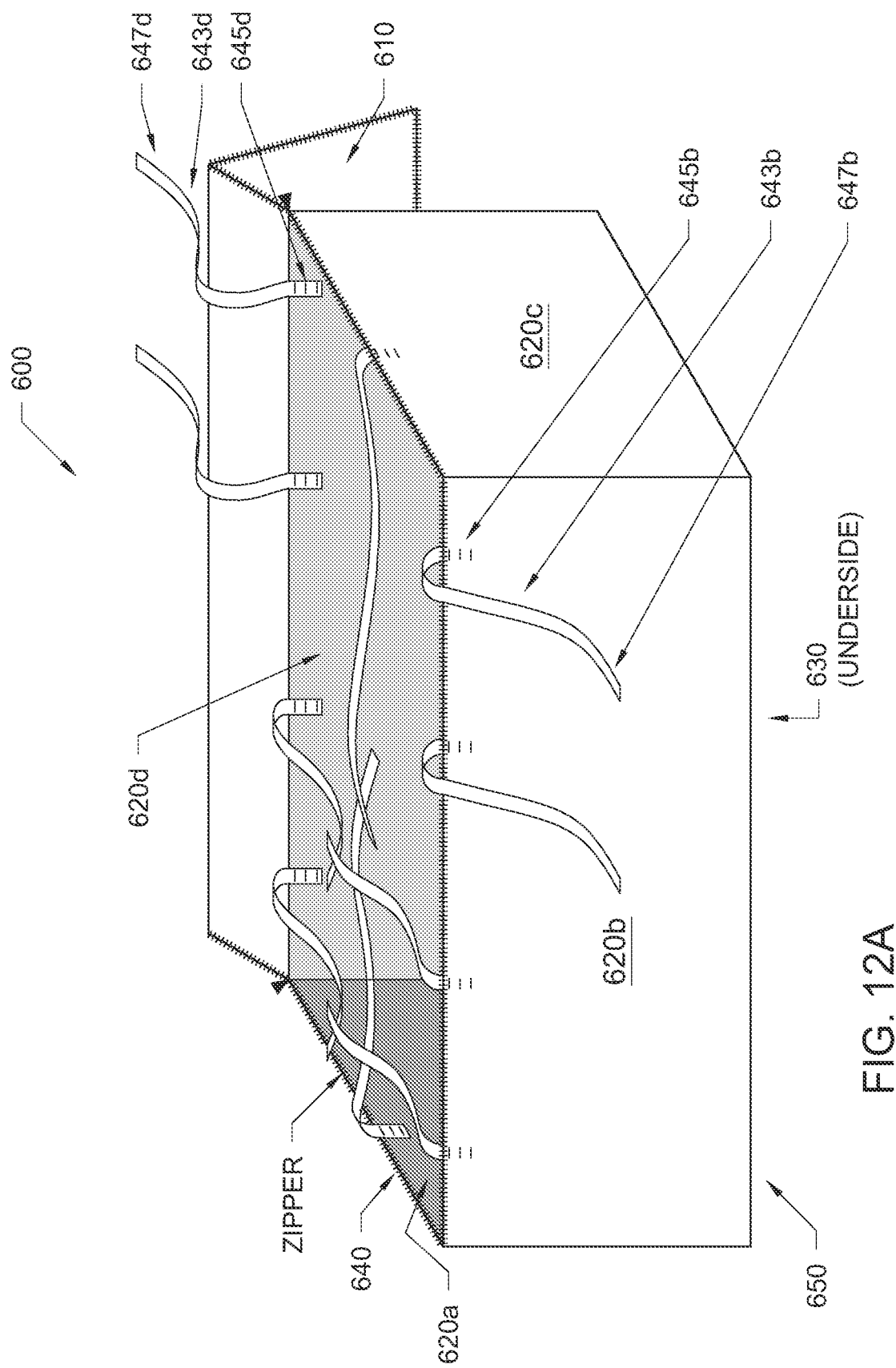
FIG. 12A is a perspective view of another embodiment of a new and improved industrial containment bag encompassed by this invention, wherein the bag is non self-supporting and comprises: (a) a closure system positioned directly on its top perimeter edge, and (b) a closure pressure-relieving system designed to: (i) reduce the torsional forces exerted on the bag's closure system when it is filled and subsequently lifted, transported, stored and/or disposed, (ii) facilitate the bag's closing process after being filled, and (iii) hold the bag up against, and over the edge of, the internal walls of a supporting structure into which it is placed for filling.

Specifically, FIG. 12A is a perspective view of another embodiment of a closure pressure-relieving system that can be employed when practicing this invention on industrial containment bags having a closure system which is positioned on, or aligned with but inwardly spaced from, the bag's top perimeter edge. Specifically, FIG. 12 shows industrial containment bag 600. Although containment bag 600 can be self-supporting or non self-supporting, for illustrative purposes only, the containment bag shown in FIG. 12A is non self-supporting. As such, for this example, the containment bag in FIG. 12A is made entirely of non self-supporting materials.

Bag 600 has a top portion 610, sidewall portions 620*a*, 620*b*, 620*c* and 620*d*, and a bottom portion 630 (not shown). Since in this illustration, bag 600 is illustrated in its opened position, some of the bag's inside wall surfaces are shown. When bag 600 is in its closed position: (a) its top portion 610 is parallel to and laterally spaced above bottom portion 630; (b) its bottom portion 630 is parallel to and laterally spaced below bottom portion 610; and (c) its sidewall portions 620*a*, 620*b*, 620*c* and 620*d* are perpendicular to the bag's top and bottom portions and positioned therebetween.

The path along which sidewall portions 620*a*, 620*b*, 620*c* and 620*d* interconnect with top portion 610 creates the bag's top perimeter edge 640. Similarly, the path along which sidewall portions 620*a*, 620*b*, 620*c* and 620*d* interconnect with bottom portion 630 creates the bag's bottom perimeter edge 650. Bag 600's top portion 610 functions as its closable flap.

In FIG. 12A, top portion 610 is securable in a closed configuration with a zipper closure system running along a U-shaped path, and positioned directly on, the bag's top perimeter edge 640. A preferred zipper is a coil nylon zipper with two pulls positioned on the zipper tracks. The portion of the bag's top perimeter edge without a zipper functions as a hinge for top portion 610.

Unlike the other embodiments of closure pressure-relieving systems disclosed herein, this particular embodiment of the closure pressure-relieving system has its components fixedly attached to the inside surface of the containment bag's walls. It has been discovered that, fixedly attaching the closure pressure-relieving system's components to the inside surfaces of the bag (i.e., internally mounted) produces even further advantages and resolves even more problems, when compared to the conventional prior art practice of using externally-mounted hold-up straps as illustrated in FIGS. 11A and 11B. These further advantages will be better understood by referring to the illustrative examples of this embodiment of the invention as shown in FIGS. 12A-12C, FIGS. 13A-13C, FIGS. 14A-14C, and FIGS. 15A-15C.

In FIG. 12A, the closure pressure-relieving system comprises a series of individually-linking strap systems. Each individually-linking strap system of this particular example comprises two separate corresponding strap components.

For example, in FIG. 12A, a first strap component 643*d* of a particular individually-linking strap system has one of its ends 645*d* which is fixedly attached to the inside surface of sidewall 620*d* and its other end 647*d* which is loose. The corresponding second strap component 643*b* of the same individually-linking strap system has one of its ends 645*b* which is fixedly attached to the inside surface of opposing sidewall 620*b* and its other end 647*b* which is loose. In the particular example illustrated in FIG. 12A, the same applies to all of the other individually-linking strap systems regarding where their respective first and corresponding second parts are fixedly attached to the inside surface of their respective opposing sidewalls.

Figure 12B:
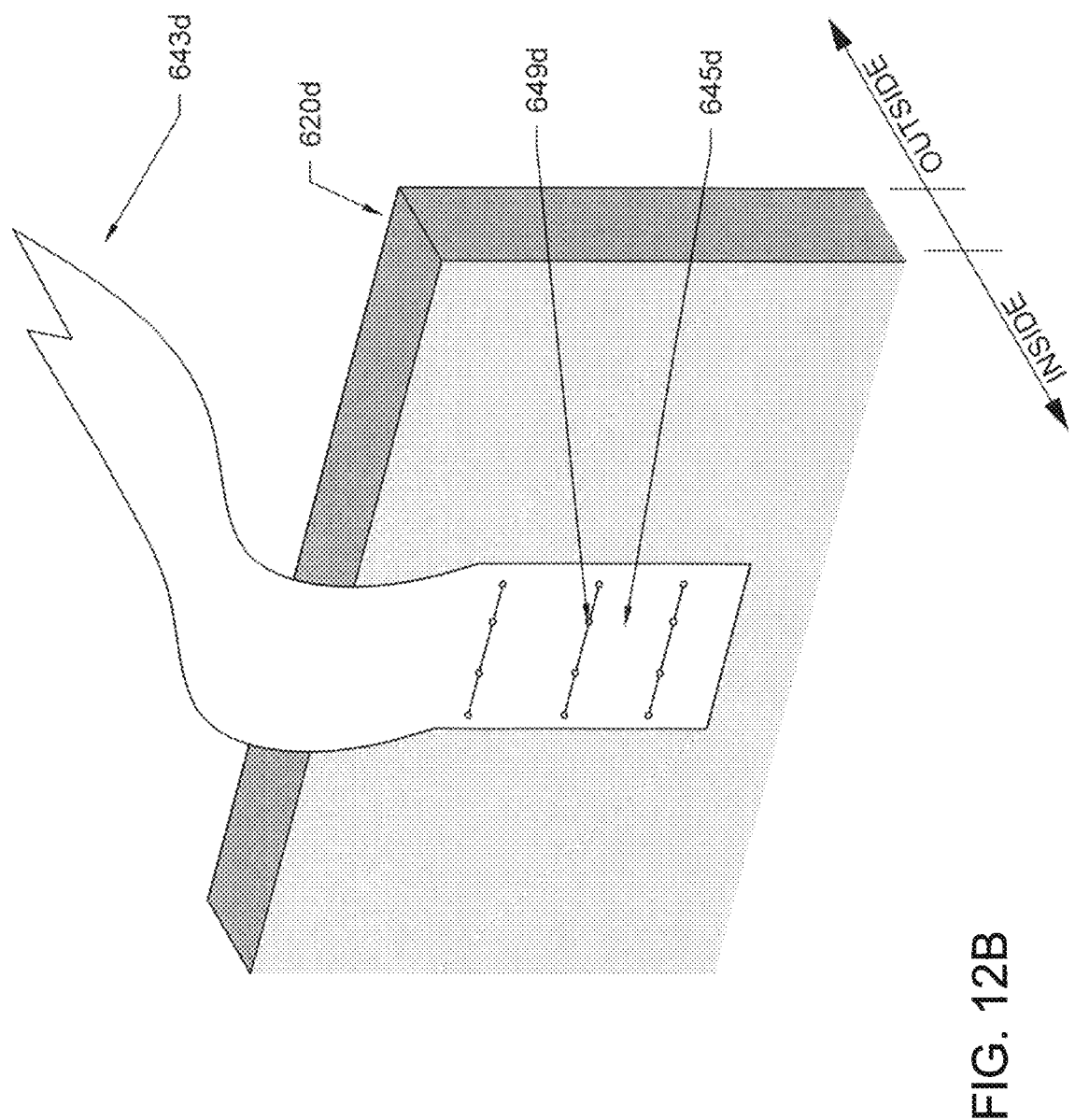
FIG. 12B is a blown-up perspective view of the containment bag of FIG. 12A showing one illustrative example of how the bag's closure pressure-relieving system can be fixedly attached to the bag's internal wall surface.
Figure 13A:
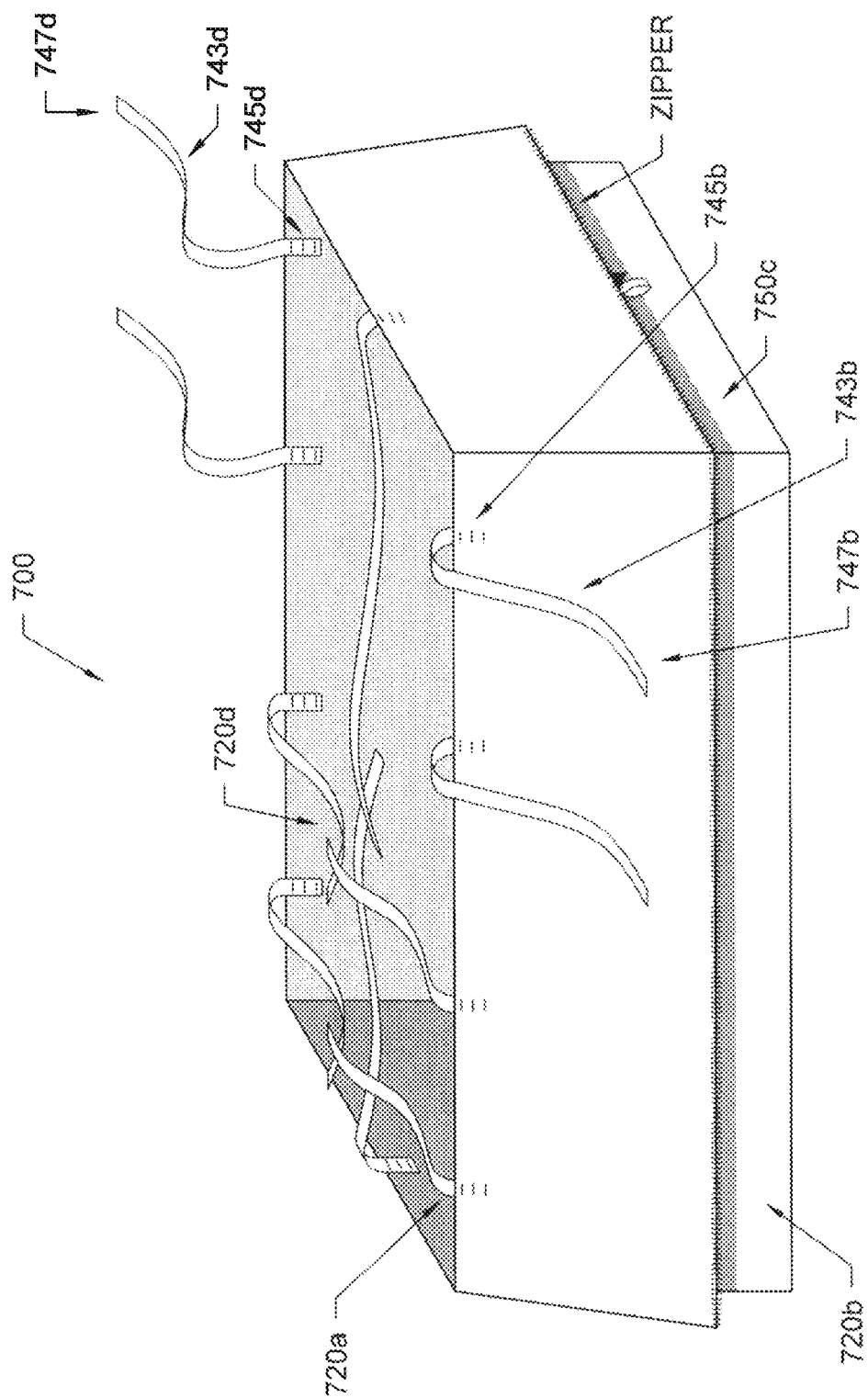
FIG. 13A is a perspective view of even another embodiment of a new and improved industrial containment bag encompassed by this invention, wherein the bag comprises: (a) a centrally-positioned closure system which creates two-opposing triangular-shaped folds when closed, and (b) a closure pressure-relieving system designed to: (i) facilitate the bag's closing process when filled, and (ii) reduce the torsional forces exerted on the bag's closure system when it is filled and subsequently lifted, transported, stored and/or disposed.
Figure 13B:
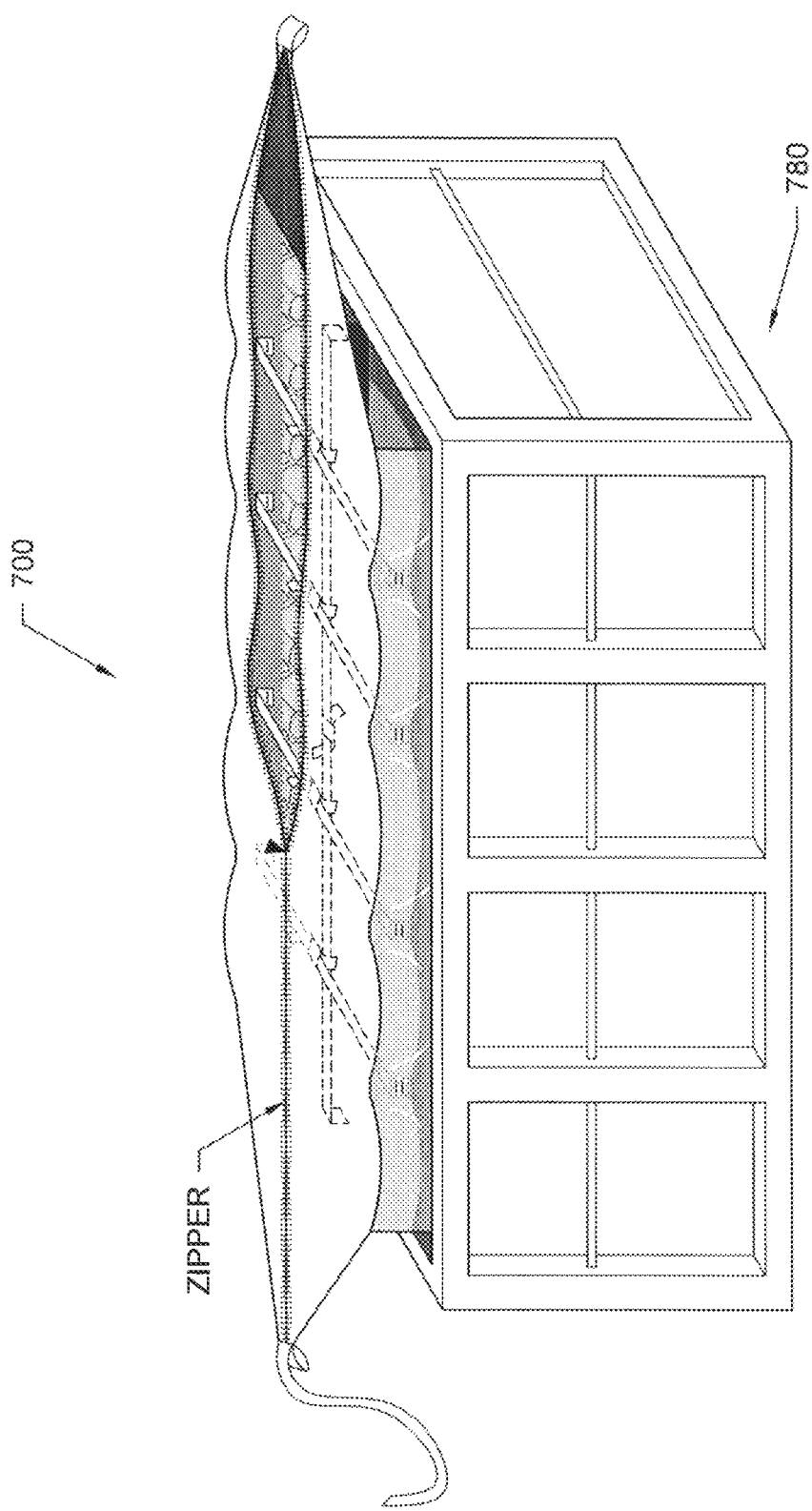
FIG. 13B is a perspective view of the containment bag of FIG. 13A placed in a dumpster-type container, wherein the bag is filled and partially closed, and wherein its closure pressure-relieving system is being used to pull together the internal bag's internal walls so as to: (a) facilitate the bag's closing process, and (b) reduce the torsional forces exerted on the bag's closure system when it is filled and subsequently lifted, transported, stored and/or disposed.
Figure 13C:
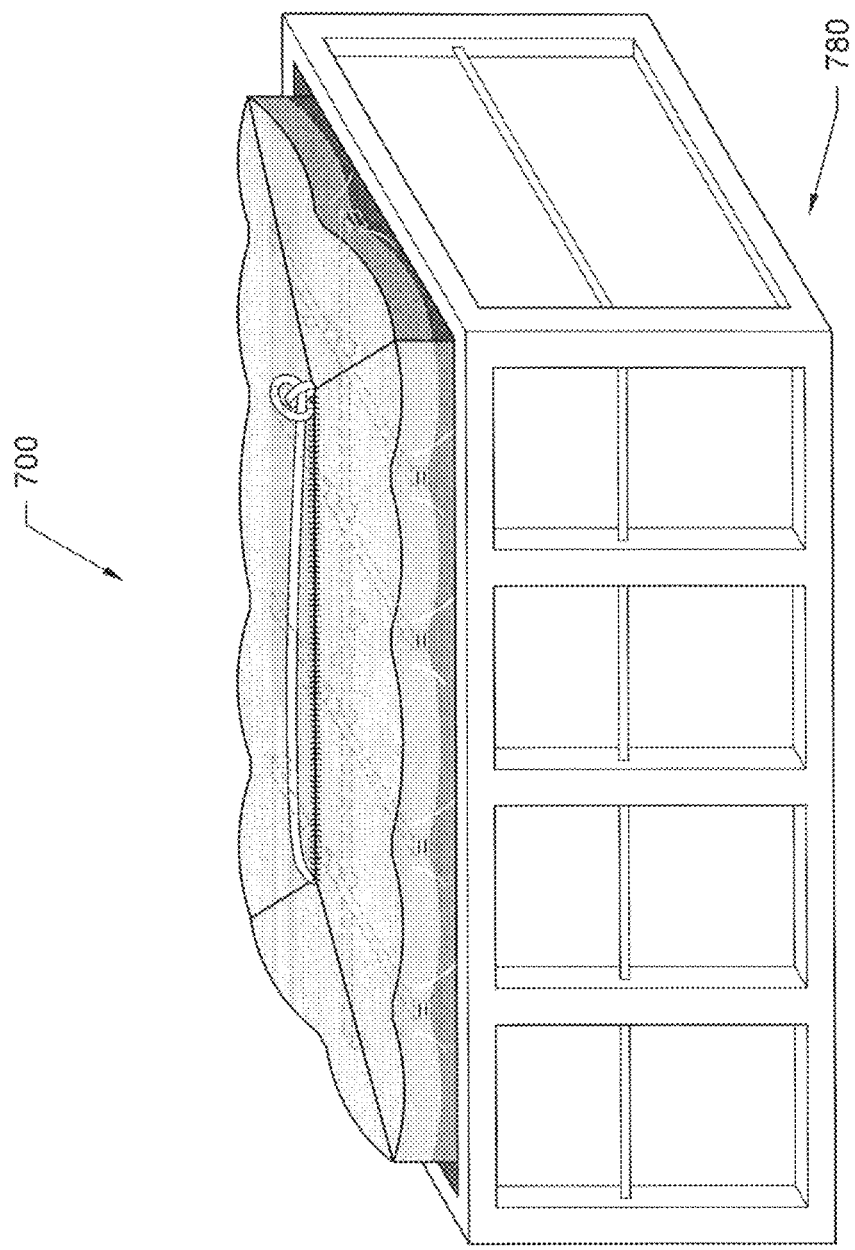
FIG. 13C is a perspective view of the containment bag of FIG. 13B, with its top closure system in a fully-closed position.

To further illustrate this point, FIG. 12B is a blown-up image of the attached end of one of the individual strap system's strap components. Specifically, FIG. 12B shows that the secured end 645*d* of the individual strap system's strap component is sewn via stitching 649*d* to the inside surface of sidewall 620*d*.

Figure 12C:
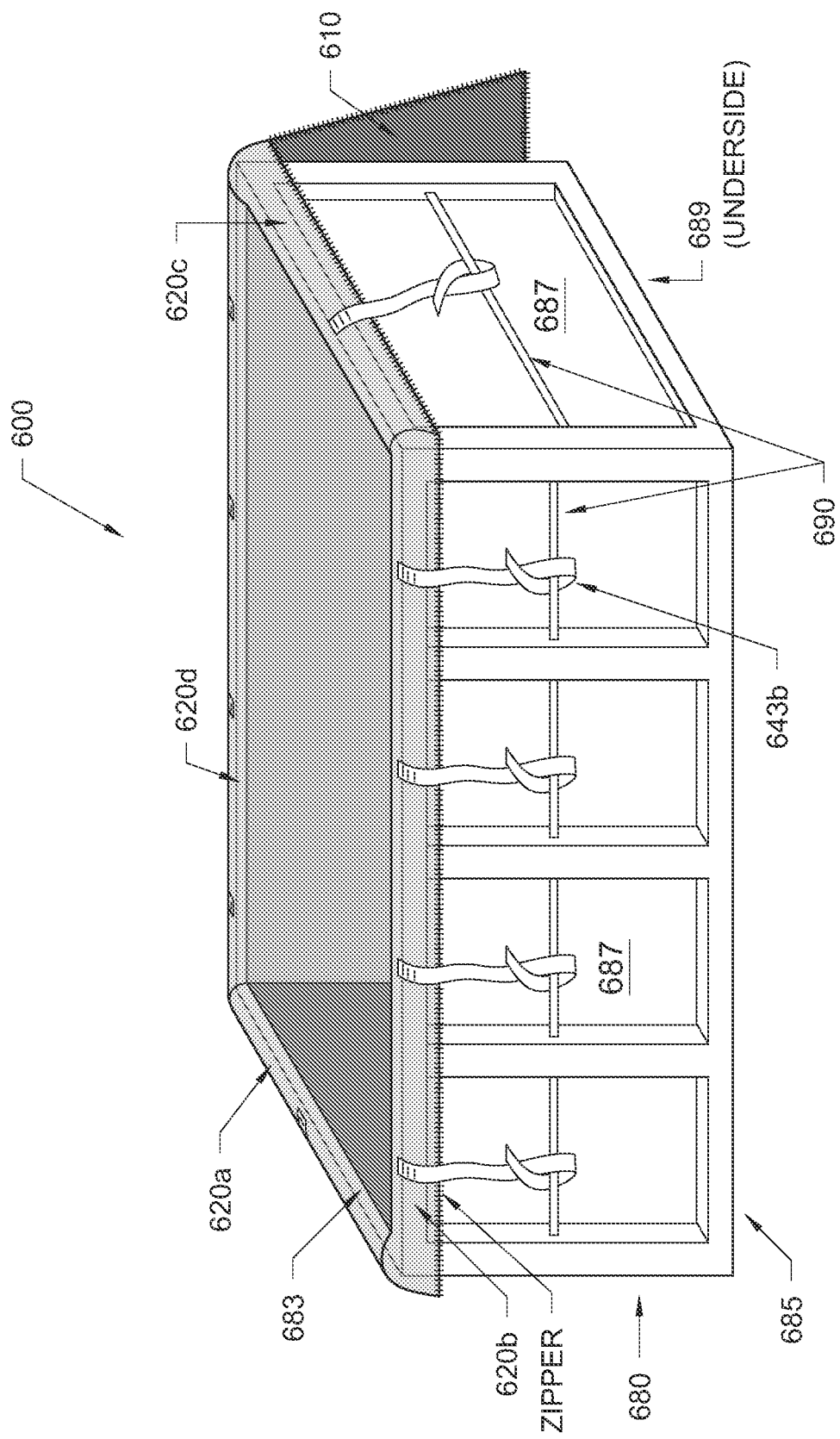
FIG. 12C is a perspective view of the containment bag of FIG. 12A placed in a dumpster-type container, with the bag's top closure system is in an opened position, and with its closure pressure-relieving system being used to hold the bag up against, and over the edge of, the walls of a container into which it is placed for filling.
Figure 12D:
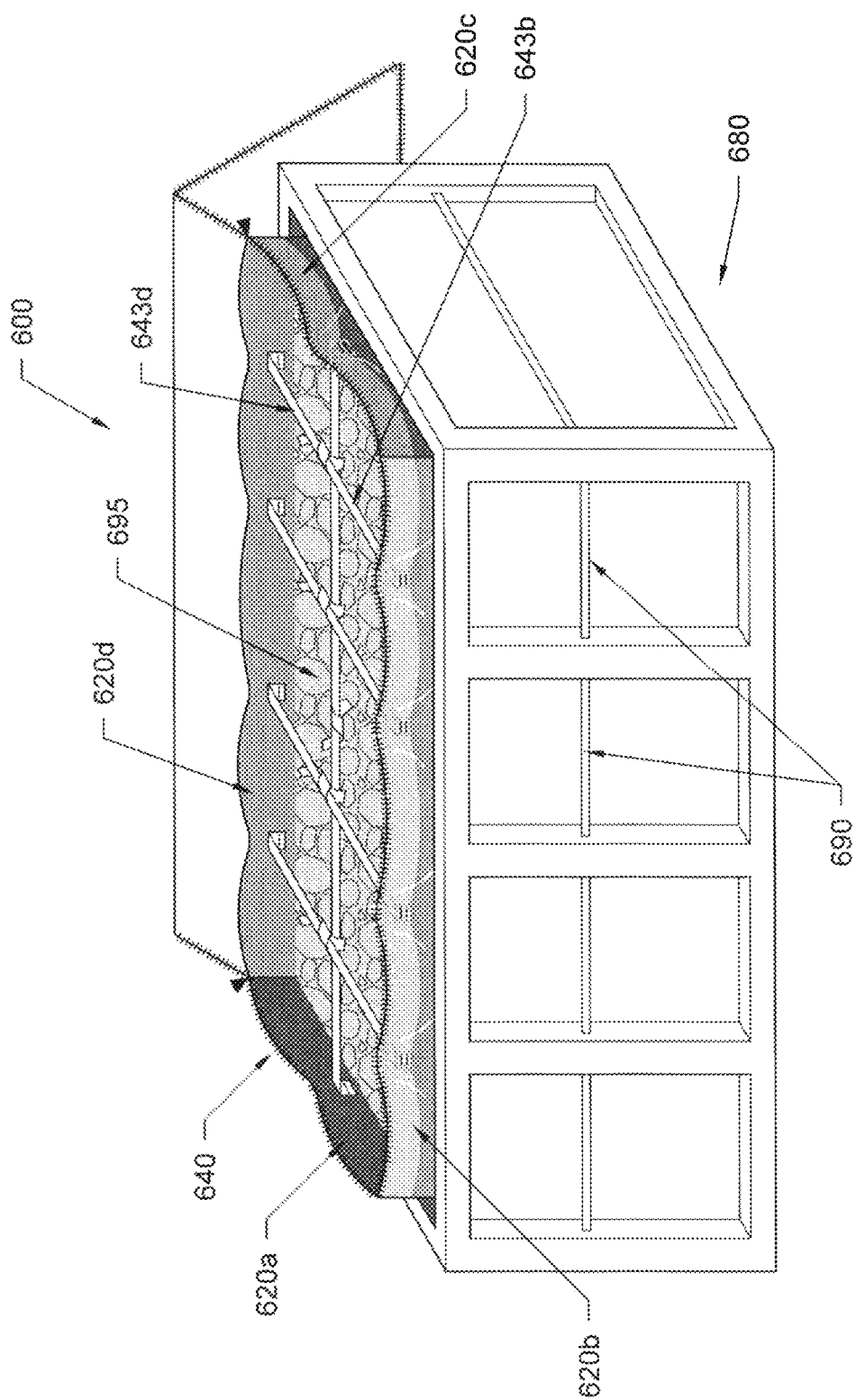
FIG. 12D is a perspective view of the containment bag of FIG. 12C, with its top closure system in an opened position, with bulk waste placed within the bag, and with its closure pressure-relieving system now being used to pull together the bag's walls so as to: (a) facilitate the bag's closing process, and (b) reduce the torsional forces exerted on the bag's closure system when it is filled and subsequently lifted, transported, stored and/or disposed.
Figure 12E:
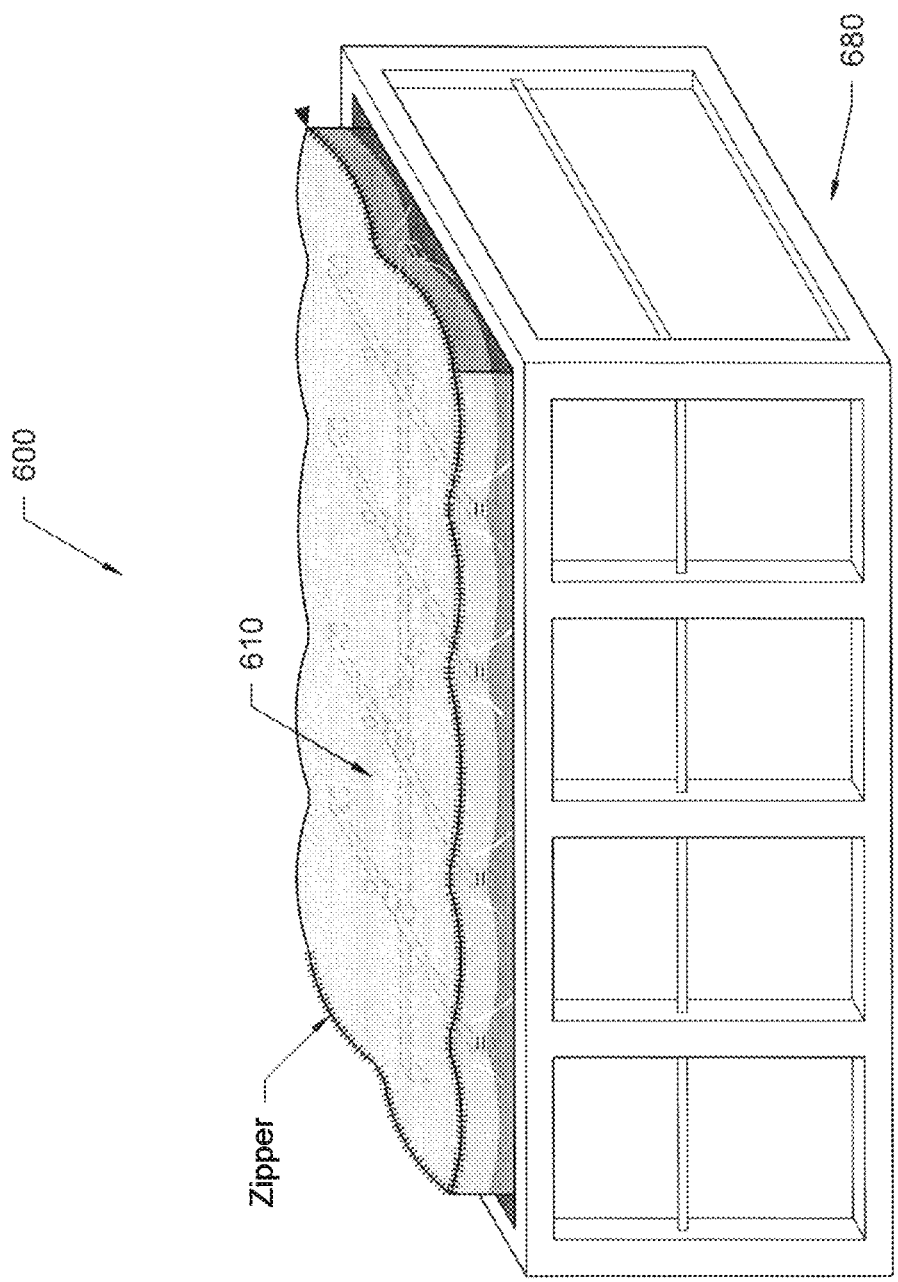
FIG. 12E is a perspective view of the containment bag of FIG. 12C, with its top closure system in a fully-closed position.

FIGS. 12C-12E demonstrate how such novel industrial containment bags encompassed by this invention resolve those inherent problems which are encountered when using the conventional, externally-mounted hold-up strap configuration illustrated in FIGS. 11A and 11B. In FIGS. 12A-12E like numbers are used to identify like components.

In FIG. 12C, bag 600 is positioned into the open end of dumpster-type container 680. Container 680 has a top perimeter edge 683 and a bottom perimeter edge 685. Both of these perimeter edges are defined by the container' sidewalls 687. Container 680 also has a bottom 689 (not shown).

Each of container sidewalls 687 have tie bars 690 horizontally positioned between its top and bottom perimeter edges 683 and 685, respectively. These bars are positioned on sidewalls 687 such that there is a space between each bar and the outside surface of its respective sidewall.

As mentioned above, bag 600 is non self-supporting. Accordingly, its sidewalls 620*a*, 620*b*, 620*c* and 620*d* need to be held up, and secured in that position, when the bag is empty. However, unlike the prior art containment bag which uses conventional, externally-mounted "hold-up" straps to perform this function (see, e.g., FIGS. 11A and 11B), bags encompassed by this particular embodiment of the invention use the internally-mounted individually-linking strap system's strap components of their closure pressure-relieving system for this purpose. Due to the unique design of this particular embodiment of a closure pressure-relieving system, when the individually-linking strap system's strap components are used to hold the bag's sidewalls in an upright position, such a use resolves many of the problems that are encountered with the use of conventional, externally-mounted "hold-up" strap systems.

In practice, a containment bag encompassed by this embodiment of the invention with a closure system positioned directly on, or aligned with but set inwardly from, the bag's top perimeter edge (e.g., a U-shaped zipper closure system) is positioned into the top opening of a supporting structure. Then, before initiating the filling process, the loose ends of the closure pressure-relieving system's internally-mounted strap components are pulled up and outwardly until the bag's top perimeter edge is held up and over the supporting structure's top perimeter edge. Then, while the empty bag is in this position, these loose ends of these various strap components are secured in place by being tied to one of the supporting structure's tie bars.

As one example of such a novel use, in FIG. 12C, the individual strap system's strap components (e.g., strap 643*b*) are used to support the sidewalls 620*a*, 620*b*, 620*c* and 620*d* of bag 600. Here, since these individually-linking strap components are internally mounted (i.e., fixedly attached to the inside surface of the bag's sidewalls), their use in this manner results in the ability to pull a portion of the sidewalls' upper portion up and over container 680's top perimeter edge 683. Accordingly, using the individually-linking strap system's strap components in this manner produces the following advantages over the current prior art practice which uses externally-mounted "hold-up" straps for this purpose: (a) there are no gaps created between the bag's sidewalls' outer surface and the inside of the container—thus, preventing the container's inside cavity from being contaminated with debris during a filling process, and (b) the bag's closure system is held away from the direct line of falling debris when the bag is being filled—thus, minimizing the damage that can occur to the closure system during a filling process.

FIG. 12D is a perspective view of the containment bag/supporting structure configuration illustrated in FIG. 12C when the bag is filled and the closure pressure-relieving system's individual strap components are now being used to, among other things, reduce the torsional forces exerted on the bag's closure system. Specifically, as can be seen in FIG. 12D, bag 600 is filled almost to its top perimeter edge 640 with debris 695. In this particular view, after being untied from container 680's tie bars 690, each of the closure pressure-relieving system's individually-linking strap components is tightly pulled towards the center of the bag and affixed in that position by being tied to its corresponding strap component (see, e.g., 643*d* and 643*b*). This process results in pulling the upper portion of sidewalls 620*a*, 620*b*, 620*c* and 620*d* inwardly. When this particular embodiment is used in this manner, it provides the following advantages: (a) it reduces the torsional forces exerted on the bag's closure system when the bag is filled and subsequently lifted, transported, stored and/or disposed, and (b) it facilitates the sealing of the bag's closure system since the two corresponding parts of the closure system are now being held in closer proximity to one another.

FIG. 12E is a perspective view of the containment bag/supporting structure configuration illustrated in FIGS. 12C and 12D when the bag is filled and closed. Specifically, in FIG. 12E, bag 600's top portion 610 is moved into its closed position and secured by its U-shaped zipper closure system. As can be seen, since this embodiment's closure pressure-relieving system is internally-mounted (i.e., fixedly attached to the inside surface of the bag 600's sidewalls), this configuration results in pulling in the top portion of these sidewalls so as to: (a) reduce the torsional forces exerted on the bag's closure system when the bag is filled and subsequently lifted, transported, stored and/or disposed, and (b) facilitate the sealing of the bag's closure system since the two corresponding parts of the closure system are now being held in closer proximity to one another.

FIGS. 13A-13C are perspective views of another example of a closure pressure-relieving system encompassed by the present invention, wherein its components are internally-mounted. In this particular example, the containment bag's closure system is centrally-positioned on its top portion when the bag is closed. Other than that difference, the closure pressure-relieving system illustrated in FIGS. 13A-13C functions essentially in the same manner as that in FIGS. 12A-12E.

Specifically, FIG. 13A shows industrial containment bag 700. Although bag 700 can be self-supporting or non self-supporting, for illustrative purposes only, the bag shown in FIG. 13A is non self-supporting. As such, for this example, the containment bag in FIG. 13A is made entirely of non self-supporting materials.

Since bag 700 has a closure system which is centrally-located on its top portion when the bag is closed, bag 700's top portion is actually made of the upper portions of its sidewalls (i.e., that portion of the bag's sidewalls that extend above its top perimeters edge when the bag is closed). In the view shown in FIG. 13A, the upper portions of bag 700's sidewalls that make up its top portion are folded down over those sidewalls.

Bag 700 has sidewall portions 720*a*, 720*b*, 720*c* and 720*d*, and a bottom portion (not shown). Since in this illustration, bag 700 is illustrated in its opened position, some of the bag's inside wall surfaces are shown. When bag 700 is in its closed position: (a) its top portion is parallel to and laterally spaced above its bottom portion; (b) its bottom portion is parallel to and laterally spaced below bottom portion; and (c) its sidewall portions 720*a*, 720*b*, 720*c* and 720*d* are perpendicular to the bag's top and bottom portions and positioned therebetween.

In this particular embodiment each of the closure pressure-relieving system's individually-linking strap components are internally-mounted (i.e., fixedly attached to the inside surface of the containment bag's walls). As in the embodiment illustrated in FIGS. 12A-12E, in FIG. 13A, each individually-linking strap system comprises two separate corresponding strap components.

For example, in FIG. 13A, a first strap component 743*d* of a particular individually-linking strap system has one of its ends 745*d* which is fixedly attached to the inside surface of sidewall 720*d* and its other end 747*d* which is loose. The corresponding second strap component 743*b* of the same individually-linking strap system has one of its ends 745*b* which is fixedly attached to the inside surface of opposing sidewall 720*b* and its other end 747*b* which is loose. In the particular example illustrated in FIG. 13A, the same applies to all of the other individually-linking strap systems regarding where their respective first and corresponding second parts are fixedly attached to the inside surface of their respective opposing sidewalls.

FIGS. 13B and 13C demonstrate how such novel industrial containment bags encompassed by this invention resolve those inherent problems which are encountered when using the conventional, externally-mounted hold-up strap configuration illustrated in FIGS. 11A and 11B. In FIGS. 13A-13C like numbers are used to identify like components.

FIG. 13B is a perspective view of a containment bag/supporting structure configuration using containment bag 700. Specifically, in this view bag 700: (a) is positioned into the open end of dumpster-type container 780, (b) has already been filled with debris, (c) has the individually-linking strap systems' strap components of its closure pressure-relieving system tied together such that they pull bag 700's sidewalls' upper portions inwardly towards one another; and (d) has its centrally-located closure system on its top portion partially closed. As can be seen in FIG. 13B, this closure pressure-relieving system configuration provides the following advantages: (a) it reduces the torsional forces exerted on the bag's closure system when the bag is filled and subsequently lifted, transported, stored and/or disposed, and (b) it facilitates the sealing of the bag's closure system since the two corresponding parts of the closure system are now being held in closer proximity to one another.

FIG. 13C is a perspective view of the containment bag/supporting structure configuration illustrated in FIG. 13B with bag 700's centrally-located closure system in its fully closed position. In this view, an optional lineal connector is used to hold down the top portion's two opposing triangular folds. However, it is within the purview of this invention for: (a) the two-opposing triangular-shaped folds to not have any means to hold them in place; (b) the two-opposing triangular-shaped folds to be held in place with any conventional means for doing so in the industry; (c) the two-opposing triangular-shaped folds to be held in place with any new means for doing so which may be developed in the future; or (d) the two-opposing triangular-shaped folds to be held in place by using one or more of the novel methods for doing so disclosed above (see, e.g., illustrative examples of the same shown in FIGS. 5A and 5B and in FIGS. 6A and 6B).

Figure 14A:
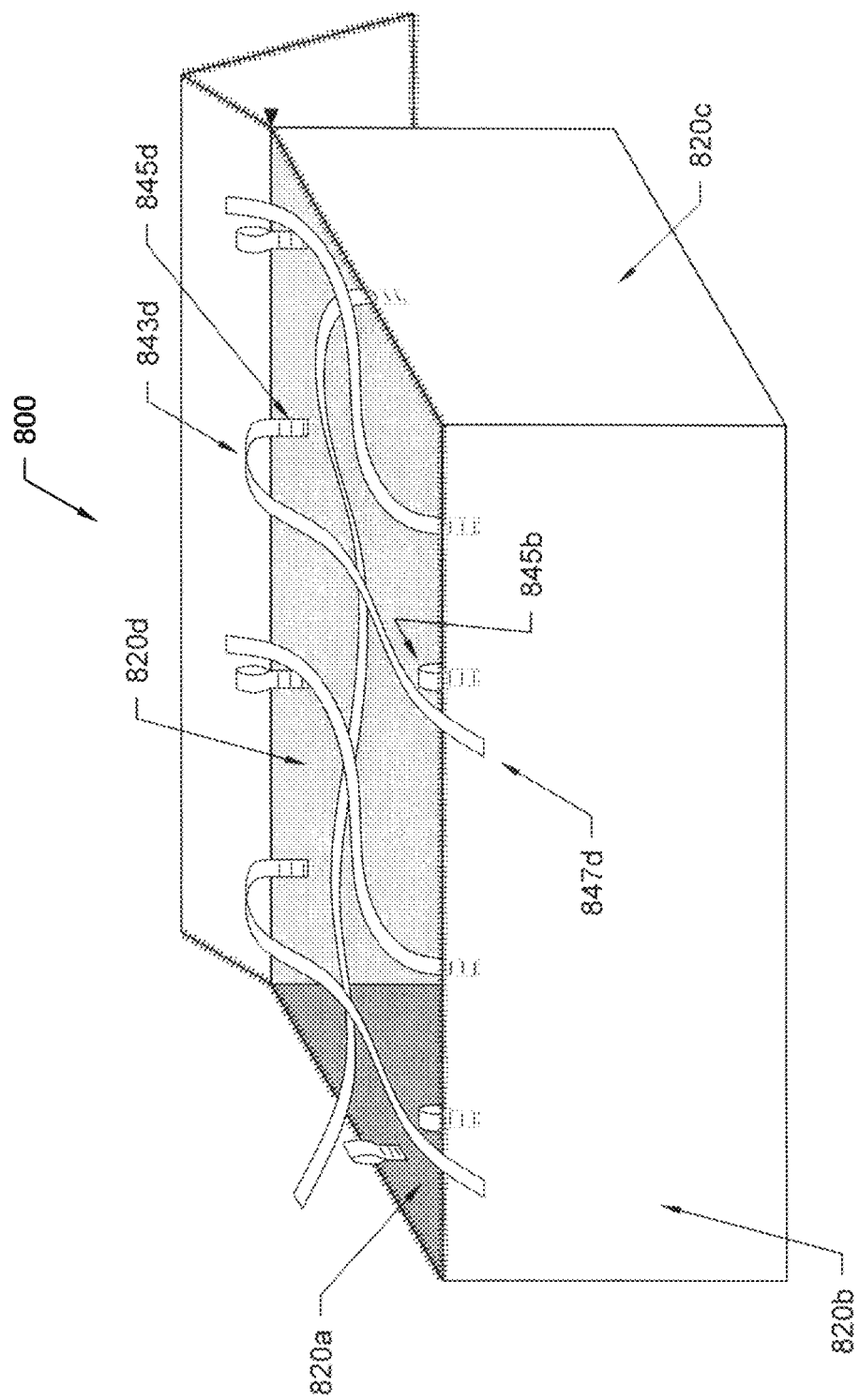
FIG. 14A is a perspective view of another embodiment of a new and improved industrial containment bag encompassed by this invention, wherein the bag comprises: (a) a closure system positioned directly on its top perimeter edge, and (b) another example of a closure pressure-relieving system designed to: (i) facilitate the bag's closing process when filled, and (ii) reduce the torsional forces exerted on the bag's closure system when it is filled and subsequently lifted, transported, stored and/or disposed.
Figure 14B:
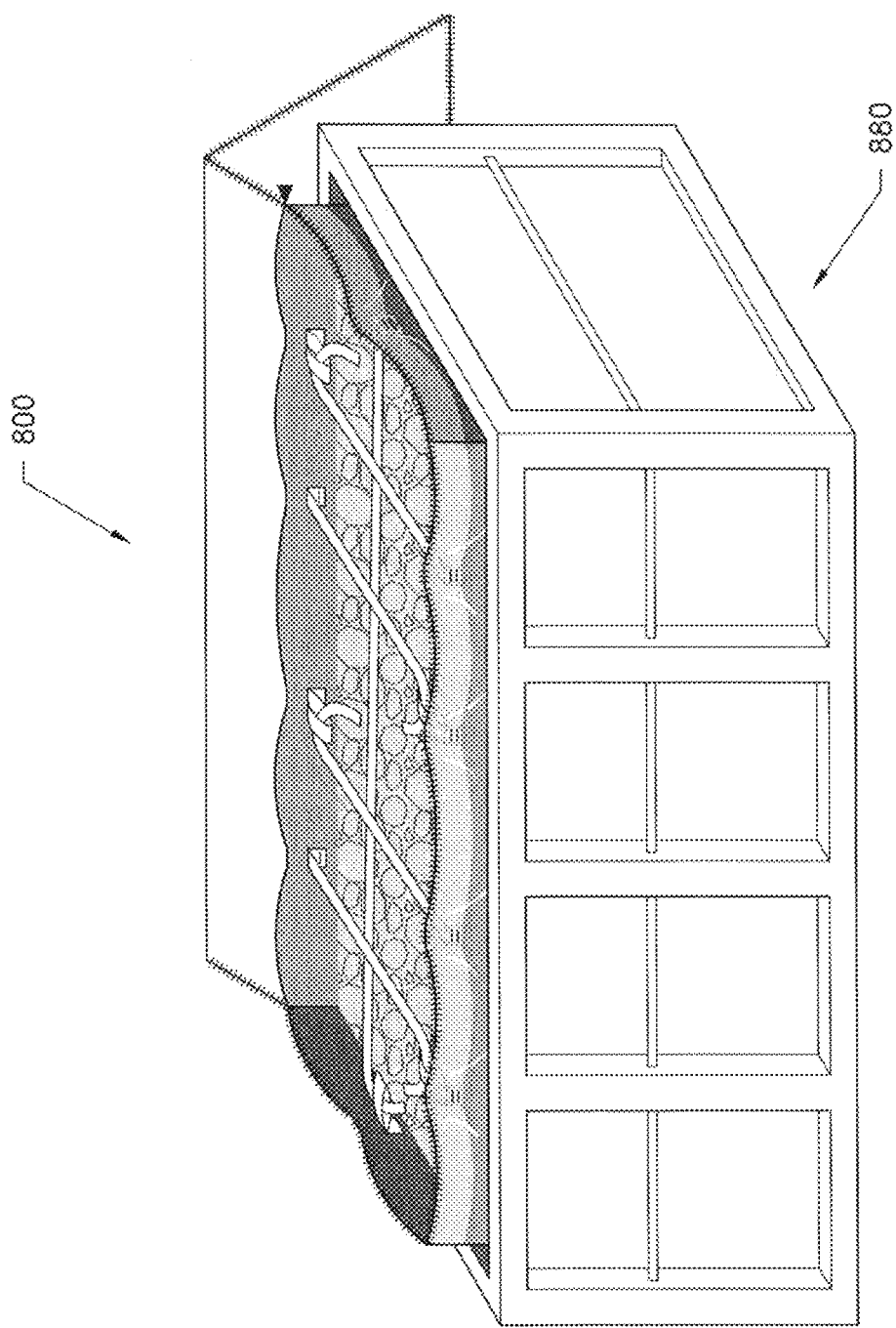
FIG. 14B is a perspective view of the containment bag of FIG. 14A placed in a dumpster-type container, wherein the bag is filled, and wherein the closure pressure-relieving system is being used to pull together the bag's internal walls so as to: (a) facilitate the bag's closing process, and (b) reduce the torsional forces exerted on the bag's closure system when it is filled and subsequently lifted, transported, stored and/or disposed.

FIGS. 14A and 14B, are perspective views of a further example of this invention's embodiments wherein a closure pressure-relieving system has its components fixedly attached to the inside surface of the containment bag's walls. In FIGS. 14A and 14B, the closure pressure-relieving system employed includes a series of individually-linking strap systems. However, unlike the embodiments illustrated in FIGS. 12A-12E or in FIGS. 13A-13C where each individually-linking strap system of this particular comprises two separate corresponding strap components, in the particular embodiment illustrated in FIGS. 14A-14C, each individually-linking strap system comprises a strap component and a strap-receiving component (e.g., a "belt loop). However, similar to the embodiments illustrated in FIGS. 12A-12E or in FIGS. 13A-13C, in FIGS. 14A and 14B, the components of its individually-linking strap system are internally-mounted (i.e., fixedly attached to the inside surfaces of the bag).

Specifically, FIG. 14A shows industrial containment bag 800. Although bag 800 can be self-supporting or non self-supporting, for illustrative purposes only, the bag shown in FIG. 14A is non self-supporting. As such, for this example, the containment bag in FIG. 14A is made entirely of non self-supporting materials. Accordingly, by being non self-supporting, bag 800 will need to employ some sort of a means to hold up its walls in a supporting structure (not shown here).

Bag 800 has sidewall portions 820a, 820b, 820c and 820d. Since in this illustration, bag 800 is illustrated in its opened position, some of the bag's inside wall surfaces are shown.

In this particular embodiment of the closure pressure-relieving system, its components are internally-mounted (i.e., fixedly attached to the inside surface of the containment bag's walls). Specifically, in FIG. 14A, a strap component 843d of a particular individually-linking strap system has one of its ends 845d which is fixedly attached to the inside surface of sidewall 820d and its other end 847d which is loose. The corresponding second strap component 743b of the same individually-linking strap system is a strap receiving component 845b which is fixedly attached to the inside surface of opposing sidewall 820b. When practicing this particular embodiment, the individual strap linking system's strap component (e.g., strap 843d) needs to be long enough to extend completely across the bag and be tightly secured to its corresponding strap receiving component (e.g., 845b).

In the particular example illustrated in FIG. 14A, the same applies to all of the other individually-linking strap systems regarding where their respective strap component and corresponding strap receiving. Specifically, each such component is internally-mounted (i.e., fixedly attached to the inside surface of their respective opposing sidewalls). However, in a preferred embodiment, the positioning of the individual strap linking system's strap and strap receiving components are staggered. Such a preferred staggered configuration is illustrated in FIG. 14A.

FIG. 14B is a perspective view of a containment bag/supporting structure configuration using containment bag 800. Specifically, in this view bag 800: (a) is positioned into the open end of dumpster-type container 880, (b) has already been filled with debris, and (c) has the individually-linking strap systems' strap components of its closure pressure-relieving system tied together such that they pull bag 800's sidewalls' upper portions inwardly towards one another. As can be seen, in FIG. 14B, this particular embodiment of a closure pressure-relieving system encompassed by the present invention provides the following advantages: (a) it reduces the torsional forces exerted on the bag's closure system when the bag is filled and subsequently lifted, transported, stored and/or disposed, and (b) it facilitates the sealing of the bag's closure system since the two corresponding parts of the closure system are now being held in closer proximity to one another.

Figure 15A:
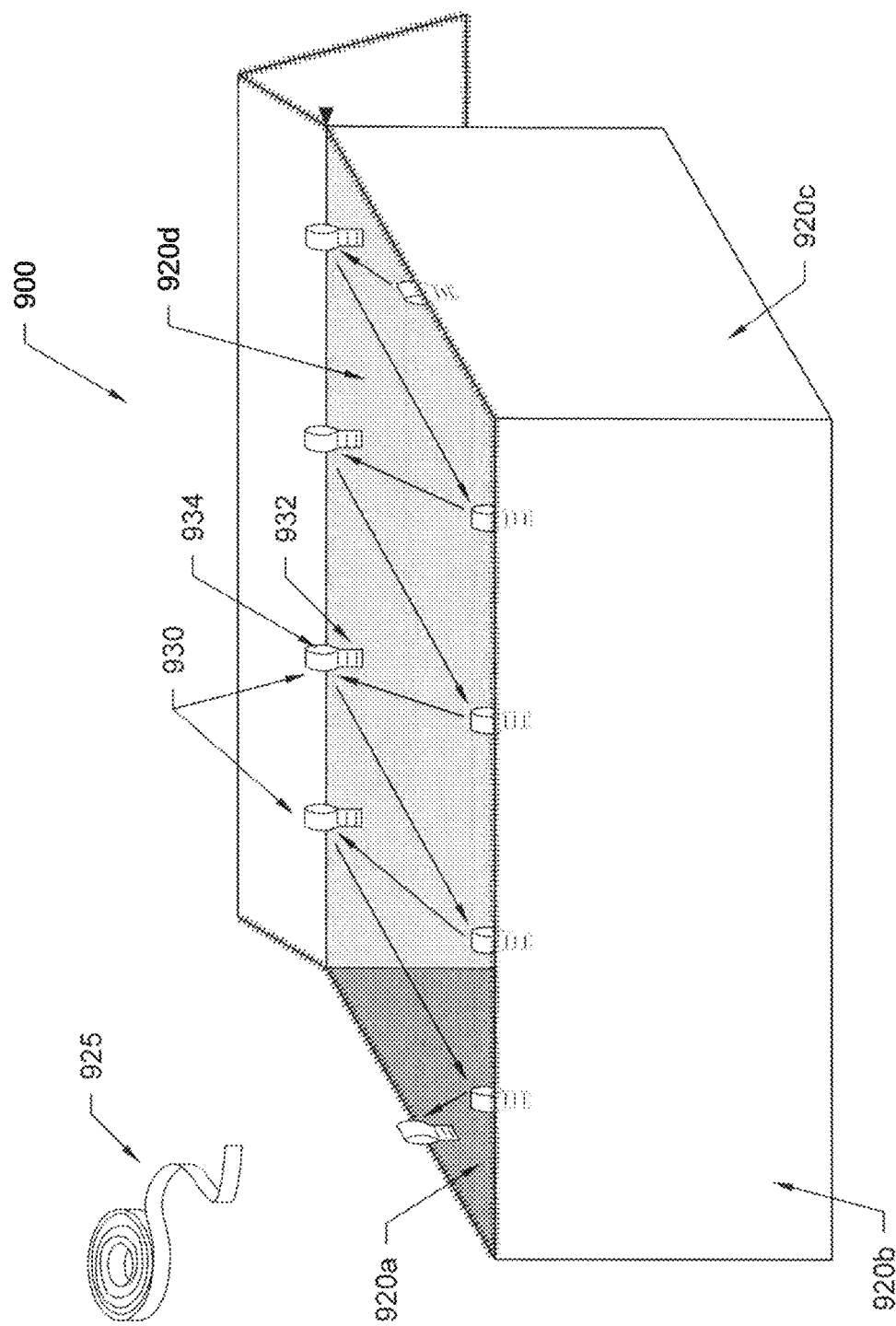
FIG. 15A is a perspective view of yet another embodiment of a new and improved industrial containment bag encompassed by this invention, wherein the bag comprises: (a) a closure system positioned directly on its top perimeter edge, and (b) an example of yet another closure pressure-relieving system designed to: (i) facilitate the closing process, and (ii) reduce the torsional forces exerted on the its closure system when the bag is filled and subsequently lifted, transported, stored and/or disposed.
Figure 15B:
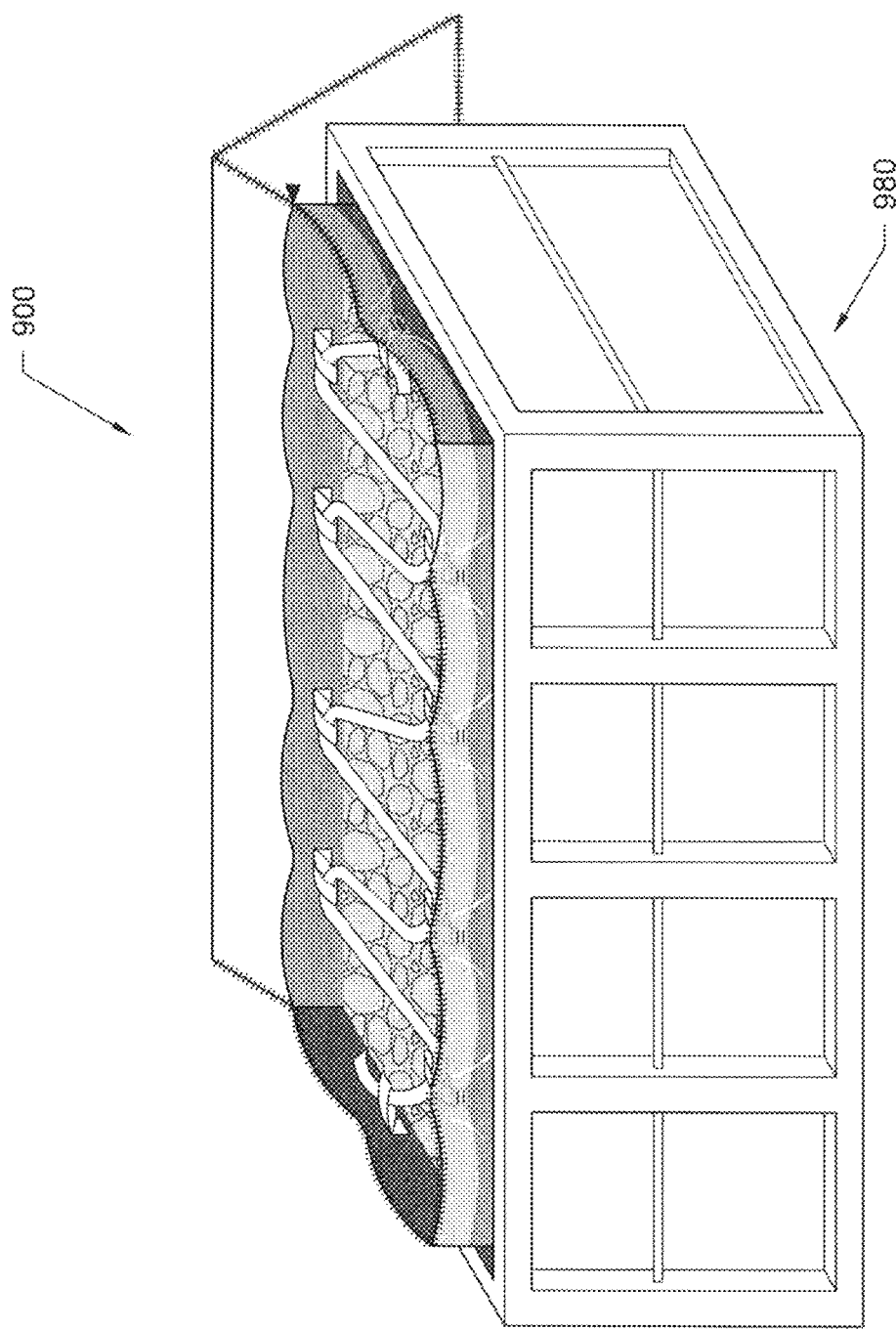
FIG. 15B is a perspective view of the containment bag of FIG. 15A placed in a dumpster-type container, wherein the bag is filled, and wherein its closure pressure-relieving system is being used to pull together the internal bag's internal walls so as to: (a) facilitate the closing process, and (b) reduce the torsional forces exerted on the its closure system when the bag is filled and subsequently lifted, transported, stored and/or disposed.

FIGS. 15A and 15B, are perspective views of yet another example of this invention's embodiments wherein a closure pressure-relieving system has its components fixedly attached to the inside surface of the containment bag's walls. In FIGS. 15A-15B the closure pressure-relieving system employed includes a strap-linking system comprising a strap component which has two loose ends, and a series of strap receiving components which are each internally-mounted (i.e., each is fixedly attached to the upper portion of one of the bag's sidewall's inside surface).

Specifically, FIG. 15A shows industrial containment bag 900. Although bag 900 can be self-supporting or non self-supporting, for illustrative purposes only, the bag shown in FIG. 15A is non self-supporting. As such, for this example, the containment bag in FIG. 15A is made entirely of non self-supporting materials. Accordingly, by being non self-supporting, bag 900 will need to employ some sort of a means to hold up its walls in a supporting structure (not shown here).

Bag 900 has sidewall portions 920a, 920b, 920c and 920d. Since in this illustration, bag 900 is illustrated in its opened position, some of the bag's inside wall surfaces are shown.

In this particular embodiment of the closure pressure-relieving system, its components are internally-mounted (i.e., fixedly attached to the inside surface of the containment bag's walls). In FIG. 15A, the closure pressure-relieving system includes a strap-linking system which comprises a strap component 925 which has two loose ends (only one of which is shown), and a series of strap receiving components 930 where each of which is internally-mounted to the upper portion of one of the bag's sidewall's inside surface.

In FIG. 15A, each strap receiving component has one end 932 which is fixedly attached to the upper portion of one of the bag's sidewall's inside surface, and another end 934 which is in the form of a loop through which the loose end of strap-linking system's strap component 925 can pass. As shown in FIG. 15A, the strap linking system's strap receiving components are fixedly attached to the inside surface of bag 900's sidewalls in a preferred staggered pattern.

In practice, after bag 900 is filled, the loose end of strap-linking system's strap component 925 is passed through the loops of the various strap-linking system's strap receiving components 930 (i.e., similar to tying-up a shoe lace). Then, one or both of the loose ends of the strap-linking system's strap component 925 are pulled tightly and secured in that position. This process results in pitting the upper portions of sidewalls 920a, 920b, 920c and 920d inwardly, and securing them in that position. This can be seen by referring to FIG. 15B where bag 900 has been placed in dumpster-type container 980.

Specifically, as can be seen in FIG. 15B, this particular embodiment of a closure pressure-relieving system encompassed by the present invention provides the following advantages: (a) it reduces the torsional forces exerted on the bag's closure system when the bag is filled and subsequently lifted, transported, stored and/or disposed, and (b) it facilitates the sealing of the bag's closure system since the two corresponding parts of the closure system are now being held in closer proximity to one another.

The closure pressure-relieving systems encompassed by (and/or used when practicing) this invention are designed to carry the at least some of the outwardly-displaced torsional forces being exerted on the location of the bag's closure system after the bag is filled, and when it is subsequently lifted, transported, stored and/or dispose. As used herein, the term "torsional forces" refers to the outwardly-displaces forces exerted on an industrial containment bag's closure system in a direction which, if great enough, can pull apart at least a portion of that closure system. In one preferred embodiment, the closure pressure-relieving systems are designed (and/or made of a material) which can carry most (if not all) of such torsional forces exerted on the bag's closure system.

Without the use of the novel closure pressure-relieving systems disclosed herein, as soon as the outwardly-displaced torsional forces exceed the holding strength of the particular closure system being employed, the closure will most likely fail; and thus, expose the bag's contents to the surrounding people and environment. However, when these embodiments of the invention are practiced, in order for the closure system to fail due to outwardly-displaced torsional forces, those forces would need to exceed the strength of the weakest part of the particular closure pressure-relieving system being employed.

The concept of using closure pressure-relieving systems as disclosed herein is novel and, as explained above, will be a tremendously welcomed advancement in the art. This embodiment of the invention can be used to improve all types of industrial containment bags (past, present and future), including, without limitation, those set out and disclosed in the following patents and patent applications—all of which are incorporated herein it their entirety by reference: U.S. Pat. No. 6,079,934 (the '934 patent), U.S. Pat. No. 6,142,727 (the '727 patent), U.S. Pat. No. 6,155,772 (the '772 patent), U.S. Pat. No. 7,073,676 (the '676 patent), U.S. Pat. No. 7,845,511 (the '511 patent), U.S. Pat. No. 8,191,722 (the '722 patent), U.S. Pat. No. 8,562,212 (the '212 patent), U.S. Pat. No. 8,499,953 (the '953 patent), U.S. Pat. No. 8,894,281 (the '281 patent), U.S. Pat. No. 8,894,282 (the '282 patent), U.S. Pat. No. 9,359,175 (the '175 patent), U.S. Pat. No. 9,478,322 (the '322 patent), U.S. Pat. No. 7,074,174 (the '174 patent), U.S. Ser. No. 13/288,935 (the '935 application), and PCT/US06/06662 (the '662 application). Moreover, the implementation of the closure pressure-relieving systems disclosed herein to such conventional industrial containment bags disclosed in the foregoing patents and patent applications, produces new and improved bags which are intended to be encompassed by this present invention.

The concept of using pressure-relieving devices to reducing the torsional forces exerted on the closure system(s) of industrial containment bags is particularly desirable for use with industrial containment bags identified as being macroencapsulation units. For example, this embodiment of the invention can be used with macroencapsulation units such as the Ultratech International macropacks are planned for smaller, lighter weight, and lower radiation dose wastes. Another example of an industrial containment bag that can be used when practicing this embodiment of the invention is a macrobag/liner system known as a High Modulus Polymeric Packaging System ("HMPPS"). This system uses a polymeric organic liner/jacket for secure macroencapsulation of radioactive lead solids and hazardous debris in soft sided bags of various sizes. Heavier, bulkier, or higher radiation dose wastes can be macroencapsulated in cement grout based custom macroencapsulation unit(s). One illustrative example of an HMPPS product is shown in FIGS. 1A and 1B of U.S. Pat. No. 9,478,322 (the '322 Patent) and U.S. Pat. No. 9,679,669 (the '669 patent)—both of which are incorporated herein in their entirety by reference. According to these patents, the HMPPS bag is constructed using a three-layer design, having an innermost layer of woven polypropylene, a middle layer of reinforced polyethylene layer, and an outer lay of non-woven polypropylene. The outer layer may include water resistant exterior coating, such as a polyethylene coating. Each of the three layers is in essence a separate soft sided bag, each with separate closable openings. Each layer of the HMPPS bag has a sidewall, a top portion, a bottom portion a top edge (where the sidewall meets the top portion); and each layer has an opening only on its top portion. In a center zip embodiment, the top of portion of the layer incorporating the same can extend substantially above the top edge of the bag. The final assembled HMPPS product results in a nested series of bags or layers According to these patents, these three "bags" may be joined together, such as sewn together or heat welded together or adhesively bonded. In the embodiments illustrated in these patents, the innermost and outermost layers of the final assembled HMPPS product are closable with a zipper, while the middle layer is closable with a Ziplock®-type of zipper closure device. Also, according to these patents, each layer can be opened and closed independently from the other layers.

The preferred construction disclosed in these patents is to have the zippers (including Ziplock®-type of toothless zipper closures) traverse down the center of the top portion of each bag. Also, according to these patents, cardboard inserts may be provided to line the interior sidewalls of the bags to allow the assembled product to be self-supporting.

To use the HMPPS in accordance with these patents, the soft-sided, three-layer container is positioned in a metal shipping container (possibly by placing one bag in the container at a time) or by using the cardboard inserts, set up as a self-standing container. All of the layers are opened and the hazardous materials loaded into the container. Preferably a layer of absorbent material (such as sand, kitty litter, plastic or foam pellets, etc.) is placed on the bottom of the innermost layer. Low-level hazard ("LLHZ") debris is then loaded into the interior of the disposal bag. Once filled, the remaining void space in the resulting loaded container preferably should be less than 10%, or as required by the disposal site operator. The layers are then closed. The loaded container (or container within a shipping container) is placed on a shipping vehicle for transport to the disposal site. At the disposal site, the bag may be moved using a lifting harness or sling coupled to the exterior of the bag, with a lifting frame or crane.

Another illustrative example of a method and device for macroencapsulation of hazardous wastes which can be used when practicing this embodiment of the invention is described in U.S. Pat. No. 7,074,174 (the '174 patent)—incorporated herein in its entirety by reference. As described in this patent, a soft-sided roll-off container liner is used. Here, the containment bag is placed in a standard roll-off container, and a layer of treat reagent is placed on the bottom of the bag to absorb fluids that may be present in the wastes. The hazardous wastes are then loaded into the bag's interior, and finally free flowing reagents are added (such as Portland cement, or organic activated charcoal) around the hazardous wastes.

The soft-sided bag disclosed in this patent has three layers of materials, and its innermost and outermost layers are each closable with a zipper closure system. Once the loaded bag is sealed closed, the roll off container is transported to the disposal side, and the bag is then slid out of the roll off container for burial. As described, the bag's inner layer is a pad or mat or membrane formed from a polyolefin or polyester (e.g., polytetrafluorethylene); the bag's middle layer is a high-density film, (e.g., a polyethylene, polypropylene or other liquid impervious and chemically resistant synthetic material), and the bag's outer layer is a tear and puncture resistant fabric (e.g., a woven polypropylene or polyethylene). However, as indicated above, the requirement of a macroencapsulation layer of Portland cement makes the transportation of such a loaded containment bag problematic.

In addition to the above, once skilled artisans read and understand this particular embodiment of the invention as disclosed herein, such skilled artisans will be able to conceive of multiple other pressure-relieving devices (and/or methods of using the same) that can be employed for this same purpose. It is intended that all such other pressure-relieving devices (and/or methods of using the same), as well as all industrial containment bags that employ the same, are intended to be encompassed by this particular embodiment of the invention.

The pressure-relieving system of the present invention can be used with any configuration of closure system that currently exists, or any type of system that may be designed in the future. Examples of current bag closure system configurations that can benefit from the use of the pressure-relieving system of the present invention include, without limitation, the following: (a) closure systems configured such that they are on one of the bag's perimeter edges, (b) closure systems configured such that they are aligned with, but set inward from, one of the bag's perimeter edges, (c) closure systems configured such that they are centrally-displaced on the bag's top portion, and (d) any combination of the above.

In addition to the closure system configuration, when practicing this embodiment of the invention, any type of closure type can be used that currently exists, or any type of closure that may be designed in the future. Examples of current bag closures that can benefit from the use of the pressure-relieving system of the present invention include, without limitation, the following: (a) zipper and zipper-type closures, (b) hook and loop closures, and (c) any combination of the above.

Another unmet major concern facing the industrial containment bag industry is also due to the inherent partially-flexible nature of portions the bags' outer surfaces. Specifically, since portions of industrial bags' outer surfaces are made of soft-sided materials, when lifting and transporting such bags after being filled, the material contained therein can, and often times does, shift. This shifting can create significant imbalance problems during that (or any subsequent) lifting, transporting, storage and/or disposal processes due, in part, to the creation of an uneven load weight distribution therein. This, in turn, can result in the bag unexpectedly tipping over or slipping off the loading, lifting or transporting device. Obviously, if something like this was to occur, significantly higher torsional forces are exerted onto the bag's outer surfaces which can, in turn, result in the bag and/or its closure system, failing and exposing the bag's material or waste contents to the surrounding people and environment. As explained earlier, such an occurrence can produce catastrophic results, especially if the bag's contents were toxic or radioactive.

Although as shown above it is extremely important to know whether and/or to what extent the material or waste contained within an industrial containment bag may have shifted, it is generally not checked after the bag has been sealed closed since, with current containment bag designs, inspection would require completely unsealing the bag's opening which could itself create a potentially dangerous and hazardous situation. This is especially the case with industrial containment bags having a centrally-positioned closure system, since the terminal ends of such closure systems are typically located under the triangular-shaped folds that are secured to the bag's top portion after the bag is filled.

Accordingly, if there was a way to safely, easily and quickly know whether and/or to what extent the material or waste contained within an industrial containment bag may have shifted during the lifting, transporting, storing or disposing processes without having to unseal a relatively large portion of the bag's closure system, it would be an advancement in the art which would be greatly welcomed by the industry. In response to this highly desired, yet unmet, need in the industry, another embodiment of this invention is to provide a means for doing just that.

This particular embodiment of the invention comprises the integration of at least one inspection flap onto the bag's top portion. In general, an inspection flap is comprised of a portion of the bag's top that can safely, easily and quickly be opened and closed in such a manner that it permits the inspection of how the bag's contents are positioned within the interior of the bag.

The positioning, configuration and number of inspections flaps incorporated onto the bag's top portion is dependent at least in part on factors such as: (a) the nature of the materials/wastes being placed in the bag, (b) the manner in which the materials/wastes are loaded into the bag, the shape of the bag, and/or (c) the manner in which the filled bag is to be lifted, transported, stored, and/or disposed. It is within the scope of this invention to have the inspection flap(s) incorporated as a part of the bag's closure system, or for the inspection flap(s) to be separate and distinct from the bag's primary closure system. Those skilled in the art will easily be able to determine how to best configure and/or integrate inspection flaps onto a containment bag's top portion after reading and understanding the disclosure set out herein.

Figure 16:
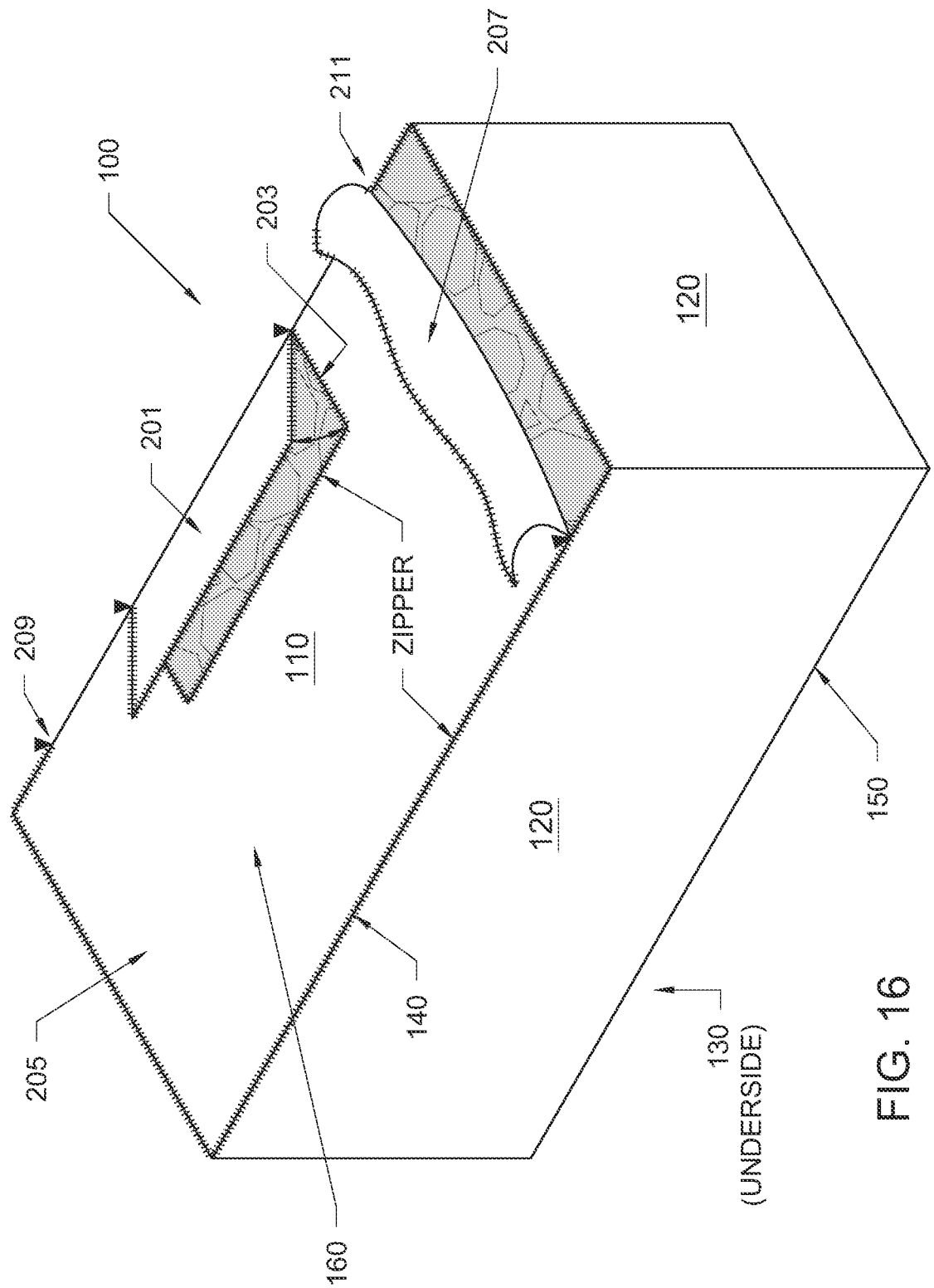
FIG. 16 is a perspective view of still another embodiment of a new and improved industrial containment bag encompassed by this invention, wherein the bag comprises: (a) a closure system positioned directly on its top perimeter edge, and (b) at least one inspection flap integrated onto the bag's top portion as a means for assessing the load balance of materials being contained therein, so as to determine whether any adjustments need to be made to the load, itself, and/or to any subsequent lifting, transporting, storing and/or disposal process(es)
Figure 17:
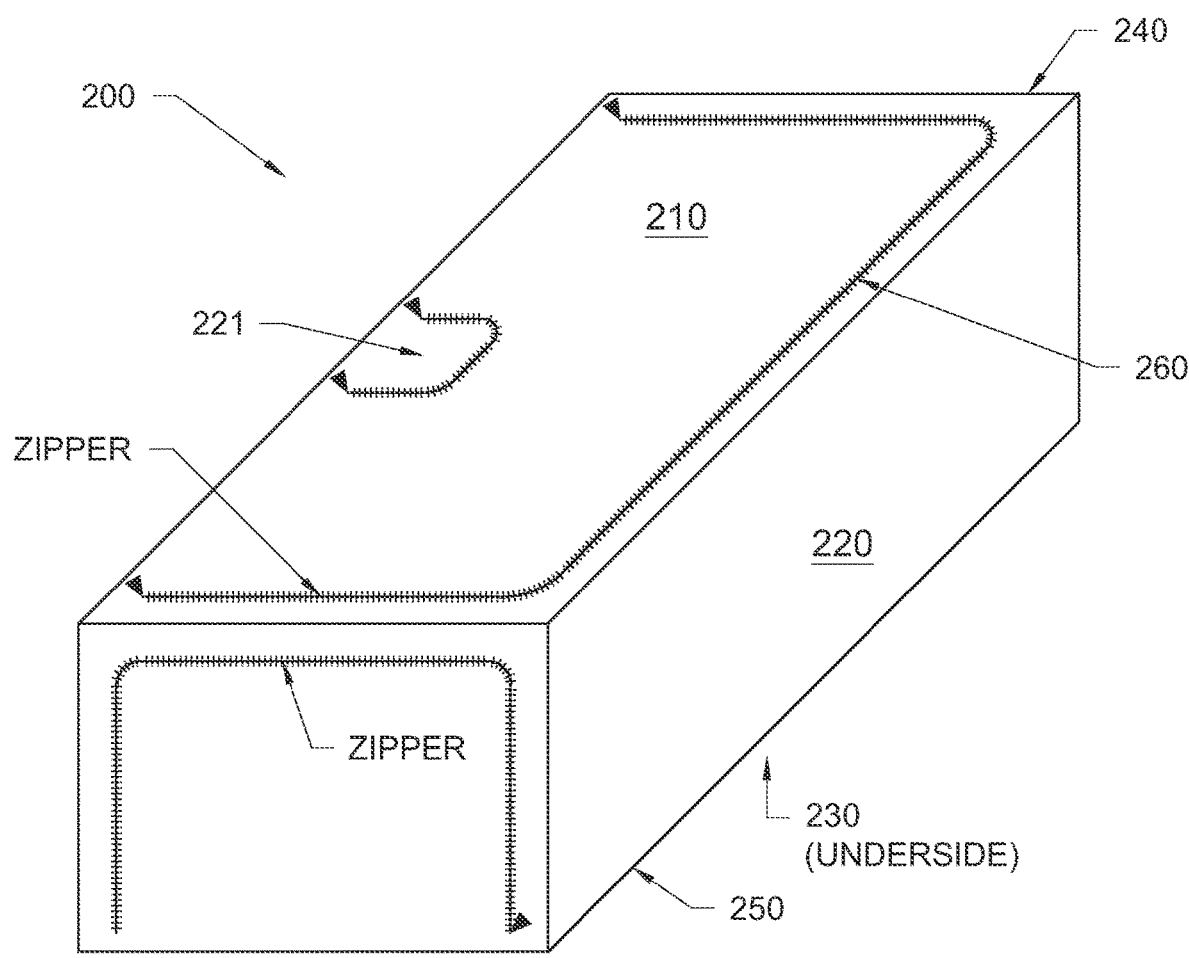
FIG. 17 is a perspective view of even another embodiment of a new and improved industrial containment bag encompassed by this invention, wherein the bag comprises: (a) at least one closure system aligned with, but positioned inward from, its top perimeter edge, and (b) at least one inspection flap integrated onto the bag's top portion as a means for assessing the load balance of materials being contained therein, so as to determine whether any adjustments need to be made to the load, itself, and/or to any subsequent lifting, transporting, storing and/or disposal process(es)
Figure 18:
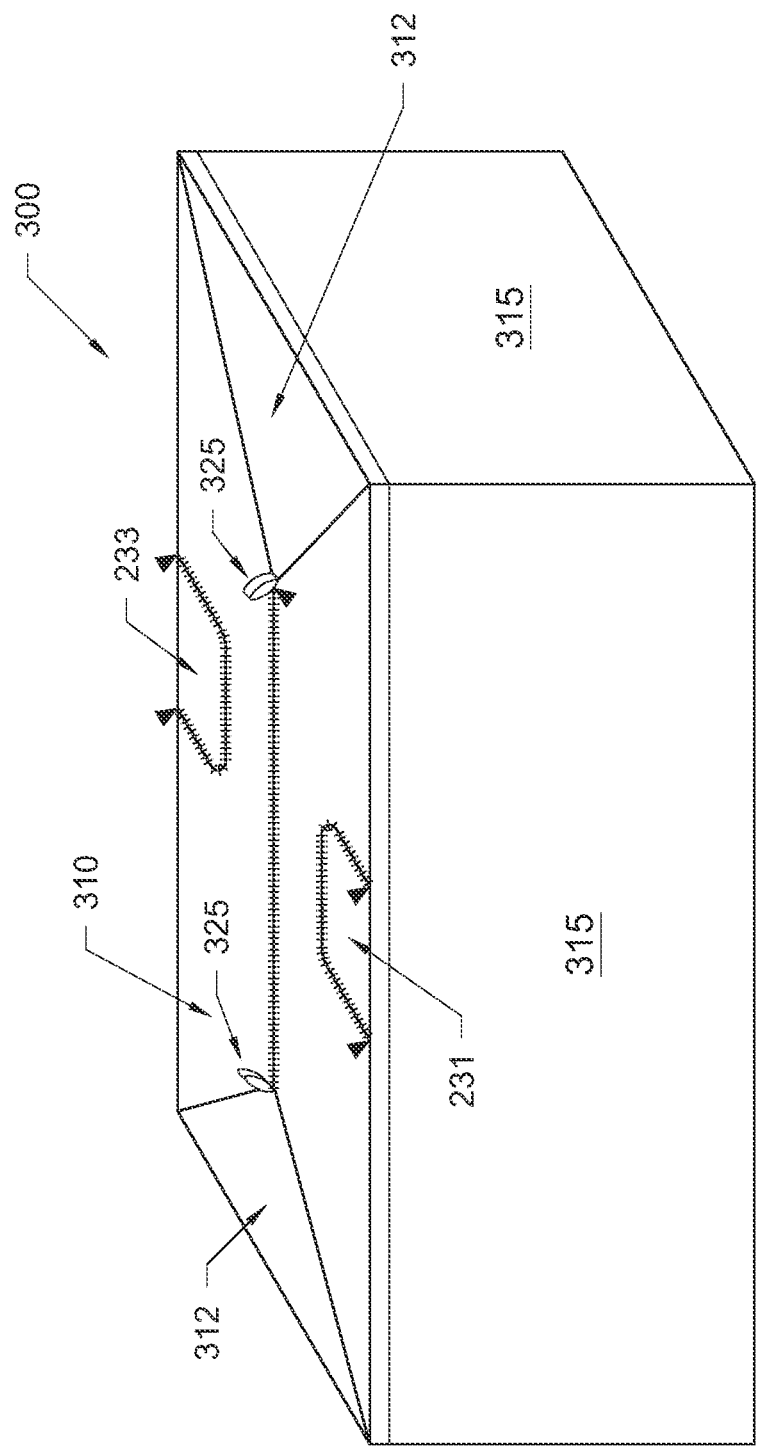
FIG. 18 is a perspective view of even yet another embodiment of a new and improved industrial containment bag encompassed by this invention, wherein the bag comprises: (a) a centrally-positioned closure system positioned on its top portion, and (b) a plurality of inspection flaps integrated onto the bag's top portion as a means for assessing the load balance of materials being contained therein, so as to determine whether any adjustments need to be made to the load, itself, and/or to any subsequent lifting, transporting, storing and/or disposal process(es).

If an inspection flap encompassed by this invention is configured such that it is a part of the bag's primary closure system, the inspection flap's closure system is preferably the same as that employed for the bag's primary closure system—illustrative examples of the integration of inspection flaps as a part of the bag's primary closure system are shown in FIGS. 16-18 (discussed infra.). However, if an inspection flap encompassed by this invention is configured such that it is separate and distinct from the bag's primary closure system, the inspection flap's closure system need not be as that employed for the bag's primary closure system.

It is important to note that an inspection flap is, itself, another closable opening on the bag that is subject to torsional forces when the bag is lifted, transported, stored and/or disposed. Thus, inspection flaps also have the possibly of failing when the bag is lifted, transported, stored and/or disposed. For that reason, in certain preferred embodiments, the type, configuration, securing strength, and/or permeability factor of an inspection flap's closure system should be at least at the same level as those of the bag's primary closure system. In addition, it is within the scope of this invention to integrate pressure-relieving devices as disclosed above as a part of the inspection flap's closure system, especially if such pressure-relieving devices are being integrated as a part of the bag's primary closure system.

FIG. 16 is a perspective view of still another particular embodiment of this invention which results in improving the integrity of an industrial containment bag. In this particular embodiment, the bag's top portion includes integrated inspection flaps. The example illustrated in FIG. 16 demonstrates the integration of two different types of inspections flaps encompassed by this invention—one of which is integrated as a part of the bag's primary closure system; and another of which is separate and distinct from the bag's primary closure system.

Specifically, in FIG. 16, the inspection flaps are added to an industrial containment bag similar to that shown in FIG. 1. As such, FIG. 16 shows industrial containment bag 100. Bag 100 has a top portion 110, sidewall portions 120, and a bottom portion 130 (not shown). Top portion 110 is parallel to and laterally spaced above bottom portion 130; bottom portion 130 is parallel to and laterally spaced below bottom portion 110; and sidewall portions 120 are perpendicular to the bag's top and bottom portions and positioned therebetween.

The path along which sidewall portions 120 interconnect with top portion 110 creates the bag's top perimeter edge 140. Similarly, the path along which sidewall portions 120 interconnect with bottom portion 130 creates the bag's bottom perimeter edge 150.

Bag 100 has a primary closable opening/flap 160 on its top portion 110. Also included on the bag's top portion are three inspection flaps encompassed by this invention—one of which is separate and distinct from the bag's closure system which opens and closes its primary closable opening/flap 160, and two of which are integrated as a part of the bag's primary closure system. Specifically, in FIG. 16, inspection flap 201 is separate and distinct from the bag's primary closure system.

Inspection flap 201 is positioned on the bag's top portion such that, when opened, an opening 203 is created permitting the visual inspection of the bag's contents. In this particular example, inspection flap 201 is positioned adjacent to one of the bag's lengthwise sidewalls. The closure system for inspection flap 201 is a zipper. A preferred zipper is a coil nylon zipper, with two pulls positioned on the zipper tracks. However, other zipper or zipper types can be used, as well as other completely different types of closure systems (e.g., hook and loop systems).

Bag top portion 160 also has two additional inspection flaps 205 and 207 positioned thereon. In this particular example, inspection flaps 205 and 207 are positioned adjacent to one of the bag's widthwise sidewalls. Inspection flaps 205 and 207 are integrated as a part of the bag's primary closure system. Inspection flap 205 is shown in its closed position, while inspection flap 207 is shown in an opened position.

In the particular embodiment illustrated in FIG. 16, the integration of inspection flaps 205 and 207 as a part of the bag's primary closure system results in this closure system transgressing along the bag's top perimeter edge 140 in a "C-shaped" path (as opposed to the traditional "U-shaped" path). However, if only one of the two inspection flaps 205 or 207 were to be integrated as a part of the bag's primary closure system, this would result in this closure system transgressing along the bag's top perimeter edge 140 in a "J-shaped" path.

As can be seen in FIG. 16, when inspection flaps are integrated as a part of the bag's primary closure system, the degree by which they can be opened can vary. Particularly, inspection flap 205 has only one terminal end 209. Similarly, inspection flap 207 also has only one terminal end 211. In this particular configuration, terminal ends 209 and 211 are also the end stops for the bag's primary closure system.

In FIG. 16, the bag's primary closable opening/flap 160 is secured in a closed configuration with a zipper closure system running along (and positioned directly on) the bag's top perimeter edge 140. In this particular embodiment, the zipper which comprises the bag's primary closure system is also the closure system for inspection flaps 205 and 207. A preferred zipper is a coil nylon zipper, with two pulls positioned on the zipper tracks. However, other zipper or zipper types can be used, as well as other completely different types of closure systems (e.g., hook and loop systems).

FIG. 17 is a perspective view of still another particular embodiment of an improved industrial containment bag encompassed by this invention, wherein the bag's top portion includes a single integrated inspection flap.

In FIG. 17, the inspection flap is added to an industrial containment bag similar to that shown in FIG. 2. As such, FIG. 17 shows industrial containment bag 200. Bag 200 has a top portion 210, sidewall portions 220, and a bottom portion 230 (not shown). Top portion 210 is parallel to and laterally spaced above bottom portion 230; bottom portion 230 is parallel to and laterally spaced below bottom portion 210; and sidewall portions 220 are perpendicular to the bag's top and bottom portions and positioned therebetween.

The path along which sidewall portions 220 interconnect with top portion 210 creates the bag's top perimeter edge 240. Similarly, the path along which sidewall portions 220 interconnect with bottom portion 230 creates the bag's bottom perimeter edge 250.

Bag 200 has a closable opening 260 located on top portion 210. In FIG. 17, closable opening 260 is shown in the closed position. In this embodiment, closable opening 260 is secured in a closed configuration with a zipper closure system which is positioned inward from the bag's top perimeter edge 240.

Also included on the bag's top portion 210 is inspection flap 221 positioned on the bag's top closable opening 260. Inspection flap 221 is separate and distinct from the bag's closure system which opens and closes its primary closable opening 210.

Although inspection flap 221 is shown in its full closed position, when opened, an opening is created permitting the visual inspection of the bag's contents. The closure system for inspection flap 221 is a zipper. A preferred zipper is a coil nylon zipper, with two pulls positioned on the zipper tracks.

However, other zipper or zipper types can be used, as well as other completely different types of closure systems (e.g., hook and loop systems). It is within the purview of this invention for the primary closure system of bag 200 to have a "C-shaped" closure or a "J-shaped" closure. If this was to occur, bag 200 would have at least one additional inspection flap.

FIG. 18 is a perspective view of even another particular embodiment of an improved industrial containment bag encompassed by this invention with a closure system centrally-positioned on the bag's top portion, wherein the improvement comprises the bag's top portion including an integrated inspection flap system.

In FIG. 18, the inspection flap system is added to an industrial containment bag similar to that shown in FIG. 5B. Particularly, FIG. 18 shows a "duffle-type" containment bag 300 in its fully-closed position. With this configuration, the bag's sidewalls have an upper portion 310 and a lower portion 315, where upper portion 310 extends above the top opening of the supporting structure in which it is placed for filling. When bag 300 is in its fully closed position, the sidewall's upper portion 310 forms the bag's top portion, as well as two-opposing triangular-shaped fold 312.

The top portion of bag 300 has integrated therein two inspection flaps 231 and 233 positioned thereon. Both of inspection flaps 231 and 233 are separate and distinct from the bag's closure system which opens and closes its primary closable opening.

Although inspection flaps 231 and 233 are both shown in their fully closed position, when opened, openings are created permitting the visual inspection of the bag's contents. The closure system for both of inspection flaps 231 and 233 is a zipper. A preferred zipper is a coil nylon zipper, with two pulls positioned on the zipper tracks. However, other zipper or zipper types can be used, as well as other completely different types of closure systems (e.g., hook and loop systems).

It is within the purview of this invention for: (a) the two-opposing triangular-shaped folds of bag 300 to not have any means to hold them in place; (b) the two-opposing triangular-shaped folds of bag 300 to be held in place with any conventional means for doing so in the industry (e.g., lineal connectors); (c) the two-opposing triangular-shaped folds of bag 300 to be held in place with any new means for doing so which may be developed in the future; or (d) the two-opposing triangular-shaped folds to be held in place by using one or more of the novel methods for doing so disclosed above (see, e.g., illustrative examples of the same shown in FIGS. 5A and 5B and in FIGS. 6A and 6B).

The concept of integrating inspection flaps onto the top portions of industrial containment bags is novel and, as explained above, will be a tremendously welcomed advancement in the art. This embodiment of the invention can be used to improve all types of industrial containment bags, including, without limitation, those set out and disclosed in the following patents and patent applications—all of which have been incorporated herein it their entirety by reference: the '934 patent, the '727 patent, the '772 patent, the '676 patent, the '511 patent, the '722 patent, the '212 patent, the '953 patent, the '281 patent, the '282 patent, the '175 patent, the '322 patent, the '174 patent, the '669 patent the '935 application, and the '662 application. Moreover, the implementation of the inspection flap disclosed herein to industrial containment bags produces new and improved bags which are intended to be encompassed by this invention.

In addition, once skilled artisans read and understand this particular embodiment of the invention as disclosed herein, such skilled artisans will be able to conceive of multiple other inspection flap configurations, as well as manners in which such can be integrated as a part if an industrial containment bag. It is intended that all such other inspection flap configurations (and/or manners in which such can be integrated), as well as all industrial containment bags that employ the same, are intended to be encompassed by this particular embodiment of the invention.

The industrial containment bags encompassed by this invention can be "self-supporting" As used herein, the term "self-supporting" refers to industrial containment bags which can stand upright on their own when empty. As such, self-supporting industrial containment bags need not be used in conjunction with dumpster-type containers or rigid loading frames. They can, however, be used with such dumpster-type containers or rigid loading frames, if desired.

While self-supporting industrial containment bags are made of soft-sided materials, they have integrated therewith means for providing rigid support to at least the bag's side walls. The incorporation of such a rigid support means facilitates the self-supporting industrial containment bags' ability to be positioned in a self-standing position when empty, and to remain in a self-standing position during the filling process.

The rigid supporting means used in a self-supporting industrial containment bag encompassed by this invention can be integrated onto the bag's sidewalls. In this embodiment, the rigid supporting means are attached to the sidewalls' outside and/or inside surface. The attachment can be by any suitable means known in the art. Examples of such suitable attachment means include, without limitation, the following: gluing, stapling, sewing, taping, using a hook and loop attachment system, etc.

The rigid supporting means used in a self-supporting industrial containment bag encompassed by this invention can also be integrated into the bag's sidewalls. In this embodiment, the rigid supporting means are sandwiched between two separate layers of the bag's sidewalls. In addition to being sandwiched between two of the bag's layers, the rigid support means can also be attached to the sidewalls by any suitable means known in the art, such as, for example: gluing, stapling, sewing, taping, using a hook and loop attachment system, etc. It is also within the scope of this invention to have improved self-supporting industrial containment bag designs which employ rigid supporting means which are integrated both, into and onto, the bag's sidewalls.

Examples of rigid supporting means that can be used when practicing this invention include, without limitation, the following: cardboard, rigid plastic, metal, etc. The preferred material (and thickness) is dependent, at least in part, upon factors such as: the desired end use, whether the nature of the material or waste being contained in the bag, and/or regulations imposed by a federal, state or local governments or agencies regarding the filling, transporting, storing and/or disposing of materials or wastes being contained. For example, if a self-supporting industrial containment bag encompassed by this invention is used in instances where liquids and/or gases are needed to permeate through the bag's walls, the rigid supporting means can be designed in a manner, or selected from a group of materials, which do not prevent such a desired permeation from occurring. On the other hand, if a self-supporting industrial containment bag encompassed by this invention is used in instances where liquids and/or gases are not to permeate through the bag's walls, the rigid supporting means can be designed in a manner, selected from a group of materials and/or coated with a material, which prevent such a permeation from occurring.

The industrial containment bags of the present invention can also be "non self-supporting".

As used herein, the term "non self-supporting" refers to industrial containment bags which cannot stand upright on their own when empty. As such, non self-supporting industrial containment bags need to be used in conjunction with some structure that can support them in an upright position when they are in an empty state and being filled. Examples of structures with which non self-supporting industrial containment bags can be used in conjunction to support the bags in an upright position when empty includes, without limitation, commercial dumpster-type containers and loading frames.

Examples of commercial dumpster-type containers that can be used in conjunction with industrial containment bags encompassed by the present invention include, without limitation, roll-off containers, end-dump containers, and a rail car gondola containers. A detailed description of illustrative examples of such dumpster-type containers is set out in the '212 patent, which, as stated above, is incorporated herein in, its entirety, by reference.

On the other hand, the loading frames differ from commercial dumpster-type containers in that, such loading frames are not designed to hold industrial bulk materials and wastes without the use on containment bags. An illustrative example of a loading frame that can be used when practicing this invention has a continuous horizontal top frame spaced from the ground. This top frame defines a loading perimeter. This illustrative example of a loading frame also has sidewalls and a bottom. Often times, the sidewalls and bottom are not solid closures since the fame is not designed to contain a bulk material or waste. Rather, rigid lading frames are designed to hold non self-supporting industrial containment bags in an upright position so that the bags can be filled with bulk materials or wastes.

When an industrial containment bag encompassed by this invention is used in conjunction with a loading frame, the bag sidewall, when positioned in the loading frame, is adjacent to the frame sidewall and the bag bottom portion is adjacent the loading frame bottom and the single closable top, when opened, is substantially aligned with the upper terminating edge of the frame sidewall. the bag is then secured to the frame in a manner which holds the empty bag open and in an upright position. The bag is then filled with the bulk material or waste. Then, once filled, the containment bag is removed from the rigid loading frame. In certain instances, the walls of the loading frame are designed to open or expand so as to facilitate the removal of the filled bag therefrom.

The industrial containment bags of the present invention can be made of woven or non-woven materials. Examples of materials that can be used when practicing this invention include, without limitation, the following: woven or non-woven polyolefins (e.g., a polypropylene, a polyethylene, etc.), reinforced or non-reinforced polyvinyl chloride, or other suitable materials, such as woven fiberglass. When practicing this invention, the bag material can also be coated. Examples of coatings that can be used when practicing this invention include a polyolefin(s) (e.g., a polyethylene, a polypropylene, etc.) coating(s) placed on the interior and/or exterior of the bag material.

The industrial containment bags encompassed by the present invention must have at least one closable opening. That being said, it is within the scope of the present invention for the industrial containments bags to have multiple closable openings.

In one illustrative example of an industrial containment bag encompassed by this invention with multiple closable openings, one closable opening can be positioned on the bag's top, and one closable opening can be positioned on the bag's sidewall.

In another illustrative example of an industrial containment bag encompassed by this invention with multiple closable openings, at least two of the bag's closable openings are positioned on its top. In such an embodiment, the multiple closable openings can have the same or different configurations. Examples of closable opening configurations include, without limitation, the following: a closable opening which transgresses a path which is on one of the bag's perimeter edges, a closable opening which transgresses a path which is positioned inward from one of the bag's perimeter edges, a closable opening which transgresses a path which is positioned outward from one of the bag's perimeter edges, or a closable opening created from the bag having a "duffle-type" configuration—i.e., the closable opening is centrally-positioned on the bag's top portion.

In yet another illustrative example of an industrial containment bag encompassed by this invention with multiple closable openings, the industrial containment bag encompassed by this invention is designed for use to contain, transport, store and/or dispose of LLHZ.

Any closure system can be used to open and close the at least one closable opening of the industrial containment bags encompassed by the present invention, as well as to open and close an inspection flap(s), if that embodiment is being practiced either independently or along with other embodiments of this invention. Examples of closure systems that can be employed when practicing the various embodiments of this invention include, without limitation, the following: hook and loop closure systems (e.g., Velcro®-type closure systems, etc.), conventional zipper closure systems (e.g., a coil nylon or metal zipper with at least one pull positioned on the zipper tracks), toothless zipper closure systems (e.g., Ziploc®-type closure systems, MaxiGrip®-type closure systems, U-MaxiGrip®-type closure systems, etc.) and/or closure systems specifically disclosed in any of the following U.S. patents and patent applications: the '772 patent, the '676 patent, the '511 patent, the '722 patent, the '212 patent, the '953 patent, the '281 patent, the '282 patent, the '175 patent, the '322 patent, the '174 patent, the '935 application, and the '662 application—all of which have been incorporated, in their entirety, herein by reference.

Further examples of the different types of closure systems that can be used in the industrial containment bags encompassed by the present invention include, without limitation: slider devices that couple and uncouple the closure structures, those that do not include slider devices that couple and uncouple the closure structures, those that are resealable, and those that are not resealable.

For example, U.S. Pat. No. 5,138,750 (the '750 patent)—which is incorporated herein in its entirety by reference, exemplifies a closure system that includes a closure structure that is operated by pressing the opposite sides of the mouth of the bag together. Using this type of bag-type closure, the user typically squeezes the opposite sides of the mouth together along the opening of the bag so that the cooperating interlocking or coupling structures are engaged together. An alternative approach that some people take is to squeeze incremental portions of the opposite sides of the mouth of the bag together along the length. Once closed, the opening of the bag can be opened by gripping and pulling the opposite sides of the bag's opening. Such a bag is resealable.

U.S. Pat. No. 2,810,944 (the '944 patent)—which is incorporated herein in its entirety by reference, exemplifies a bag-type closure that includes a closure mechanism having a slider. The slider can be thought of as providing a function similar the user's hands as discussed above in the '750 patent. That is, the slider, which is slidably coupled to each of the opposite sides of the bag's opening, is configured so that, as it is slid in one direction, it couples the cooperating interlocking or coupling structures of the mouth of the bag together. In contrast, as the slider is slid in the opposite direction, it uncouples the cooperating interlocking or coupling structures of the bag's opening. Such a bag is also resealable.

U.S. Pat. No. 5,372,428 (the '428 patent) and U.S. Pat. No. 6,004,032 (the '032 patent)—both of which are incorporated herein in their entirety by reference, exemplify non-resealable bag-type closures which are configured to be permanently sealed after various items and substances are placed therein. The opening of non-resealable bag-type closures include cooperating interlocking or coupling structures, which when engaged together, resist being opened. In some cases, it is known to provide bags having non-resealable bag-type closures with secondary means for gaining access to the contents thereof.

U.S. Pat. No. 7,029,178 (the '178 patent)—which is incorporated herein in its entirety by reference, exemplifies a one-way, zip-locking closure for bag-type containers that include slider zipper arrangements. This locking mechanism includes a series of registration structures provided along one side of the mouth of the containment bag and a catch mechanism that is provided within the slider. The catch mechanism engages the series of registration structures as the slider is moved to close the mouth of the container, and thereby prevents movement of the slider in the opposite direction. Such a bag is not resealable.

The preferred closure system employed on industrial containment bags encompassed by the present invention depends, at least in part, upon factors such as: the desired end use, whether the seal needs to be air-tight and/or water-tight, the nature of the material or waste being contained, and/or regulations imposed by a federal, state or local governments or agencies regarding the filling, transporting, storing and/or disposing of materials or wastes being contained.

Regardless of the type of closure system employed, the closure systems can be configured in different manners. Also, if the bag has multiple closure systems, each closure system can have the same or a different configuration. Examples of closure system configurations that can be employed when practicing this invention include, without limitation, the following: U-shaped closure configurations, C-shaped closure configurations, J-shaped closure configurations, centered closure configurations, etc.

U-shaped, C-shaped and J-shaped closure configurations employed when practicing this invention traverse the bag's top, sidewalls, and/or bottom in such a path. Illustrative examples of such U-shaped, C-shaped and J-shaped closure configurations are those made of any of the following closure systems: hook and loop closure systems (e.g., Velcro®-type closure systems, etc.), conventional zipper closure systems (e.g., a coil nylon or metal zipper with at least one pull positioned on the zipper tracks), toothless zipper closure systems (e.g., Ziploc®-type closure systems, Maxi-Grip®-type closure systems, U-MaxiGrip®-type closure systems, etc.), and/or closure systems specifically disclosed in any of the following U.S. patents and patent applications: the '772 patent, the '676 patent, the '511 patent, the '722 patent, the '212 patent, the '953 patent, the '281 patent, the '282 patent, the '175 patent, the '322 patent, the '174 patent, the '750 patent, the '944 patent, the '428 patent, the '032 patent, the '669 patent, the '935 application, and the '662 application—all of which have been incorporated, in their entirety, herein by reference.

Centrally-displaced closure configurations that can be employed when practicing this invention are typically designed such that they form a straight-line closure positioned on the bag's top such that, when closed, the bag's top closure system bisects the bag's top portion. Such a centered closure configuration provides access to the entire interior of the bag through the use of a centered closure system positioned on the bag's top portion. Illustrative examples of such centered closure configuration are those made of any of the following closure systems: hook and loop closure systems (e.g., Velcro®-type closure systems, etc.), conventional zipper closure systems (e.g., a coil nylon or metal zipper with at least one pull positioned on the zipper tracks), toothless zipper closure systems (e.g., Ziploc®-type closure systems, Max/Grip®-type closure systems, U-MaxiGrip®-type closure systems, etc.), and/or closure systems specifically disclosed in any of the following U.S. patents and patent applications: the '772 patent, the '676 patent, the '511 patent, the '722 patent, the '212 patent, the '953 patent, the '281 patent, the '282 patent, the '175 patent, the '322 patent, the '174 patent, the '750 patent, the '944 patent, the '428 patent, the '032 patent, the '669 patent, the '935 application, and the '662 application—all of which have been incorporated, in their entirety, herein by reference.

The preferred closure system configuration employed on industrial containment bags encompassed by the present invention depends, at least in part, upon factors such as: the desired end use, whether the seal needs to be air-tight and/or water-tight, the nature of the material or waste being contained therein, and/or regulations imposed by a federal, state or local governments or agencies regarding the filling, transporting, storing and/or disposing of materials or wastes being contained.

Additionally, industrial containment bags of the present invention can incorporate a separate inner liner. Inner liners are useful when the stored materials are wet or liquids. Suitable material from which such inner liners can be made include, without limitation: low-density polyethylene (e.g., with 5-15 mil thickness being preferred). One illustrative example of such a liner is disclosed in U.S. Pat. No. 5,110,005 (the '005 patent)—which is incorporated herein, in its entirety, by reference. If employed, the inner liner may be sewn to the outer bag, or attached by other means, for instance glued and/or heat-sealed to the outer bag.

The following is one illustrative example of a description of the construction of industrial containment bags encompassed by the present invention. In this particular example, the bag is constructed from a single sheet of material (or a single sheet of multilayered materials).

A preferred means of construction of a containment bag pursuant to this illustrative example is to build the bag from a single fabric sheet or a single multilayer fabric sheet. The multiple sheets can be coextensive when laid on top of one another, or the innermost fabric can be shorter in height than that of the outermost fabric if it is not desired to have the top of the resulting bag lined. Additionally, multilayered designs are possible. For ease of explanation, construction will be described using a single sized multilayer fabric piece, with two side edges, a bottom edge, and a top edge. Using a single fabric piece constructed in the present manner, the resulting constructed bag will have a center opening on the bag top, preferably closable with a zipper closure system or a hook and loop closure system. Generally, a sewn attachment is preferred, and to form a seam. It is preferred that the edges of the fabric on the seam be folded over to create extra strength at the seam. This is desirable for all seams in the bag or liner.

Also attached lengthwise and parallel to each side of the closure system is a strap band. In the present embodiment, this strap band is positioned so that, when the containment bag's construction is complete, the band is positioned at or near the top edge of the bag. The strap band can be eliminated depending if top closure straps are not needed. If the strap band is not used, it is still desired, in a multilayered fabric embodiment, to place a stitch along a horizontal line at or near the location that will become the top edge of the completed bag. Such a stitch or join will keep the inner liner top from separating from the outer liner top and collapsing into the bag interior. Specific illustrative examples of the construction of containment bags that can be employed when practicing this invention are set out in the following U.S. patents and patent applications: the '772 patent, the '676 patent, the '511 patent, the '722 patent, the '212 patent, the '953 patent, the '281 patent, the '282 patent, the '175 patent, the '322 patent, the '174 patent, the '750 patent, the '944 patent, the '428 patent, the '032 patent, the '669 patent, the '935 application, and the '662 application—all of which have been incorporated, in their entirety, herein by reference.

When used for debris, the containment bags which can be employed when practicing this invention may include an inner support liner which lines all or part of the bag's interior. Such a liner can be constructed in multiple layers of differing fabrics or materials for strength, puncture resistance, water resistance, or other desired physical properties. Generally, if employed, the inner liner will be a nonwoven layer and the outer layer a woven material. Sandwiched between the two layers may be a liquid impervious material. A preferred material for the innermost layer is nonwoven polyolefin (e.g., woven a polypropylene) of various weights.

The outer woven polyolefin layer may have a coating on one side (generally the exterior side) of a polyolefin (e.g., a polyethylene). A layer impervious to water and other liquids that can be used is a polyethylene material. Other materials such as polyvinyl chloride (a PVC, reinforced or non-reinforced), woven or non-woven polyethylene or other suitable materials, such as woven fiberglass, may also be used.

Regardless of whether the industrial containment bags encompassed by this invention are self-supporting or non-self-supporting, due to their industrial use they typically contain a significant amount of materials or wastes weighing a tremendous amount. Generally, the location where such bags are being filled is generally not their final destination. As such, in most (but not all) instances, after being filled, the bags need to be lifted or slid into and/or out of some sort of a container or means of transportation. As such, the industrial bags encompassed by this invention can incorporate a means for lifting or sliding the same.

Lifting and/or sliding means that can be incorporated as a part of the industrial bags encompassed by this invention include, without limitation, the following: (a) pick-up or attachment loops or handles that are attached to the bags' outer surface in a direct manner (e.g., by sewing); (b) lifting or sliding strap systems that are at least partially attached to a portion of the bags' outer surface in a direct manner (e.g., by sewing)—i.e., where the lifting or sliding strap systems are attached to the bag's sidewalls and bottom, where the lifting or sliding strap systems are attached only to the bag's sidewalls, or where the lifting or sliding strap systems are attached only to the bag's bottom; (c) lifting sling systems that are only indirectly attached to the bags' outer surface (e.g., by coupling)—i.e., where the lifting or sliding strap systems are everywhere detached from the bags; and/or (d) lifting pallet systems incorporated as a part of the bags' outer surface.

Illustrative examples of lifting methods, lifting systems and lifting apparatuses can be used to lift such containment bags encompassed by this invention include, without limitation, those disclosed in the following patents and patent applications: the '934 patent, the '727 patent, the '772 patent, the '281 patent, the '282 patent, the '299 patent, the '345 patent, and the '662 application—all of which have already been incorporated herein in their entirety by reference. In addition, the bags can be lifted out of the container by the use of a pallet system and a pallet lifting device. Moreover, the bags can also be slid or dumped out of a dumpster-type container or a rigid loading frame.

As mentioned above, if a lifting strap system is employed when practicing certain embodiments of this invention, the individual straps making up the same can be: (a) directly attached (e.g., by sewing) to the bag's outer surface at those locations where the straps contact the same—e.g., the straps are directly attached to both the bag's bottom portion and/or the bag's sidewall portions, (b) directly attached (e.g., by sewing) to only a portion of the bag's outer surface at those locations where the straps contact the same—e.g., the straps are only directly attached to the bag's bottom portion or to the bag's sidewall portions, (c) only indirectly attached to the bag's outer surface—e.g., the straps are not sewn anywhere to the bag's outer surface; rather, they are only coupled thereto by slidingly being passed through some sort of a coupling means (see, e.g., the '281 patent, the '282 patent, the '299 patent, the '345 patent, and/or the '662 application).

Also, if a lifting strap system is employed when practicing certain embodiments of this invention, the individual straps making up the same need not go all the way around the bag's bottom and sidewall portions—e.g., it is possible for the straps to only be directly attached to the bag's sidewalls.

A lifting strap system that can be employed when practicing certain embodiments of this invention can also be one where it is directly attached to a supporting structure which is directly adjacent to the bottom portion of the bag. In such a lifting system configuration, the supporting structure can be (a) substantially smaller than the footprint of the bag's bottom portion, (b) substantially equal to the footprint of the bag's bottom portion, or (c) substantially larger than the footprint of the bag's bottom portion. In the latter configuration, a portion of the supporting structure would transgress at least partially up at least two of the bag's sidewalls, at least partially up at least three of the bag's sidewalls, or at least partially up all of the bag's sidewalls.

If employed, the supporting structure can be a rigid structure (e.g., a pallet) or a flexible structure (e.g., a soft-sided fabric material). In any instance where a supporting structure is employed, it needs to be constructed in a manner, and of a material, sufficient to support the bag and its contents during lifting and transporting processes and procedures.

If a "rigid" supporting structure is employed, it can be used to lift the bag via a lifting machine (e.g., a forklift) or a lifting crane. In the latter instance where the rigid supporting structure is lifted by a lifting crane, it will preferably have lifting straps attached thereto.

In one illustrative example where lifting straps are used in conjunction with a rigid supporting structure, the straps are connected at one point to the supporting structure and have a means for connecting their other end to a lifting crane. In another illustrative example where lifting straps are used in conjunction with a rigid supporting structure, they are continuous and cup the bottom of the structure. In this embodiment, both ends of the lifting straps have a means for connecting them to a lifting crane.

In any instance where lifting strap systems are used to lift industrial containment bags, especially those encompassed by the present invention, the construction and/or use of such strap systems are regulated by the end user(s), as well as by federal, state and/or local governments and agencies. Accordingly, if employed, the selection of materials used for specific lifting strap systems, as well as the configurations, designs and/or lifting techniques and practices associated with the same, has to be selected such that they are in full compliance with all such regulations.

It is intended that the following claims be interpreted as covering all such alterations and modifications as fall within the true spirit and scope of the invention.

CONCLUSION

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above methods, systems, and mediums without departing from the scope of the invention, it is intended that all matter contained in the above description and shown in the accompanying drawing(s) shall be interpreted as an illustrative, and not in a limiting, sense.

Having described the invention in detail, it will be apparent that modifications and variations are possible without departing from the scope of the invention defined in the appended claims that follow.

What is claimed:

1. An industrial containment bag designed for containing bulk materials, wherein said bulk materials to be contained within said industrial containment bag comprise at least one of the following: i) hazardous materials with varying levels of radioactivity, ii) industrial bulk materials, or iii) industrial waste materials, said industrial containment bag comprising a top portion, a bottom portion laterally spaced below said top portion, and side portions positioned between, and perpendicular to, said top and bottom portions, and said industrial containment bag further comprising:
   (a) a closeable opening positioned on said top portion;
   (b) a closure system which, when in its closed position, is centrally-positioned on said top portion and forms two-opposing triangular-shaped folds; and
   (c) a means for independently securing each of said two-opposing triangular-shaped folds to said top portion, wherein the means for independently securing each of the two-opposing triangular-shaped folds comprises at least two separate securing systems, and wherein each of said at least two separate securing systems is positioned on opposing sides of said closure system when in its closed position.

2. The industrial containment bag recited in claim 1, wherein said closeable opening comprises a zipper closure system.

3. The industrial containment bag recited in claim 1, wherein said closeable opening comprises a hook and loop closure system.

4. The industrial containment bag recited in claim 3, wherein said closeable opening further comprises a zipper closure system.

5. The industrial containment bag recited in claim 1, wherein said means for independently securing each of said two-opposing triangular-shaped folds comprises a belt-securing system.

6. The industrial containment bag recited in claim 1, wherein said means for independently securing each of said two-opposing triangular-shaped folds comprises a hook and loop securing system.

7. The industrial containment bag recited in claim 6 wherein said means for independently securing each of said two-opposing triangular-shaped folds further comprises a belt securing system.

8. The industrial containment bag recited in claim 1, wherein said industrial containment bag further comprises a means for visually inspecting the inside of said industrial containment bag after said industrial containment bag's centrally-positioned closure system is closed, and wherein said means for visually inspecting the inside of said industrial containment bag is different from said industrial containment bag's centrally-positioned closure system.

9. An industrial containment bag designed for containing bulk materials, wherein said bulk materials to be contained within said industrial containment bag comprise at least one of the following: i) hazardous materials with varying levels of radioactivity, ii) industrial bulk materials, or iii) industrial waste materials, said industrial containment bag comprising a top portion, a bottom portion laterally spaced below said top portion, and side portions positioned between, and perpendicular to, said top and bottom portions, and said industrial containment bag further comprising:
   (a) a closeable opening positioned on said top portion;
   (b) a closure system which, when in its closed position, is centrally-positioned on said top portion and forms two-opposing triangular-shaped folds;
   (c) a means for independently securing each of said two-opposing triangular-shaped folds to said top portion, wherein the means for independently securing each of the two-opposing triangular-shaped folds comprises at least two separate securing systems, and wherein each of said at least two separate securing systems is positioned on opposing sides of said closure system when in its closed position; and
   (d) a means for reducing the torsional forces exerted on said industrial containment bag's closure system, after:
      i. said industrial containment bag is at least partially-filled with a bulk material, and
      ii. said at least partially-filled industrial containment bag's closure system is closed.

10. The industrial containment bag recited in claim 9, wherein said means for reducing the torsional forces exerted on said industrial containment bag's closure system comprises a securable flap that can cover at least a portion of said industrial containment bag's closure system after said closure system is closed.

11. The industrial containment bag recited in claim 9, wherein said means for reducing the torsional forces exerted on said industrial containment bag's closure system comprises a belt securing system.

12. The industrial containment bag recited in claim 9, wherein said means for reducing the torsional forces exerted on said industrial containment bag's closure system comprises a hook and loop securing system.

13. The industrial containment bag recited in claim 12, wherein said means for reducing the torsional forces exerted on said industrial containment bag's closure system further comprises a belt securing system.

14. The industrial containment bag recited in claim 13, wherein said means for reducing the torsional forces exerted on said industrial containment bag's closure system further comprises a securable flap that can cover at least a portion of said industrial containment bag's closure system after said closure system is closed.

15. The industrial containment bag recited in claim 9, wherein said means for reducing the torsional forces is attached to the inside wall surface of said bag.

16. The industrial containment bag recited in claim 15, wherein said means for reducing the torsional forces comprises a series of straps attached to opposing inside wall surfaces of said bag, and wherein at least one of the series of straps attached to one of said industrial containment bag's inside wall surfaces is long enough to be secured to at least one of said series of straps attached to the bag's opposing inside wall surface.

17. The industrial containment bag recited in claim 15, wherein said means for reducing the torsional forces comprises a series of straps attached an inside wall surface of said bag, and a series of loops attached to an opposing inside wall surface of said bag, and wherein at least one of the series of straps attached to one of said bag's inside wall surfaces is long enough to be secured to at least one of said series of loops attached to the bag's opposing inside wall surface.

18. The industrial containment bag recited in claim 15, wherein said means for reducing the torsional forces comprises a series of loops attached to the inside wall surfaces of said bag, and at least one separate and independent strap, wherein said at least one separate and independent strap is long enough to pass through at least two of said series of loops attached to opposing inside wall surfaces of said bag, and be secured in that position.

19. The industrial containment bag recited in claim 9, wherein said industrial containment bag further comprising a means for visually inspecting the inside of said industrial containment bag after said industrial containment bag's centrally-positioned closure system is closed, and wherein said means for visually inspecting the inside of said industrial containment bag is different from said industrial containment bag's centrally-positioned closure system.

20. An industrial containment bag designed for containing bulk materials, wherein said bulk materials to be contained within said industrial containment bag comprise at least one of the following: i) hazardous materials with varying levels of radioactivity, ii) industrial bulk materials, or iii) industrial waste materials, said industrial containment bag comprising a top portion, a bottom portion laterally spaced below said top portion, and side portions positioned between, and perpendicular to, said top and bottom portions, and said industrial containment bag further comprising:
 (a) a closeable opening positioned on said top portion;
 (b) a closure system which, when in its closed position, is centrally-positioned on said top portion and forms two-opposing triangular-shaped folds;
 (c) a means for independently securing each of said two-opposing triangular-shaped folds to said top portion, wherein the means for independently securing each of the two-opposing triangular-shaped folds comprises at least two separate securing systems, and wherein each of said at least two separate securing systems is positioned on opposing sides of said closure system when in its closed position; and
 (d) a means for reducing the torsional forces exerted on said industrial containment bag's closure system, after: said industrial containment bag is at least partially-filled with a bulk material, and said at least partially-filled industrial containment bag's closure system is closed, wherein said means for reducing the torsional forces exerted on said industrial containment bag's closure system comprises:
  i. a securable flap that can cover at least a portion of said industrial containment bag's closure system after said closure system is closed;
  ii. a belt securing system; and
  iii. a hook and loop securing system.

* * * * *